United States Patent
Zenhausern et al.

(10) Patent No.: US 9,255,348 B2
(45) Date of Patent: Feb. 9, 2016

(54) SYSTEMS AND METHODS FOR BIODOSIMETRY WITH BIOCHIP USING GENE EXPRESSION SIGNATURES

(75) Inventors: Frederic Zenhausern, Fountain Hills, AZ (US); Christine Orozco, Mystic, CT (US); Mark Richards, Maricopa, AZ (US); Carl Yamashiro, Chandler, AZ (US); Sally A. Amundson, New York, NY (US); Ralf Lenigk, Chandler, AZ (US); Michael L. Bittner, Phoenix, AZ (US); Yoganand Balagurunathan, Tempe, AZ (US)

(73) Assignee: The Trustees of Columbia University in the City of New York, New York, NY (US)

(*) Notice: Subject to any disclaimer, the term of this patent is extended or adjusted under 35 U.S.C. 154(b) by 1777 days.

(21) Appl. No.: 12/438,944

(22) PCT Filed: Aug. 24, 2007

(86) PCT No.: PCT/US2007/076802
§ 371 (c)(1),
(2), (4) Date: Feb. 2, 2010

(87) PCT Pub. No.: WO2008/082712
PCT Pub. Date: Jul. 10, 2008

(65) Prior Publication Data
US 2010/0144558 A1    Jun. 10, 2010

Related U.S. Application Data

(60) Provisional application No. 60/840,245, filed on Aug. 25, 2006, provisional application No. 60/900,296, filed on Feb. 8, 2007, provisional application No. 60/942,090, filed on Jun. 5, 2007, provisional application No. 60/954,499, filed on Aug. 7, 2007.

(51) Int. Cl.
C12M 1/34 (2006.01)
C40B 60/12 (2006.01)
(Continued)

(52) U.S. Cl.
CPC ............ *C40B 60/12* (2013.01); *B01L 3/5027* (2013.01); *C40B 30/10* (2013.01); *G01T 1/02* (2013.01);
(Continued)

(58) Field of Classification Search
CPC . B01L 3/5027; B01L 3/5038; B01L 2200/10; B01L 2300/0636; B01L 7/52
USPC .......................................... 435/287.2, 288.5
See application file for complete search history.

(56) References Cited

U.S. PATENT DOCUMENTS 3,031,919 A   5/1962  Wardham
4,626,244 A   12/1986 Reinicke
(Continued)

FOREIGN PATENT DOCUMENTS

WO    WO 0050643 A2 *  8/2000
WO    WO 2008/073168   6/2008
WO    WO 2008/082712   7/2008

OTHER PUBLICATIONS

U.S. Appl. No. 11/895,361, filed Aug. 24, 2007, Dutta et al.
(Continued)

*Primary Examiner* — William H Beisner
(74) *Attorney, Agent, or Firm* — Dentons US LLP

(57) ABSTRACT

Exposure to ionizing radiation can produce a well-defined dose dependent signature in terms of changes in gene expression. In approaches and devices described herein, such a signature can be used to generate and use a self-contained radiation biodosimeter device, based on, for example, a blood finger stick. Various aspects of the invention are directed to biodosimetry with a fully integrated biochip using gene expression signatures.

31 Claims, 36 Drawing Sheets

(51) Int. Cl.
*B01L 3/00* (2006.01)
*C40B 30/10* (2006.01)
*G01T 1/02* (2006.01)

(52) U.S. Cl.
CPC ...... *B01L 3/502723* (2013.01); *B01L 3/502738* (2013.01); *B01L 2200/10* (2013.01); *B01L 2300/0636* (2013.01); *B01L 2300/1827* (2013.01)

(56) References Cited

U.S. PATENT DOCUMENTS

| | | | |
|---|---|---|---|
| 4,744,663 | A | 5/1988 | Hamashima et al. |
| 5,014,718 | A | 5/1991 | Mitchen |
| 5,381,224 | A | 1/1995 | Dixon et al. |
| 5,458,125 | A | 10/1995 | Schweikard |
| 5,572,598 | A | 11/1996 | Wihl et al. |
| 5,604,344 | A | 2/1997 | Finarov |
| 5,719,391 | A | 2/1998 | Kain |
| 5,747,813 | A | 5/1998 | Norton et al. |
| 5,835,225 | A | 11/1998 | Thakur |
| 5,863,708 | A * | 1/1999 | Zanzucchi et al. ............... 506/23 |
| 5,936,736 | A | 8/1999 | Suzuki et al. |
| 6,429,968 | B1 | 8/2002 | Carver |
| 6,458,584 | B1 * | 10/2002 | Mirzabekov et al. ...... 435/287.2 |
| 6,496,267 | B1 | 12/2002 | Takaoka |
| 6,527,003 | B1 | 3/2003 | Webster |
| 6,548,796 | B1 | 4/2003 | Silvermintz et al. |
| 6,679,279 | B1 | 1/2004 | Liu et al. |
| 6,714,620 | B2 | 3/2004 | Caflisch et al. |
| 6,767,706 | B2 | 7/2004 | Quake et al. |
| 6,852,287 | B2 * | 2/2005 | Ganesan ........................ 422/502 |
| 6,893,547 | B2 * | 5/2005 | Gascoyne et al. ............. 204/547 |
| 6,974,938 | B1 | 12/2005 | Leblans et al. |
| 6,980,294 | B2 | 12/2005 | Namba et al. |
| 7,008,768 | B1 * | 3/2006 | Fornace et al. ............... 435/6.11 |
| 7,164,968 | B2 | 1/2007 | Treat et al. |
| 7,283,610 | B2 | 10/2007 | Low et al. |
| 2002/0068358 | A1 | 6/2002 | Campbell et al. |
| 2003/0030741 | A1 | 2/2003 | Ohta |
| 2003/0142398 | A1 | 7/2003 | Leblans |
| 2004/0053290 | A1 * | 3/2004 | Terbrueggen et al. ............. 435/6 |
| 2004/0143461 | A1 | 7/2004 | Watkins |
| 2004/0251899 | A1 | 12/2004 | Swartz et al. |
| 2005/0043894 | A1 * | 2/2005 | Fernandez ........................ 702/19 |
| 2005/0106713 | A1 * | 5/2005 | Phan et al. .................. 435/287.2 |
| 2005/0130292 | A1 * | 6/2005 | Ahn et al. .................... 435/287.1 |
| 2005/0142565 | A1 | 6/2005 | Samper et al. |
| 2005/0191047 | A1 | 9/2005 | Toji |
| 2005/0247874 | A1 | 11/2005 | Ando et al. |
| 2007/0036039 | A1 | 2/2007 | Kawahara et al. |
| 2008/0151263 | A1 | 6/2008 | Randers-Pehrson et al. |
| 2008/0176755 | A1 | 7/2008 | Amundson et al. |
| 2008/0179301 | A1 | 7/2008 | Garty et al. |
| 2008/0181473 | A1 | 7/2008 | Garty et al. |
| 2008/0228404 | A1 | 9/2008 | Garty et al. |
| 2008/0317203 | A1 | 12/2008 | Ferrand et al. |
| 2009/0054222 | A1 | 2/2009 | Zhang et al. |
| 2009/0198094 | A1 | 8/2009 | Fenster et al. |
| 2012/0132313 | A1 | 5/2012 | Bhatla et al. |

OTHER PUBLICATIONS

Abramsson-Zetterberg et al., Human Cytogenetic Biomonitoring using Flow-Cytometric Analysis of Micronuclei in Transferrin-Positive Immature Peripheral Blood Reticulocytes, Environ. Mol. Mutagen., 2000, vol. 36, pp. 22-31.
Alexander et al., BiodosEPR-2006 Meeting: Acute Dosimetry Consensus Committee Recommendations on Biodosimetry Applications in Events Involving Uses of Radiation by Terrorists and Radiation Accidents, Radiation Measurements, 2007, vol. 42, pp. 972-996.
Alonso-Amigo and Becker, Microdevices Fabricated by Polymer Hot Embossing, Abstracts of Papers of the American Chemical Society, 2000, vol. 219, pp. 468.
Amundson and Fornace, Gene Expression Profiles for Monitoring Radiation Exposure, Radiat. Prot. Dosimetry, 2001, vol. 97, pp. 11-16.
Amundson and Fornace, Monitoring Human Radiation Exposure by Gene Expression Profiling: Possibilities and Pitfalls, Health Phys., 2003, vol. 85, pp. 36-42.
Amundson et al., Biological Indicators for the Identification of Ionizing Radiation Exposure in Humans, Expert Rev. Mol. Diagn., 2001, vol. 1, pp. 211-219.
Amundson et al., Differential Responses of Stress Genes to Low Dose-Rate Gamma Irradiation, Mol. Cancer Res., 2003, vol. 1, pp. 445-452.
Amundson et al., Functional Genomics as a Window on Radiation Stress Signaling, Oncogene, 2003, vol. 22, pp. 5828-5833.
Amundson et al., Induction of Gene Expression as a Monitor of Exposure to Ionizing Radiation, Radiat. Res., 2001, vol. 156, pp. 657-661.
Amundson et al., Induction of Stress Genes by Low Doses of Gamma Rays, Radiat. Res., 1999, vol. 152, pp. 225-231.
Amundson and Fornace, Microarray Approaches for Analysis of Cell Cycle Regulatory Genes, Methods Mol. Biol., 2004, vol. 241, pp. 125-141.
Amundson et al., A Nucleotide Excision Repair Master-Switch: p53 Regulated Coordinate Induction of Global Genomic Repair Genes, Cancer Biol. Ther., 2002, vol. 1, pp. 145-149.
Amundson et al., cDNA Microarray Hybridization Reveals Complexity and Heterogeneity of Cellular Genotoxic Stress Responses, Oncogene, 1999, vol. 18, pp. 3666-3672.
Amundson et al., Human in Vivo Radiation-Induced Biomarkers: Gene Expression Changes in Radiotherapy Patients, Cancer Res., 2004, vol. 64, pp. 6368-6371.
Amundson et al., Identification of Potential mRNA Biomarkers in Peripheral Blood Lymphocytes for Human Exposure to Ionizing Radiation, Radiat. Res., 2000, vol. 154, pp. 342-346.
Amundson et al., Stress-Gene Induction by Low-Dose Gamma-Irradiation, Military Med., 2002, vol. 167, pp. 13-15.
Amundson et al., Stress-Specific Signatures: Expression Profiling of p53 Wild-Type and Null Human Cells, Oncogene, 2005, vol. 24, pp. 4572-4579.
Anderson et al., A Miniature Integrated Device for Automated Multistep Genetic Assays, Nucleic Acids Research, 2000, vol. 28(12), pp. e60.
Anno et al., Dose Response Relationships for Acute Ionizing Radiation Lethality, Health Phys., 2003, vol. 84, pp. 565-575.
Appella and Anderson, Post-Translational Modifications and Activation of p53 by Genotoxic Stresses, Eur. J. Biochem., 2001, vol. 268, pp. 2764-2772.
Balajee and Geard, Replication Protein A and Gamma-H2AX Foci Assembly is Triggered by Cellular Response to DNA Double-Strand Breaks, Exp. Cell Res., 2004, vol. 300, pp. 320-334.
Banath et al., Radiation Sensitivity, H2AX Phosphorylation, and Kinetics of Repair of DNA Strand Breaks in Irradiated Cervical Cancer Cell Lines, Cancer Res., 2004, vol. 64, pp. 7144-7149.
Baranov et al., Chernobyl Experience: Biological Indicators of Exposure to Ionizing Radiation, Stem Cells, 1995, 13 Suppl 1: pp. 69-77.
Belgrader et al., Infectious Disease—PCR Detection of Bacteria in Seven Minutes, Science, 1999, vol. 284(5413), pp. 449-450.
Belien et al., Standardization of Counting Micronuclei: Definition of a Protocol to Measure Genotoxic Damage in Human Exfoliated Cells, Carcinogenesis, 1995, vol. 16, pp. 2395-2400.
Bittner et al., Molecular Classification of Cutaneous Malignant Melanoma by Gene Expression Profiling, Nature, 2000, vol. 406, pp. 536-540.
Bocker et al., Automated Scoring of Micronuclei in Binucleated Human Lymphocytes, Int. J. Radiat. Biol., 1996, vol. 70, pp. 529-537.
Bonassi et al., Human Population Studies with Cytogenetic Biomarkers: Review of the Literature and Future Prospectives, Environ. Mol. Mutagen, 2005, vol. 45, pp. 258-270.
Bonassi et al., An Increased Micronucleus Frequency in Peripheral Blood Lymphocytes Predicts the Risk of Cancer in Humans, Carcinogenesis, 2007, vol. 28(3), pp. 625-631.

(56) References Cited

OTHER PUBLICATIONS

Boone et al. Integrated Chemical Analysis on Plastic Microfluidic Devices Paper presented at Solid State Sensor and Actuator Workshop, Hilton Head Island, South Carolina, Jun. 8-11, 1998, pp. 87-92.
Boumsellek and Ferran, Trade-Offs in Miniature Quadrupole Designs, J. Am. Soc. Mass. Spectrom., 2001, vol. 12, pp. 633-640.
Boyum, Isolation of Mononuclear Cells and Granulocytes from Human Blood. Isolation of Monuclear Cells by One Centrifugation, and of Granulocytes by Combining Centrifugation and Sedimentation at 1 g, Scand. J. Clin. Lab. Invest. Suppl., 1968, vol. 97, pp. 77-89.
Bulavin et al., Phosphorylation of Human p53 by p38 Kinase Coordinates N-Terminal Phosphorylation and Apoptosis in Response to UV Radiation, EMBO J., 1999, vol. 18, pp. 6845-6854.
Burge et al., Use of a Laser Skin Perforator for Determination of Capillary Blood Glucose Yields Reliable Results and High Patient Acceptability, Diabetes Care, 1998, vol. 21, pp. 871-873.
Burns et al., An Integrated Nanoliter DNA Analysis Device, Science, 1998, vol. 282(5388), pp. 484-487.
Burns and El-Deiry, Microarray Analysis of P53 Target Gene Expression Patterns in the Spleen and Thymus in Response to Ionizing Radiation, Cancer Biol. Ther., 2003, vol. 2, pp. 431-443.
Caspermeyer, Biodesign Institute and TGen Awarded Grants to Help Lessen Threat of Radiological Terrorist Event, ASU Press Release dated Sep. 6, 2005, last accessed Aug. 25, 2010, 4 pages.
Cerqueira et al., Genetic Damage in Exfoliated Cells from Oral Mucosa of Individuals Exposed to X-Rays during Panoramic Dental Radiographies, Mutat. Res., 2004, vol. 562, pp. 111-117.
Chalmers et al., Flow Through, Immunomagnetic Cell Separation, Biotechnology Progress, 1998, vol. 14(1), pp. 141-148.
Cheng and M. M, Capillary Electrophoresis of Nucleic Acids: Practical Applications of Capillary Electrophoresis, Totowa, NJ, Humana Press, 2001, pp. 211-219.
Cheng et al., Sample Preparation in Microstructured Devices, Microsystem Technology in Chemistry and Life Science, 1998, vol. 194, pp. 215-231.
Chou and Zenhausern, Electrodeless Dielectrophoresis for Micro Total Analysis Systems, Engineering in Medicine and Biology Magazine (IEEE), 2003, vol. 22(6), pp. 62-67.
Chou et al., Electrodeless Dielectrophoretic Trapping and Separation of Cells, Micro Total Analysis Systems, 2002, Nara, Japan.
Chou et al., Imprint of Sub-25 nm Vias and Trenches in Polymers, Applied Physics Letters, 1995, vol. 67(21), pp. 3114-3116.
Chou et al., Imprint Lithography with 25-Nanometer Resolution, Science, 1996, vol. 272(5258), pp. 85-87.
Coleman et al., Development of Passive Flow Devices for Cancer Diagnostics, Presentation at the NSF Center for Biophontonics Workshop, University of California, Davis, Apr. 2007.
Department of Homeland Security, Technology Assessment and Roadmap for the Emergency Radiation Dose Assessment Program ERDAP, www3.niaid.nih.gov/research/topics/radnuc/PDF/TechAssessment.pdf, accessed Dec. 21, 2007.
Dertinger et al., Enumeration of Micronucleated CD71-Positive Human Reticulocytes with a Single-Laser Flow Cytometer, Mutat. Res., 2002, vol. 515, pp. 3-14.
Dertinger et al., Micronucleated CD71-Positive Reticulocytes: A Blood-Based Endpoint of Cytogenetic Damage in Humans, Mutat. Res., 2003, vol. 542, pp. 77-87.
Dertinger et al., Three Color Labeling Method for Flow Cytometric Measurement of Cytogenetic Damage in Rodent and Human Blood, Environ. Mol. Mutagen., 2004, vol. 44, pp. 427-435.
Durante, Potential Applications of Biomarkers of Radiation Exposure in Nuclear Terrorism Events, Phisica. Medica., 2003, vol. XIX(3), pp. 191-212.
Edwards, the Use of Chromosomal Aberrations in Human Lymphocytes for Biological Dosimetry, Radiat. Res., 1997, vol. 148, pp. S39-S44.
Fenech et al., Intra- and Inter-Laboratory Variation in the Scoring of Micronuclei and Nucleoplasmic Bridges in Binucleated Human Lymphocytes: Results of an International Slide-Scoring Exercise by the HUMN Project, Mutat. Res., 2003, vol. 534, pp. 45-64.
Fenech et al., Project: Detailed Description of the Scoring Criteria for the Cytokinesis-Block Micronucleus Assay using Isolated Human Lymphocyte Cultures, Mutat. Res., 2003, vol. 534, pp. 65-75.
Fenech et al., The Human Micronucleus Project—An International Collaborative Study on the Use of the Micronucleus Technique for Measuring DNA Damage in Humans, Mutat. Res., 1999, vol. 428, pp. 271-283.
Fenech and Morley, Measurement of Micronuclei in Lymphocytes, Mutation Research, 1985, vol. 147(1-2), pp. 29-36.
Fornace et al., Stress-Gene Induction by Low-Dose Gamma Irradiation, Mil. Med., 2002, vol. 167, pp. 13-15.
Fornace et al., The Complexity of Radiation Stress Responses: Analysis by Informatics and Functional Genomics Approaches, Gene Expression, 1999, vol. 7, pp. 387-400.
Fortina et al., DOP-PCR Amplification of Whole Genomic DNA and Microchip-Based Capillary Electrophoresis: Capillary Electrophoresis of Nucleic Acids, Humana Press, 2001, vol. 2, pp. 211-219.
Fruhstorfer, Capillary Blood Sampling: The Pain of Single-Use Lancing Devices, Eur. J. Pain, 2000, vol. 4, pp. 301-305.
Gantenberg et al., Micronuclei in Human Lymphocytes Irradiated In Vitro or In Vivo, Radiat. Res., 1991, vol. 128, pp. 276-281.
Garty, Advances in High-Throughput Biodosimetry Presentation at the 2006 Micro-Workshop on Nanodosimetry, Nes-Ziona, Israel, Dec. 1-4, 2006.
Garty et al., Development of an Ultrahigh-Throughput Robotically Based Biodosimetry Workstation Using in Situ Assays, Abstract Accepted for Poster Presentation at the 13th International Congress of Radiation Research, San Francisco, California, 2007.
Garty et al., Interfacing a High-Throughput Robotic Biodosimetry Workstation with Emergency Response Personnel Abstract Submitted to the 2nd Annual Interagency Workshop using Environmental Data during Emergencies: From Field Data Collection to Risk Communication, Sponsored by the New York City Department of Health and Mental Hygiene, 2007.
Garvey et al., Blood Lancing Systems for Skin Puncture, Prof Nurse, 1999, vol. 14, pp. 643-651.
Goans et al., Early Dose Assessment Following Severe Radiation Accidents, Health Phys., 1997, vol. 72, pp. 513-518.
Goans et al., Early Dose Assessment in Criticality Accidents, Health Phys., 2001, vol. 81, pp. 446-449.
Grace et al., Development and Assessment of a Quantitative Reverse Transcription-PCR Assay for Simultaneous Measurement of Four Amplicons, Clin. Chem., 2003, vol. 49, pp. 1467-1475.
Gudkov and Komarova, The Role of p53 in Determining Sensitivity to Radiotherapy, Nat. Rev. Cancer, 2003, vol. 3, pp. 117-129.
Hande et al., Past Exposure to Densely Ionizing Radiation Leaves a Unique Permanent Signature in the Genome, Am. J. Hum. Genet., 2003, vol. 72, pp. 1162-1170.
Harrison et al., Capillary Electrophoresis and Sample Injection Systems Integrated on a Planar Glass Chip, Analytical Chemistry, 1992, vol. 64(17), pp. 1926-1932.
Harrison et al., Micromachining a Miniaturized Capillary Electrophoresis-Based Chemical-Analysis System on a Chip, Science, 1993, vol. 261(5123), pp. 895-897.
Hayata et al., Cytogenetical Dose Estimation for 3 Severely Exposed Patients in the JCO Criticality Accident in Tokai-Mura, J. Radiat. Res. (Tokyo), 2001, vol. 42 Suppl., pp. S149-S155.
Hayata et al., Robot System for Preparing Lymphocyte Chromosome, J. Radiation Research, 1992, vol. 33(Supplement), pp. 231-241.
Hildesheim et al., Gadd45a Protects against UV Irradiation-Induced Skin Tumors, and Promotes Apoptosis and Stress Signaling Via MAPK and p53, Cancer Res., 2002, vol. 62, pp. 7305-7315.
Hildesheim et al., p38 Mitogen-Activated Protein Kinase Inhibitor Protects the Epidermis against the Acute Damaging Effects of Ultraviolet Irradiation by Blocking Apoptosis and Inflammatory Responses, J. Invest. Dermatol., 2004, vol. 122, pp. 497-502.
Holmes et al., Metabolomic Characterization of Genetic Variations in Toxicological and Metabolic Responses Using Probabilistic Neural Networks, Chem. Res. Toxicol., 2001, vol. 14, pp. 182-191.

(56) References Cited

OTHER PUBLICATIONS

Holmes et al., Chemometric Models for Toxicity Classification Based on NMR Spectra of Biofluids, Chem. Res. Toxicol., 2000, vol. 13, pp. 471-478.

Hook et al., Detection of VX Contamination in Soil through Solid-Phase Microextraction Sampling and Gas Chromatography/Mass Spectrometry of the VX Degradation Product Bis(Diisopropylaminoethyl)Disulfide, J. Chromatogr. A., 2003, vol. 992, pp. 1-9.

Hook et al., Dynamic Solid Phase Microextraction for Sampling of Airborne Sarin with Gas Chromatography-Mass Spectrometry for Rapid Field Detection and Quantification, J. Sep. Sci., 2004, vol. 27, pp. 1017-1022.

Huang and Yao, A New Closed-Form Kinematics of the Generalized 3-DOF Spherical Parallel Manipulator, Robotica, 1999, vol. 17, pp. 475-485.

Ibrahim et al., Real-Time Microchip PCR for Detecting Single-Base Differences in Viral and Human DNA, Analytical Chemistry, 1998, vol. 70(9), pp. 2013-2017.

Ilyinskikh et al., Micronucleus Test of Erythrocytes and Lymphocytes in the Blood of the Altai Region Residents Living Near the Semipalatinsk Atomic Proving Ground, Mutat. Res., 1997, vol. 392, pp. 223-228.

International Search Report issued on Sep. 26, 2008, in the related application PCT/US08/76802.

International Search Report issued on Feb. 25, 2008, in the related application PCT/US07/76825.

International Search Report issued on Sep. 12, 2008, in the related application PCT/US07/18931.

Ishigure et al., Calculation of the Absorbed Dose for the Overexposed Patients at the JCO Criticality Accident in Tokai-Mura J. Radiat. Res. (Tokyo), 2001, vol. 42 Suppl., pp. S137-S148.

Jen, et al, Micronuclei and Nuclear Anomalies in Urinary Exfoliated Cells of Subjects in Radionuclide-Contaminated Regions, Mutat. Res., 2002, vol. 520, pp. 39-46.

Jiang and Harrison, mRNA Isolation in a Microfluidic Device for Eventual Integration of cDNA Library Construction, Analyst, 2000, vol. 125(12), pp. 2176-2179.

Joung et al., Micro Pumps Based on Alternating High Gradient Magnetic Fields, IEEE Trans. on Magnetics, 2000, vol. 36, pp. 2012.

Kachel et al., High-Throughput Isolation of Ultra-Pure Plasmid DNA by a Robotic System, BMC Biotechnology, 2006, vol. 6(9), 8 pages.

Kimm et al., Application of Headspace Solid-Phase Microextraction and Gas Chromatography-Mass Spectrometry for Detection of the Chemical Warfare Agent bis(2chloroethyl) Sulfide in Soil, J. Chromatogr. A., 2002, vol. 971, pp. 185-191.

Kirsch-Volders et al., Report from the In Vitro Micronucleus Assay Working Group, Mutat. Res., 2003, vol. 540, pp. 153-163.

Kobayashi et al., Microarray Reveals Differences in Both Tumors and Vascular Specific Gene Expression in De Novo CD5+ and CD5− Diffuse Large B-Cell Lymphomas, Cancer Res., 2003, vol. 63, pp. 60-66.

Komarova et al., Dual Effect of p53 on Radiation Sensitivity In Vivo: p53 Promotes Hematopoietic Injury, but Protects from Gastro-Intestinal Syndrome in Mice, Oncogene, 2004, vol. 23, pp. 3265-3271.

Konopacka, Effect of Smoking and Aging on Micronucleus Frequencies in Human Exfoliated Buccal Cells, Neoplasma, 2003, vol. 50, pp. 380-382.

Kopp et al., Chemical Amplification: Continuous-Flow PCR on a Chip, Science, 1998, vol. 280, pp. 1046-1048.

Kricka et al., Fabrication of Plastic Microchips by Hot Embossing, Lab on a Chip, 2002, vol. 2(1), pp. 1-4.

Kronstrand et al., Screening for Drugs of Abuse in Hair with Ion Spray LC-MS-MS, Forensic Sci. Int., 2004, vol. 145, pp. 183-190.

Kudoh et al., Investigation of a New Method for Separation of Neutrophils from a Small Volume of Human Blood, Nippon Eiseigaku Zasshi, 1992, vol. 47, pp. 650-657.

Kumar et al., Preliminary Experiments in Robot/Human Cooperative Microinjection, in 2003 IEEE/RSJ International Conference on Intelligent Robots and Systems (IROS 2003) Proceedings, Oct. 27-31, 2003, Las Vegas, Nevada: IEEE, 2003, pp. 4 v.

Lagally et al., Single-Molecule DNA Amplification and Analysis in an Integrated Microfluidic Device, Analytical Chemistry, 2001, vol. 73(3), pp. 565-570.

Langlois et al., An Improved Flow Cytometric Assay for Somatic Mutations at the Glycophorin A Locus in Humans, Cytometry, 1990, vol. 11, pp. 513-521.

Lee et al., Reliability of Finger Stick Capillary Blood for the Lymphocyte Micronucleus Assay, Mutagenesis, 1997, vol. 12, pp. 79-81.

Lenarczyk and Slowikowska, The Micronucleus Assay Using Peripheral Blood Reticulocytes from X-Ray-Exposed Mice, Mutat. Res., 1995, vol. 335, pp. 229-234.

Lenigk et al., Plastic Biochannel Hybridization Devices: A New Concept for Microfluidic DNA Arrays, Analytical Biochemistry, 2002, vol. 311(1), pp. 40-49.

Li et al., Characterization of the Role for p38 MAP Kinase in the In Vivo Radiation-Induced Inflammatory Response, Abstract Accepted for Presentation at the 13th International Congress of Radiation Research, San Francisco, California, 2007.

Li et al., Involvement of p38 in In Vivo Response to Ionizing Irradiation: Implication in the Inflammatory Reaction Induced by Genotoxicity, Abstract Accepted for Presentation at the 13th International Congress of Radiation Research, San Francisco, California, 2007.

Lin et al., Characteristics of a Polyimide Microvalve, Paper presented at Solid State Sensor and Actuator Workshop, Hilton Head Island, SC, Jun. 2-6, 1996, pp. 113-116.

Liu et al., Hybridization Enhancement Using Cavitation Microstreaming, Analytical Chemistry, 2003, vol. 75(8), pp. 1911-1917.

Liu et al., Fully Integrated Microfluidic Biochips for DNA Analysis, Int. J. Comput. Eng. Sci., 2003, vol. 4, pp. 145-150.

Liu et al., Highly Parallel Integrated Microfluidic Biochannel Arrays, Technical Digest of the 14th International Conference on Micro Electro Mechanical Systems, Interlaken, Switzerland, 2001.

Liu et al., Self-Contained, Fully Integrated Biochip for Sample Preparation, Polymerase Chain Reaction Amplification, and DNA Microarray Detection, Anal. Chem., 2004, vol. 76, pp. 1824-1831.

Livingston et al., Radiobiological Evaluation of Immigrants from the Vicinity of Chernobyl, International Journal of Radiation Biology, 1997, vol. 72, pp. 703-713.

Loinaz, Video Cameras: CMOS Technology Provides On-Chip Processing, Sensor Review, 1999, vol. 19, pp. 19-26.

Long, A New Preprocessing Approach for Cell Recognition, IEEE Transactions on Information Technology in Biomedicine, 2004, vol. 9(3), pp. 407-412.

Long et al., Automatic Detection of Unstained Viable Cells in Bright Field Images Using a Support Vector Machine with an Improved Training Procedure, Computers in Biology and Medicine, 2006, vol. 36, pp. 339-362.

Long et al., Effective Automatic Recognition of Cultured Cells in Bright Field Images Using Fisher's Linear Discriminant Preprocessing, In Proceedings of IMECE04: 2004 ASME International Mechanical Engineering Congress, Anaheim, California, 2004.

Lorimore and Wright, Radiation-Induced Genomic Instability and Bystander Effects: Related Inflammatory-Type Responses to Radiation-Induced Stress and Injury? A Review, Int. J. Radiat. Biol., 2003, vol. 79, pp. 15-25.

Lorimore et al., Inflammatory-Type Responses after Exposure to Ionizing Radiation In Vivo: A Mechanism for Radiation-Induced Bystander Effects?, Oncogene, 2001, vol. 20, pp. 7085-7095.

Lowe et al., p53 is Required for Radiation-Induced Apoptosis in Mouse Thymocytes, Nature, 1993, vol. 362, pp. 847-849.

Lozano et al., Pattern Analysis of Cell Micronuclei Images to Evaluate Their Use as Indicators of Cell Damage, Engineering in Medicine and Biology Society, 2003, Proceedings of the 25th Annual International Conference of the IEEE, Cancun, Mexico: IEEE; 2003, vol. 1, pp. 731-714.

Lu et al., Functionally Integrated MEMS Micro Gas Chromatograph Subsystem, 7th International Conference on Miniaturized Chemical and Biochemical Analysis Systems, 2003, pp. 411-415.

(56) References Cited

OTHER PUBLICATIONS

Lyulko et al., Fully-Automated Rapid in Situ Cellular Imaging for a High-Throughput Biodosimetry Workstation, Abstract Accepted for Poster Presentation at the 13th International Congress of Radiation Research, San Francisco, California, Jul. 8-12, 2007.
Macphail et al., Expression of Phosphorylated Histone H2AX in Cultured Cell Lines Following Exposure to X-Rays, Int. J. Radiat. Biol., 2003, vol. 79, pp. 351-358.
Majid et al., Workspace Analysis of a Six-DOF, Three-PPSR Parallel Manipulator, International Journal of Advanced Manufacturing Technology, 2000, vol. 17, pp. 441-449.
Manginell et al., Monolithically-Integrated Microchemlab for Gas-Phase Chemical Analysis, 7th International Conference on Miniaturized Chemical and Biochemical Analysis Systems, 2003.
Manz et al., Planar Chips Technology for Miniaturization and Integration of Separation Techniques into Monitoring Systems—Capillary Electrophoresis on a Chip, Journal of Chromatography, 1992, vol. 593(1-2), pp. 253-258.
McBride et al., A Sense of Danger from Radiation, Radiat. Res., 2004, vol. 162, pp. 1-19.
Mezouar and Allen, Visual Servoed Micropositioning for Protein Manipulation: In Proceedings 2002 IEEE/RSJ International Conference on Intelligent Robots and Systems: IROS 2002, Sep. 30-Oct. 4, 2002, EPFL, Lausanne, Switzerland. Piscataway, New Jersey: IEEE; 2002. p. 1766-77.
Mishra et al., Effect of Whole Body Gamma Radiation on Hepatic LDH Activity, Lactate, Pyruvate Concentration and Rate of Oxygen Consumption in *Bufo melanostictus*, Indian J. Exp. Biol., 2002, vol. 40, pp. 1310-1313.
Mitchell et al., Stable Intrachromosomal Biomarkers of Past Exposure to Densely Ionizing Radiation in Several Chromosomes of Exposed Individuals, Radiat. Res., 2004, vol. 162, pp. 257-263.
Moore et al., Novel Biomarkers of Genetic Damage in Humans: Use of Fluorescence in Situ Hybridization to Detect Aneuploidy and Micronuclei in Exfoliated Cells, J. Toxicol. Environ. Health, 1993, vol. 40, pp. 349-357.
Moore et al., Use of the Fluorescent Micronucleus Assay to Detect the Genotoxic Effects of Radiation and Arsenic Exposure in Exfoliated Human Epithelial Cells, Environ. Mol. Mutagen., 1996, vol. 27, pp. 176-184.
Narayanan et al., Alpha Particles Induce the Production of Interleukin-8 by Human Cells, Radiat. Res., 1999, vol. 152, pp. 57-63.
Nusse and Marx, Flow Cytometric Analysis of Micronuclei in Cell Cultures and Human Lymphocytes: Advantages and Disadvantages, Mutat. Res., 1997, vol. 392, pp. 109-115.
Offer et al., A Simple Assay for Frequency of Chromosome Breaks and Loss (Micronuclei) by Flow Cytometry of Human Reticulocytes, Faseb. J., 2004.
Ogawa et al., Radiation-Induced Reactive Oxygen Species Formation Prior to Oxidative DNA Damage in Human Peripheral T Cells, Int. J. Mol. Med., 2003, vol. 11, pp. 149-152.
Paillole and Voisin, Is Micronuclei Yield Variability a Problem for Overexposure Dose Assessment to Ionizing Radiation?, Mutat. Res., 1998, vol. 413, pp. 47-56.
Paris et al., Endothelial Apoptosis as the Primary Lesion Initiating Intestinal Radiation Damage in Mice, Science, 2001, vol. 293, pp. 293-297.
Parton et al., Validation of an Automated Image Analysis Micronucleus Scoring System, Mutat. Res., 1996, vol. 370, pp. 65-73.
Patterson et al., Metabolomics as a Tool for Understanding the Cellular Stress Response of TK6 Cells following Ionizing Radiation Exposure, Abstract Accepted for Presentation at the 13th International Congress of Radiation Research, San Francisco, California, 2007.
Paul et al., Gene Expression Profiles for Radiation Biodosimetry with a Fully Integrated Biochip, Abstract Accepted for Presentation at the 13th International Congress of Radiation Research, San Francisco, CA, 2007.

Pellmar et al., Priority List of Research Areas for Radiological Nuclear Threat Countermeasures, Radiat. Res., 2005, vol. 163, pp. 115-123.
Pilch et al., Characteristics of Gamma-H2AX Foci at DNA Double-Strand Breaks Sites, Biochem. Cell Biol., 2003, vol. 81, pp. 123-129.
Piner et al., Dip-Pen Nanolithography, Science, 1999, vol. 283(5402), pp. 661-663.
Prasanna and Blakely, Premature Chromosome Condensation in Human Resting Peripheral Blood Lymphocytes for Chromosome Aberration Analysis Using Specific Whole-Chromosome DNA Hybridization Probes, Methods Mol. Biol., 2005, vol. 291, pp. 49-57.
Prasanna et al., Cytogenetic Biodosimetry for Radiation Disasters: Recent Advances Technical Report. (AFRRI CD 05-2), Armed Forces Radiobiology Research Institute, 2005.
Reincke et al., Variations in Radioresistance of Rats during the Period of Growth, Int. J. Radiat. Biol. Relat. Stud. Phys. Chem. Med., 1967, vol. 13, pp. 137-146.
Robbins and Zhao, Chronic Oxidative Stress and Radiation-Induced Late Normal Tissue Injury: A Review, Int. J. Radiat. Biol., 2004, vol. 80, pp. 251-259.
Roderick, The Response of Twenty-Seven Inbred Strains of Mice to Daily Doses of Wholebody X-Irradiation, Radiat. Res., 1963, vol. 20, pp. 631-639.
Rogakou et al., DNA Double-Stranded Breaks Induce Histone H2AX Phosphorylation on Serine 139, J. Biol. Chem., 1998, vol. 273, pp. 5858-5868.
Rogakou et al., Megabase Chromatin Domains Involved in DNA Double-Strand Breaks In Vivo, J. Cell. Biol., 1999, vol. 146, pp. 905-916.
Romanyukha et al., Spectrum File Size Optimization for EPR Tooth Dosimetry, Appl. Radiat. Isot., 2005, vol. 62, pp. 197-200.
Rosenthal et al., Calibration and Validation of a Quality Assurance System for 90Sr/90Y Radiation Source Trains, Phys. Med. Biol., 2003, vol. 48, pp. 573-585.
Rothkamm and Lobrich, Evidence for a Lack of DNA Doublestrand Break Repair in Human Cells Exposed to Very Low X-Ray Doses, Proc. Natl. Acad. Sci. USA, 2003, vol. 100, pp. 5057-5062.
Ryman, Arizona Universities Take on Bioterror, The Arizona Republic, Nov. 10, 2006.
Saito et al., Phosphorylation Site Interdependence of Human p53 Post-Translational Modifications in Response to Stress, J. Biol. Chem., 2003, vol. 278, pp. 37536-37544.
Schneidkraut et al., Regional Release of Cyclooxygenase Products after Radiation Exposure of the Rat, J. Appl. Physiol., 1986, vol. 61, pp. 1264-1269.
Schneidkraut et al., Thromboxane and Prostacyclin Synthesis Following Whole Body Irradiation in Rats, J. Appl. Physiol., 1984, vol. 57, pp. 833-838.
Schreiber et al., An Automated Flow Cytometric Micronucleus Assay for Human Lymphocytes, Int. J. Radiat. Biol., 1992, vol. 62, pp. 695-709.
Schunck et al., New Developments in Automated Cytogenetic Imaging: Unattended Scoring of Dicentric Chromosomes, Micronuclei, Single Cell Gel Electrophoresis, and Fluorescence Signals, Cytogenet Genome Res., 2004, vol. 104, pp. 383-389.
Shao et al., Targeted Cytoplasmic Irradiation Induces Bystander Responses, Proc. Natl. Acad. Sci. USA, 2004.
Shi et al., Radial Capillary Array Electrophoresis Microplate and Scanner for High-Performance Nucleic Acid Analysis, Analytical Chemistry, 1999, vol. 71(23), pp. 5354-5361.
Shortt et al., Miniaturized System of a Gas Chromatograph Coupled with a Paul Ion Trap Mass Spectrometer, J. Mass. Spectrom., 2005, vol. 40, pp. 36-42.
Skelley et al., Development and Evaluation of a Microdevice for Amino Acid Biomarker Detection and Analysis on Mars, Proc. Natl. Acad. Sci. U. S. A., 2005, vol. 102, pp. 1041-1046.
Smolewski et al., Micronuclei Assay by Laser Scanning Cytometry, Cytometry, 2001, vol. 45, pp. 19-26.
Snyder, Review of Radiation-Induced Bystander Effects, Hum. Exp. Toxicol, 2004, vol. 23, pp. 87-89.
Soldatova et al., An Ontology for a Robot Scientist, Bioinformatics, 2006, vol. 22(14), pp. 464-471.

(56) References Cited

OTHER PUBLICATIONS

Styles et al., Automation of Mouse Micronucleus Genotoxicity Assay by Laser Scanning Cytometry, Cytometry, 2001, vol. 44, pp. 153-155.
Sugano et al., Nicotine Inhibits UV-Induced Activation of the Apoptotic Pathway, Toxicol. Lett., 2001, vol. 125, pp. 61-65.
Taylor et al., Fully Automated Sample Preparation for Pathogen Detection Performed in a Microfluidic Cassette, Micro Total Analysis Systems, 2001, pp. 670-672.
Thierens et al., Biological Dosimetry using the Micronucleus Assay for Lymphocytes: Interindividual Differences in Dose Response, Health Phys., 1991, vol. 61, pp. 623-630.
Thomas et al., Nucleoplasmic Bridges are a Sensitive Measure of Chromosome Rearrangement in the Cytokinesis-Block Micronucleus Assay, Mutagenesis, 2003, vol. 18, pp. 187-194.
Tian et al., Microfabricated Preconcentrator-Focuser for a Microscale Gas Chromatograph, J. Microelectromech. Sys., 2003, vol. 12, pp. 264-272.
Titenko-Holland et al., Measurement and Characterization of Micronuclei in Exfoliated Human Cells by Fluorescence in Situ Hybridization with a Centromeric Probe, Mutat. Res., 1994, vol. 312, pp. 39-50.
Tolbert et al., Micronuclei and other Nuclear Anomalies in Buccal Smears: Methods Development, Mutat. Res., 1992, vol. 271, pp. 69-77.
Tyburski, Radiation Metabolomics Permits Discovery of Mouse Urinary Biomarkers for Gamma Radiation Exposure, Abstract Accepted for Presentation at the 13th International Congress of Radiation Research, San Francisco, California, 2007.
Umek et al., Electronic Detection of Nucleic Acids—A Versatile Platform for Molecular Diagnostics, Journal of Molecular Diagnostics, 2001, vol. 3(2), pp. 74-84.
Urbanczyk-Wochniak et al., Parallel Analysis of Transcript and Metabolic Profiles: A New Approach in Systems Biology, EMBO Rep., 2003, vol. 4, pp. 989-993.
Varga et al., An Automated Scoring Procedure for the Micronucleus Test by Image Analysis, Mutagenesis, 2004, vol. 19, pp. 391-397.
Verhaegen et al., Scoring of Radiation Induced Micronuclei in Cytokinesis-Blocked Human Lymphocytes by Automated Image Analysis, Cytometry, 1994, vol. 17, pp. 119-127.
Vral et al., The In Vitro Cytokinesis-Block Micronucleus Assay: A Detailed Description of an Improved Slide Preparation Technique for the Automated Detection of Micronuclei in Human Lymphocytes, Mutagenesis, 1994, vol. 9, pp. 439-443.
Wang et al., Optimizing RNA Extraction Yield from Whole Blood for Microarray Gene Expression Analysis, Clinical Biochemistry, 2004, vol. 37, pp. 741-744.
Ward et al., Radiation Mortality in the Chinese Hamster, Cricetulus Griseus, in Relation to Age, Radiat. Res., 1972, vol. 51, pp. 599-607.
Ward etal., Metal-Polymer Hybrid Microchannels for Microfluidic High Gradient Separations, European Cell and Material Journal, 2002, vol. 3, pp. 123-125.
Waters et al., Microchip Device for Cell Lysis, Multiplex PCR Amplification, and Electrophoretic Sizing, Analytical Chemistry, 1998, vol. 70(1), pp. 158-162.
Wilding et al., Manipulation and Flow of Biological-Fluids in Straight Channels Micromachined in Silicon, Clinical Chemistry, 1994, vol. 40(1), pp. 43-47.
Wilding et al., Integrated Cell Isolation and Polymerase Chain Reaction Analysis using Silicon Microfilter Chambers, Analytical Biochemistry, 1998, vol. 257(2), pp. 95-100.
Wilson et al., HPLC-MS-Based Methods for the Study of Metabonomics, J. Chromatogr. B. Analyt. Technol. Biomed. Life Sci., 2005, vol. 817, pp. 67-76.
Wolfram et al., (Iso) Prostaglandins in Saliva Indicate Oxidation Injury after Radioiodine Therapy, Rev. Esp. Med. Nucl., 2004, vol. 23, pp. 183-188.
Wolfram et al., Radioiodine Therapy Induces Dose-Dependent In Vivo Oxidation Injury: Evidence by Increased Isoprostane 8-Epi-PGF(2 Alpha), J. Nucl. Med., 2002, vol. 43, pp. 1254-1258.
Woolley and Mathies, Ultra-High-Speed DNA Fragment Separations Using Microfabricated Capillary Array Electrophoresis Chips, Proceedings of the National Academy of Sciences of the United States of America, 1994, vol. 91(24), pp. 11348-11352.
Woolley et al., Functional Integration of PCR Amplification and Capillary Electrophoresis in a Microfabricated DNA Analysis Device, Analytical Chemistry, 1996, vol. 68(23), vol. 68(23), pp. 4081-4086.
Xue et al., The In Vivo Micronucleus Test in Human Capillary Blood Lymphocytes: Methodological Studies and Effect of Ageing, Mutat. Res., 1992, vol. 278, pp. 259-264.
Yamaoka et al., Simultaneous Quantitative Analysis of Prostaglandins and Thromboxane after Low-Dose X Irradiation, Radiat. Res., 1998, vol. 149, pp. 103-106.
Yang et al., High Sensitivity PCR Assay in Plastic Micro Reactors, Lab on a Chip, 2002, vol. 2(4), pp. 179-187.
Yeoh et al., Classification, Subtype Discovery, and Prediction of Outcome in Pediatric Acute Lymphoblastic Leukemia by Gene Expression Profiling, Cancer Cell, 2002, vol. 1, pp. 133-143.
Yu et al., A Miniaturized and Integrated Plastic Thermal Chemical Reactor for Genetic Analysis, in Micro Total Analysis Systems, The Netherlands, Kluwer Academic Publishers, 2000, pp. 545-548.
Yuen et al., Microchip Module for Blood Sample Preparation and Nucleic Acid Amplification Reactions, Genome Research, 2001, vol. 11(3), pp. 405-412.
Zhan et al., Induction of BAX by Genotoxic Stress in Human Cells Correlates with Normal p53 Status and Apoptosis, Oncogene, 1994, vol. 9, pp. 3743-3751.
Zhan et al., Induction of BCL2 Family Member MCL1 as an Early Response to DNA Damage, Oncogene, 1997, vol. 14, pp. 1031-1039.
Zhan et al., The Apoptosis Associated Gamma-Ray Response of BCL-XL Depends on Normal p53 Function, Oncogene, 1996, vol. 13, pp. 2287-2293.

\* cited by examiner

A

B

A

B

A

B

C

SYSTEMS AND METHODS FOR BIODOSIMETRY WITH BIOCHIP USING GENE EXPRESSION SIGNATURES

CROSS-REFERENCE TO RELATED APPLICATIONS

This application claims priority to and the benefit of PCT International Application Serial No. PCT/US07/76802 filed Aug. 24, 2007; which claims priority to U.S. Provisional Application Ser. No. 60/840,245 filed on Aug. 25, 2006; U.S. Provisional Application Ser. No. 60/942,090 filed Jun. 5, 2007; U.S. Provisional Application Ser. No. 60/954,499 filed Aug. 7, 2007; and U.S. Provisional Application Ser. No. 60/900,296 filed Feb. 8, 2007, each of which is hereby incorporated by reference in its entirety.

STATEMENT REGARDING FEDERALLY SPONSORED RESEARCH OR DEVELOPMENT

This invention was made with Government support under Grant U19A1067773-01 awarded by Department of Health and Human Services. The Government has certain rights in the invention.

INCORPORATION-BY-REFERENCE OF MATERIAL SUBMITTED ON A COMPACT DISC

Not Applicable.

FIELD OF THE INVENTION

The present invention generally relates to radiation biodosimetry.

BACKGROUND

In the event of a radiological or nuclear incident in a large US city, tens or hundreds of thousands of individuals would require rapid dosimetric screening. Mass radiological triage is critical after such a large-scale event because of the need to identify, at an early stage, those individuals who will benefit from medical intervention, and those who will not. Identifying those patients who do not require treatment, the "worried well," will also be crucial in what will certainly be a highly resource-limited scenario. The ability to offer prompt reassurance to the majority of the affected population may also assist in stemming the spread of fear and panic. Identification not only of exposure, but also of dose ranges will also be critical, as the appropriate treatment varies depending on dose. The use of antibiotics, platelet and cytokine treatment (Anno, Young, et al., 2003) can significantly increase survival in the range of 1.5 to 7 Gy, while bone marrow transplantation is most useful between 7 and 10 Gy. At doses above 10 Gy, patients will generally suffer lethal gastrointestinal damage (Hall, 2000). Physical dosimetry will not be readily available for individuals in the general population.

The range of potential biodosimeters have been reviewed by several groups (see e.g., Amundson, Bittner, Trent, Fornace) (16). The following table, adapted from Amundson et al. (16), gives a brief summary of currently possible biodosimeters.

| Assay | Ease of assay | Baseline variability | Detection limit (Gy) | Radiation specificity | Post-exposure longevity | High throughput potential? |
|---|---|---|---|---|---|---|
| ESR/EPR | Difficult | High | 0.1 | Good | years | No |
| Blood counts | Simple, but multiple repeats required | Low | 1 | Good | weeks | No |
| Somatic Mutation | | | | | | |
| gpa by flow cytometry | Simple | Moderate | 1-2 | Good, but only for ½ of population | years | Yes |
| hprt-T-cell cloning | Simple | Moderate | 1-2 | Moderate | months | No |
| Cytogenetics | | | | | | |
| Dicentrics/translocations | Moderate | Moderate | 0.3 | Good | years for translocations | No |
| Micronuclei | Simple | Moderate | 0.3 | Good | months | Yes |
| PCC | Simple | Moderate | 0.3 | Good | days | Yes |
| DSB (γ-H2AX) | Simple | Moderate | 0.3 | Good | days | Yes |
| Genomics | | | | | | |
| Multiplex PCR | Potential to simplify | Low? | 0.2 | Low-Moderate | days | Yes |
| Gene Profiles | Potential to simplify | Low? | 0.2 | Good? | days | Yes |
| Metabolomics | | | | | | |
| Profiling | Potential to be very simple | Low? | ? | ? | days? | Yes |

Early studies using gene expression to classify sample groups have demonstrated the need for sets of multiple biomarkers to attain accurate classification and resistance to noise, with even relatively homogeneous groups requiring from 10 to 200 genes for correct classification (26-28). Work has been done that assesses radiation-induced gene expression signatures, both in vitro (29-35) and in vivo (36), and also suggests that gene expression assays involving a very small number of genes would not be able to accurately assess radiation dose or distinguish radiation exposure from other generalized stress responses. This would rule out, for example, quantitative reverse transcription PCR (QRT-PCR), which, though clearly amenable to automation (37), can realistically only measure the expression of three different genes simultaneously, which would be inadequate for the required radiation specificity.

Thus, there exists a critical need for the development and validation of methods and devices to exploit the biological responses to radiation exposure as a means of obtaining the needed dosimetric information.

SUMMARY

Accordingly, the present application describes devices and methods for high-throughput minimally- or non-invasive radiation biodosimetry, which all take advantage of commonly available biological samples. Various aspects of the invention are directed to biodosimetry with a fully integrated biochip using gene expression signatures. Exposure to ionizing radiation can produce a well-defined dose dependent signature in terms of changes in gene expression. In approaches and devices described herein, such a signature can be used to generate and use a self-contained radiation biodosimeter device, based on, for example, a blood finger stick.

One aspect of the invention provides a biodosimetry method for detecting radiation exposure in a biological sample. The biodosimetry method includes: contacting a biological sample and a biochip; determining a gene expression signature of the biological sample; and correlating the gene expression signature of the biological sample to radiation exposure of the biological sample. According to this method, the biochip measures the expression levels of a plurality of genes, and the gene expression signature includes expression levels of a plurality of radiation responsive genes.

In various embodiments, the biological sample is a blood sample, or white blood cells or lymphocytes isolated from blood. In some configurations, the blood sample is at least about 100 μl, at least about 200 μl, or at least about 200 μl to about 500 μl. In some configurations, the blood sample is a non-degraded blood sample having an average 28S/18S rRNA ratio of at least about 1.5.

In various embodiments, the biological sample was exposed in vivo to a radiation dose at least about 6 hours prior to contact with the biochip. In some configurations, the biological sample was exposed in vivo to a dose of radiation from at least about 6 hours to about 3 days prior to sampling from a subject and/or contact with the biochip. In some configurations, the biological sample was exposed in vivo to a dose of radiation from at least about 6 hours to about 24 hours prior to sampling from a subject and/or contact with the biochip. In various configurations, the blood sample was exposed to a radiation dose of between 0 Gy and about 10 Gy.

In various embodiments, the biological sample includes oligonucleotides. Such oligonucleotides can be isolated and/or purified from the sample on the biochip. In some configurations, immunomagnetic cell separation is used for purification. In some configurations, purification entails cell lysis. In various embodiments, oligonucleotides of the biological sample are amplified on the biochip. In various embodiments, at least a portion of the oligonucleotides of the biological sample (or the amplified oligonucleotides of the biological sample) correspond to oligonucleotides of the array of the biochip. In some configurations, the oligonucleotides of the biological sample are amplified on the biochip via micro-PCR.

In various embodiments, the biochip measures RNA levels. In some configurations, the biochip measures mRNA levels.

In various embodiments, the biochip includes an oligonucleotide array. In some configurations, the array is a printed low-density oligonucleotide array. In some configurations, the array is a cDNA array.

In various embodiments, the gene expression signature includes expression levels of at least about 25 radiation responsive genes. In some configurations, the gene expression signature includes expression levels of at least about 50, 75, 100, 150, 200, 250, 300, 350, 400, or more radiation responsive genes. In various embodiments, a radiation responsive gene produces a technical quality score of at least about 0.3 in a non-radiated biological sample. In some configurations, the technical quality score is at least about 0.4 or 0.5 in a non-radiated biological sample. In various embodiments, a radiation responsive gene produces at least an average 2-fold difference of expression after exposure to ionizing radiation of less than about 5 Gy. In some configurations, an average 2-fold difference of expression is produced after exposure to ionizing radiation of less than about 3 Gy, 2 Gy, or 1 Gy. In various embodiments, a radiation responsive gene produces up to about an average 20-fold difference of expression after exposure to an amount of ionizing radiation at the levels described above. In some configurations, a radiation responsive gene produces up to about an average 10-fold or 5-fold difference of expression after exposure to an amount of ionizing radiation at the levels described above.

In various embodiments, the plurality of radiation responsive genes that make up the gene expression signature include (but are not necessarily limited to) genes selected from the group consisting of: A_23_P255111, A_24_P127462, A_24_P15083, A_24_P585004, A_32_P140501, A_32_P198223, AA516273, ABTB2, ACSL1, ACTA2, ACTN1, ADA, ADM, AES, AF289562, AGRN, AK021751, AK024870, AK024898, AK055915, AK056245, AK092083, AK092875, AK092942, AK097080, AK123333, AK123446, AK123722, AK2, ALDH18A1, ALS2CR13, ANKRA2, ANXA11, ANXA2P1, ANXA4, AP1S2, APBA3, APBB1, APBB3, APOBEC3B, APOBEC3C, APOBEC3F, AQP9, ARHGEF3, ASB2, ASCC3, ASTN2, ATP2A3, ATP8B2, ATP9A, B3GNTL1, BANK1, BAX, BAZ1A, BBC3, BC014395, BC018597, BC022205, BC023989, BC039097, BC045174, BC053363, BC068044, BCL11A, BCL3, BCNP1, BE646426, BF511442, BI828537, BIRC3, BLK, BLR1, BM926530, BTG3, BU540282, BU595528, C11orf21, C11orf24, C11orf54, C12orf42, C12orf45, C12orf5, C14orf151, C16orf30, C17orf49, C19orf36, C1orf24, C1orf57, C20orf24, C3orf26, C8orf38, C9orf102, C9orf127, CA4, CAMK1D, CAMK2D, CARD6, CASP7, CCDC49, CCNB2, CCNG1, CCR7, CD19, CD24, CD40, CD40, CD511705, CD52, CD79A, CD79B, CD83, CD93, CDC25B, CDC42EP2, CDCA7L, CDKN1A, CDKN1A, CDKN1C, CEBPB, CEBPE, CENTB1, CENTG3, CHES1, CHRNA10, CIC, CLEC4E, CLIC3, CLIC4, CN271858, CNOT7, COL27A1, COL9A3, COMTD1, CR595983, CR597075, CR603437, CR616003, CR621698, CR623273, CR627148, CRLF3, CSPP1, CSPP1, CTAGE4, CXCL1, CXCL11, CXCL16, CXCL3, CXCR3, CYLD, DAPK2, DCP1B, DDB2, DDB2, DEF6, DEFA4, DHRS7, DHRS7B, DKFZp434F142, DPEP2, DZIP3, EBI3, EBPL, ECE1, ECE1, EFNB1, EGLN1, EHD1, EI24, EIF2C3, ENAM IGJ, ENST00000253048, ENST00000257897, ENST00000261569, ENST00000288074, ENST00000291567, ENST00000301749, ENST00000323595, ENST00000355807, ENST00000360329, EOMES, FAM105A, FAM113B, FAM62A, FAS, FASLG, FBS1, FBXL16, FBXO22, FBXO22, FBXW7, FCGBP, FCGR1A, FCHO1, FCHSD2, FCRL2, FDXR, FFAR2, FGL2, FHL2, FKSG44, FLII, FLJ11259, FLJ20186, FLJ20647, FLJ35348, FLJ36031, FLJ39575, FLJ40542, FLJ45445, FLRT2, FNDC3B, FOS, FOS, FPR1, FPRL1, FTSJ2, FXYD2, G0S2, GABRA3, GADD45A, GADD45A, GAMT, GCH1, GDF15, GHRL, GLIPR1, GLS2, GNG7, GNG8, GPR109A, GPR109B, GPR160, GPR18, GPR84, GRIPAP1, GRPEL2, GSK3A, GSS, GTF2I, H2-ALPHA, HEBP1, HIP1R, HIST1H2BE, HIST1H2BF, HIST1H2BO, HLA-DOA, HLA-DOB, HNRPC, HSF4, IBRDC3, IER5, IER5L, IFIH1, IFIT2, IFITM1, IGHA1, IGHM, IGHV1-69, IL10RB, IL1B, IL1RN, IL21R, IL8, IRAK3, ISG20L1, ITGA6, ITGAX, JAK3, JMJD2A, KCNJ15, KCNJ2, KCNN4, KCTD12, KENAE, KIAA0284, KIAA0963, KIF2, KIR2DS4, KLF2, KREMEN1, LAMP3, LBR, LEPROTL1, LHPP, LIF, LIG1, LILRA2, LILRB3, LIMK2, LMBRD1, LMNA, LMNB2, LOC158830, LOC201229, LOC256021, LOC283663, LOC284184, LOC339287, LOC349114, LOC399744, LOC401357, LOC649791, LRG1, LY9, MAMDC4, MANSC1, MAP4K2, MAP4K4, MAPKAPK2, MARCKS, MDM2, MDS025, METTL7A, MGAT3, MGC16207, MGC17624, MGC2463, MGC40499, MGC5370, MGST1, MLX, MOBK1B, MPEG1, MPP1, MR1, MXD1, MYC, MYOM2, N28017, NALP12, NBN, NBPF15, NEBL, NEU1, NFKB1, NFKB2, NPAL2, NRBP1, OPLAH, OSBPL3, P2RX5, PACSIN1, PCNA, PDLIM5, PELO, PGCP, PHLDA3, PHPT1, PIK3CD, PKLR, PLAGL2, PLAUR, PLK2, PLK3, PLXNA1, PLXNA2, PLXNB2, PMAIP1, POLH, POPDC2, POU2AF1, PPM1D, PRG1, PRKAB1, PRMT7, PSD4, PTGIR, PTP4A1, PTPN7, PTPNS1, PTPR-CAP, PXN, PYCRL, PYGL, RAFTLIN, RALGPS2, RARRES3, RASA3, RASGEF1A, RASGRP2, RBM14, RBPSUH, RELB, RGS12, RGS14, RGS16, RGS3, RNF24, RP11-298P3.3, RP4-742C19.3, RPS19, RPS27L, RRAD, RRAGD, RUFY3, SAC3D1, SACS, SCN1B, SDCBP, SDF2, SELPLG, SEMA4C, SERPINB1, SERPING1, SERTAD1, SESN1, SESN2, SGK, SH2D1B, SIGIRR, SIGLEC9, SIRPB2, SIT1, SLA, SLBP, SLC11A1, SLC13A2, SLC25A15, SLC27A1, SLC27A3, SLC35F2, SLC4A11, SLC7A6, SLCO4A1, SOCS1, SOD2, SPIB, SPPL2A, SRA1, SRPK2, SSPN, STAT1, SYNGR2, TACC3, TAPBP, TBC1D1, TBXAS1, TCF2, TCF3, TCF4, TCF7, TCL1A, TESK2, TFE3, THC2292160, THC2305303, THC2340838, THC2342491, THC2347909, THC2364440, THC2380864, THC2397697, THC2429167, THC2439183, THC2442819, TKT, TM7SF3, TM9SF4, TMC8, TMEM30A, TMEM68, TNF, TNFAIP2, TNFAIP3, TNFAIP6, TNFRSF10B, TNFRSF12A, TNFRSF18, TNFSF10, TNFSF12, TNFSF4, TNFSF7, TNIP1, TP53AP1, TP53I3, TP53INP1, TRAF4, TRAF5, TREM1, TRIAP1, TRIB2, TRIM22, TRIM32, TRPM6, TSC22D3, TSPAN32, TTC21A, TYMS, UBE2H, UBE2L6, UNQ501, UPB1, UROD, VAT1, VSIG4, WARS, WDFY3, WIG1, XM_499519, XPC, YWHAB, YWHAZ, ZC3H12A, ZC3H7A, ZFAND2B, ZNF195, ZNF25, ZNF337, ZNF541, ZNF625, ZNF79, ZNF92, ZUBR1, and αH2AX.

In some configurations, genes of the gene expression signature include genes selected from: A_23_P255111, A_24_P127462, A_24_P127462, A_24_P15083, A_24_P15083, A_24_P585004, A_32_P140501, A_32_P198223, AA516273, ACSL1, ADM, AK092942, AK092942, AK097080, AK097080, AK123446, AK123722, APOBEC3B, AQP9, ASB2, ASCC3, ASCC3, ASCC3, BAX, BAX, BAX, BAX, BBC3, BBC3, BBC3, BBC3, BC068044, BCNP1, BE646426, BE646426, BI828537, BLK, BLR1, C11orf54, C12orf5, C12orf5, C20orf24, C20orf24, C9orf102, CAMK2D, CARD6, CD19, CD24, CD79B, CDKN1A, CDKN1A, CEBPB, CEBPE, CLEC4E, CR597075, CR627148, CSPP1, CSPP1, CXCL1, CXCL16, DDB2, DDB2, DHRS7B, DKFZp434F142, ECE1, EGLN1, ENST00000323595, ENST00000355807, ENST00000355807, FAM113B, FBXO22, FBXO22, FDXR, FDXR, FFAR2, FKSG44, FLJ11259, FLJ11259, FLJ36031, FLJ39575, FLJ40542, FLJ45445, FOS, FPR1, FPRL1, FTSJ2, G0S2, GABRA3, GADD45A, GADD45A, GPR109A, GPR109B, HIP1R, HIST1H2BE, HIST1H2BF, HIST1H2BO, HLA-DOA, HLA-DOB, IBRDC3, IER5, IER5, IGHA1, IGHM, IL10RB, IL10RB, IL1B, IL1RN, IRAK3, ISG20I, ISG20L1, ITGA6, ITGAX, ITGAX, KCNJ15, KCNJ2, KIAA0963, KREMEN1, LOC283663, LOC339287, LOC349114, LOC349114, LOC349114, LOC399744, LOC399744, LOC401357, LOC401357, LRG1, MGC40499, MGC5370, MOBK1B, MOBK1B, MXD1, NALP12, NEU1, OPLAH, OPLAH, P2RX5, PCNA, PHLDA3, PHPT1, PLAUR, PLK2, PLK3, POU2AF1, PPM1D, PRG1, PTP4A1, PTPNS1, PXN, RNF24, RPS27L, RRAGD, SDCBP, SDF2, SEMA4C, SERPINB1, SGK, SIGLEC9, SIRPB2, SLA, SPIB, TCF7, TCL1A, THC2340838, THC2397697, THC2429167, THC2439183, TNFAIP6, TNFRSF10B, TNFSF7, TP53I3, TP53INP1, TREM1, TRIAP1, TRIM22, TRPM6, UPB1, WDFY3, XM_499519, XPC, XPC, and ZNF2.

In some configurations, genes of the gene expression signature include genes selected from: ABTB2, ACTA2, ACTN1, ADA, AES, AF289562, AGRN, AK021751, AK024870, AK024898, AK055915, AK056245, AK092083, AK092875, AK123333, AK123722, AK2, ALDH18A1, ALS2CR13, ANKRA2, ANXA11, ANXA2P1, ANXA4, AP1S2, APBA3, APBB1, APBB3, APOBEC3C, APOBEC3F, ARHGEF3, ASCC3, ASTN2, ATP2A3, ATP8B2, ATP9A, B3GNTL1, BANK1, BAX, BAZ1A, BBC3, BC014395, BC018597, BC022205, BC023989, BC039097, BC045174, BC053363, BCL11A, BCL3, BCNP1, BE646426, BF511442, BIRC3, BM926530, BTG3, BU540282, BU595528, C11orf21, C11orf24, C12orf42, C12orf45, C12orf5, C14orf151, C16orf30, C17orf49, C19orf36, C1orf24, C1orf57, C3orf26, C8orf38, C9orf127, CA4, CAMK1D, CASP7, CCDC49, CCNG1, CCPG1, CCR7, CD40, CD511705, CD52, CD79A, CD83, CD93, CDC25B, CDC42EP2, CDCA7L, CDKN1A, CDKN1C, CENTB1, CENTG3, CHES1, CHRNA10, CIC, CLIC3, CLIC4, CN271858, CNOT7, COL27A1, COL9A3, COMTD1, CR595983, CR603437, CR616003, CR621698, CR623273, CRLF3, CTAGE4, CXCR3, CYLD, DAPK2, DCP1B, DDB2, DEF6, DHRS7, DPEP2, DZIP3, EBI3, EBPL, ECE1, EFNB1, EHD1, EI24, EIF2C3, ENST00000253048, ENST00000257897, ENST00000261569, ENST00000288074, ENST00000291567, ENST00000301749, ENST00000360329, EOMES, FAM105A, FAM62A, FAS, FASLG, FBS1, FBXL16, FBXO22, FBXW7, FCGBP, FCHO1, FCHSD2, FCRL2, FDXR, FHL2, FLII, FLJ11259, FLJ20186, FLJ20647, FLJ35348, FLJ40542, FNDC3B, FTSJ2, FXYD2, GADD45A, GAMT, GDF15, GHRL, GLIPR1, GLS2, GNG7, GNG8, GPR160, GPR18, GPR84, GRIPAP1, GRPEL2, GSK3A, GSS, GTF2I, H2-ALPHA, HEBP1, HNRPC, IER5, IER5L, IFIH1, IFITM1, IGHM, IGHV1-69, IL21R, ISG20L1, JAK3, JMJD2A, KCNJ2, KCNN4, KCTD12, KENAE, KIAA0284, KIR2DS4, KLF2, LAMP3, LBR, LEPROTL1, LHPP, LIF, LIG1, LIMK2, LMBRD1, LMNA, LMNB2, LOC158830, LOC201229, LOC256021, LOC284184, LOC649791, LY9, MAMDC4, MANSC1, MAP4K2, MAP4K4, MAPKAPK2, MARCKS, MDM2, MDS025, METTL7A, MGAT3, MGC16207, MGC17624, MGC2463, MGC5370, MGSTI, MLX, MPEG1, MPP1, MR1, MYC, MYOM2, N28017, NBN, NBPF15, NFKB1, NFKB2, NPAL2, NRBP1, OSBPL3, P2RX5, PACSIN1, PCNA, PDLIM5, PELO, PGCP, PHLDA3, PHPT1, PIK3CD, PLAGL2, PLK2, PLK3, PLXNA1, PLXNA2, PLXNB2, PMAIP1, POLH, POPDC2, PPM1D, PRKAB1, PRMT7, PSD4, PTGIR, PTP4A1, PTPN7, PTPRCAP, PYCRL, PYGL, RAFTLIN, RALGPS2, RASA3, RASGEF1A, RASGRP2, RBM14, RBPSUH, RELB, RGS12, RGS14, RGS16, RGS3, RP11, 298P3.3, RP4-742C19.3, RPS19, RPS27L, RRAD, RUFY3, SAC3D1, SACS, SELPLG, SERPINB1, SERTAD1, SESN1, SESN2, SH2D1B, SIGIRR, SIT1, SLBP, SLBP, SLC11A1, SLC13A2, SLC25A15, SLC27A1, SLC27A3, SLC35F2, SLC4A11, SLC7A6, SLCO4A1, SOCS1, SOD2, SPPL2A, SRA1, SRPK2, SSPN, SYNGR2, TACC3, TAPBP, TBC1D1, TBXAS1, TCF3, TCF4, TCL1A, TESK2, TFE3, THC2292160, THC2305303, THC2340838, THC2342491, THC2347909, THC2364440, THC2380864, THC2397697, THC2429167, THC2439183, THC2442819, TKT, TM7SF3, TM9SF4, TMC8, TMEM30A, TMEM68, TNFAIP2, TNFAIP3, TNFAIP6, TNFRSF10B, TNFRSF12A, TNFRSF18, TNFSF12, TNFSF4, TNFSF7, TNIP1, TP53AP1, TRAF4, TRAF5, TRIAP1, TRIB2, TRIM22, TRIM32, TSC22D3, TSPAN32, TTC21A, TYMS, UBE2H, UNQ501, UROD, VAT1, VSIG4, WIG1, XPC, YWHAB, YWHAZ, ZC3H12A, ZC3H7A, ZFAND2B, ZNF195, ZNF337, ZNF541, ZNF625, ZNF79, ZNF92, and ZUBR1.

In some configurations, genes of the gene expression signature include genes selected from: CDKN1A, CD40, NEBL, GADD45A, CXCL11, HSF4, CXCL3, FLRT2, TNFSF10, IL8, TNF, ENAM IGJ, XPC, KIF2, SERPING1, DDB2, IFIT2, LILRB3, GCH1, FOS, CCNB2, LILRA2, RARRES3, SCN1B, UBE2L6, FCGR1A, FGL2, VSIG4, PKLR, STAT1, WARS, TCF2, DEFA4, and αH2AX.

In various embodiments, the plurality of radiation responsive genes of the gene expression signature include genes that undergo dose dependent changes in expression after exposure to ionizing radiation.

In various embodiments, determination of the gene expression signature entails detecting hybridization of oligonucleotides of the biological sample to oligonucleotides of the biochip array. In some configurations, the average length of oligonucleotides of the biochip array is about 50 to about 80 nucleotides. In some configurations, hybridization is measured using an electrochemical hybridization assay on the biochip. In some configurations, results of the electrochemical hybridization assay are detected using a fluorescence scanner. In some configurations, detecting hybridization of oligonucleotides of the biological sample to oligonucleotides of the biochip occurs in real-time.

In various embodiments, oligonucleotides of the biochip array are in a biochannel-configuration on the biochip. In some configurations, the biological sample is fluidically transported along the biochannel of the biochip, and hybridization of the oligonucleotides of the biological sample to the oligonucleotides of the biochip occurs in the biochannel.

In various embodiments, determining a gene expression signature of the biological sample includes utilization of the acoustic micro-streaming technique.

In various embodiments, correlating the gene expression signature exposure to radiation includes correlating the gene expression signature exposure to a dosage of radiation exposure. In some configurations, the correlated dosage radiation exposure ranges from about 0 Gy to about 10 Gy, or to about 12 Gy or even higher. In some configurations, the correlated dosage radiation exposure is about 0 Gy to about 2 Gy. In some configurations, the correlated dosage radiation exposure is about 2 Gy to about 4 Gy. In some configurations, the correlated dosage radiation exposure is about 4 Gy to about 6 Gy. In some configurations, the correlated dosage radiation exposure is about 6 Gy to about 8 Gy. In some configurations, the correlated dosage radiation exposure is about 8 Gy to about 10 Gy. In various embodiments, correlating the gene expression signature exposure to radiation comprises correlating the gene expression signature exposure to a radiation injury.

Another aspect of the invention is directed to a portable biodosimetry device for detecting radiation exposure. The portable biodosimetry device includes a microfluidic biochip. The microfluidic biochip of the portable biodosimetry device includes a biological sample collection module; an oligonucleotide extraction module; a hybridization channel module; a power module; and a control module. In accord with this device, the hybridization channel module includes an oligonucleotide array, which contains a plurality of oligonucleotides that each will hybridize under stringent conditions to a gene expression product of a radiation responsive gene. In accord with this device, the biological sample collection module, the oligonucleotide extraction module, and the hybridization channel module are fluidically coupled. In various embodiments, the portable biodosimetry device is about 300 cm by about 500 cm.

In various embodiments, the biological sample collection module, the oligonucleotide extraction module, and the hybridization channel module are operably and detachably coupled to the portable biodosimetry device. In some configurations, the biological sample collection module, the oligonucleotide extraction module, and the hybridization channel module are included in a cartridge and the cartridge is operably and detachably coupled to the portable biodosimetry device.

In various embodiments, the portable biodosimetry device also includes a reagent storage module. In some configurations, the reagent storage module is operably and detachably coupled to the portable biodosimetry device. In some configurations, the reagent storage module comprises a dry reagent and a means for solubilizing the dry reagent. In some configurations, the reagent storage module includes aqueous reagents. In some configurations, the reagent storage module includes a reagent pouch operably and detachably coupled to the reagent storage module.

In various embodiments, the portable biodosimetry device also includes a hybridization detection module. In some configurations, the hybridization detection module is operably and detachably coupled to the portable biodosimetry device.

In various embodiments, the microfluidic biochip is a cyclo-olefinic co-polymer biochannel chip. In various embodiments, the microfluidic biochip comprises a thermally actuated paraffin-based microvalve.

In various embodiments, the biological sample collection module collects a blood sample from a mammalian subject. In some configurations, the blood sample is at least about 100 µl to about 500 µl. In various embodiments, the biological sample collection module includes a means for collecting a biological sample from a mammalian subject. In some configurations, the biological sample collection module comprises a needle, a microneedle, or a lasette. In some configurations, the biological sample collection module comprises a capillary-force collection system. In various embodiments, the biological sample collection module comprises a channel, a sample chamber, and a pump.

In various embodiments, the oligonucleotide extraction module extracts RNA from a biological sample. In some configurations, the oligonucleotide extraction module includes a means for cell capture, cell concentration, cell purification, and/or cell lysis. In some configurations, the oligonucleotide extraction module includes a means for isolating oligonucleotides of the biological sample. In some configurations, the oligonucleotide extraction module includes a means for amplifying the isolated oligonucleotides of the biological sample. In some configurations, the oligonucleotide extraction module includes an immunogenic separation system. In some configurations, the oligonucleotide extraction module comprises a magnetic separation system.

In various embodiments, the hybridization channel module is a hybridization microchannel module. In various embodiments, the hybridization channel module is a hybridization nanochannel module. In various embodiments; the oligonucleotides of the array are immobilized with a 3-dimensional amino-reactive gel-coating of the hybridization channel module. In some configurations, the hybridization channel module includes an electrochemical or thermopneumatic liquid pump for fluidically transporting a hybridization solution across the oligonucleotide array. In some configurations, the hybridization channel module includes a means for detecting hybridization of oligonucleotides of a biological sample with oligonucleotides of the oligonucleotide array. In some configurations, detecting hybridization occurs in real-time.

In various embodiments, the oligonucleotide array is a printed low-density oligonucleotide microarray. In some configurations, the oligonucleotide array is a cDNA microarray. In some configurations, the oligonucleotide array comprises a non-porous solid support. In some configurations, the non-porous solid support is a glass non-porous solid support. In some configurations, the oligonucleotide array comprises a silicon-based solid support produced by photolithographic masking. In some configurations, the oligonucleotide array comprises a cyclo-olefinic copolymer solid support. In some configurations, the oligonucleotide array includes at least about 25, at least about 50, at least about 75, at least about 100, or at least about 200 oligonucleotides, each corresponding to a gene expression product of a radiation responsive gene. In some configurations, there are an average of about 50 to about 80 nucleotides in an oligonucleotide of the oligonucleotide array.

In various embodiments, oligonucleotides of the array will hybridize under stringent conditions to gene expression products of radiation responsive genes. Such radiation responsive genes can be selected from: A_23_P255111, A_24_P127462, A_24_P15083, A_24_P585004, A32_P140501, A_32_P198223, AA516273, ABTB2, ACSL1, ACTA2, ACTN1, ADA, ADM, AES, AF289562, AGRN, AK021751, AK024870, AK024898, AK055915, AK056245, AK092083, AK092875, AK092942, AK097080, AK123333, AK123446, AK123722, AK2, ALDH18A1, ALS2CR13, ANKRA2, ANXA11, ANXA2P1, ANXA4, AP1S2, APBA3, APBB1, APBB3, APOBEC3B, APOBEC3C, APOBEC3F, AQP9, ARHGEF3, ASB2, ASCC3, ASTN2, ATP2A3, ATP8B2, ATP9A, B3GNTL1, BANK1, BAX, BAZ1A, BBC3, BC014395, BC018597, BC022205, BC023989, BC039097, BC045174, BC053363, BC068044, BCL11A, BCL3, BCNP1, BE646426, BF511442, B1828537, BIRC3, BLK, BLR1, BM926530, BTG3, BU540282, BU595528, C11orf21, C11orf24, C11orf54, C12orf42, C12orf45, C12orf5, C14orf151, C16orf30, C17orf49, C19orf36, C1orf24, C1orf57, C20orf24, C3orf26, C8orf38, C9orf102, C9orf127, CA4, CAMK1D, CAMK2D, CARD6, CASP7, CCDC49, CCNB2, CCNG1, CCR7, CD19, CD24, CD40, CD40, CD511705, CD52, CD79A, CD79B, CD83, CD93, CDC25B, CDC42EP2, CDCA7L, CDKN1A, CDKN1A, CDKN1C, CEBPB, CEBPE, CENTB1, CENTG3, CHES1, CHRNA10, CIC, CLEC4E, CLIC3, CLIC4, CN271858, CNOT7, COL27A1, COL9A3, COMTD1, CR595983, CR597075, CR603437, CR616003, CR621698, CR623273, CR627148, CRLF3, CSPP1, CSPP1, CTAGE4, CXCL1, CXCL11, CXCL16, CXCL3, CXCR3, CYLD, DAPK2, DCP1B, DDB2, DDB2, DEF6, DEFA4, DHRS7, DHRS7B, DKFZp434F142, DPEP2, DZIP3, EBI3, EBPL, ECE1, ECE1, EFNB1, EGLN1, EHD1, EI24, EIF2C3, ENAM IGJ, ENST00000253048, ENST00000257897, ENST00000261569, ENST00000288074, ENST00000291567, ENST00000301749, ENST00000323595, ENST00000355807, ENST00000360329, EOMES, FAM105A, FAM113B, FAM62A, FAS, FASLG, FBS1, FBXL16, FBXO22, FBXO22, FBXW7, FCGBP, FCGR1A, FCHO1, FCHSD2, FCRL2, FDXR, FFAR2, FGL2, FHL2, FKSG44, FLII, FLJ11259, FLJ20186, FLJ20647, FLJ35348, FLJ36031, FLJ39575, FLJ40542, FLJ45445, FLRT2, FNDC3B, FOS, FOS, FPR1, FPRL1, FTSJ2, FXYD2, G0S2, GABRA3, GADD45A, GADD45A, GAMT, GCH1, GDF15, GHRL, GLIPR1, GLS2, GNG7, GNG8, GPR109A, GPR109B, GPR160, GPR18, GPR84, GRIPAP1, GRPEL2, GSK3A, GSS, GTF2I, H2-ALPHA, HEBP1, HIP1R, HIST1H2BE, HIST1H2BF, HIST1H2BO, HLA-DOA, HLA-DOB, HNRPC, HSF4, IBRDC3, IER5, IER5L, IFIH1, IFIT2, IFITM1, IGHA1, IGHM, IGHV1-69, IL10RB, IL1B, IL1RN, IL2IR, IL8, IRAK3, ISG20L1, ITGA6, ITGAX, JAK3, JMJD2A, KCNJ15, KCNJ2, KCNN4, KCTD12, KENAE, KIAA0284, KIAA0963, KIF2, KIR2DS4, KLF2, KREMEN1, LAMP3, LBR, LEPROTL1, LHPP, LIF, LIG1, LILRA2, LILRB3, LIMK2, LMBRD1, LMNA, LMNB2, LOC158830, LOC201229, LOC256021, LOC283663, LOC284184, LOC339287, LOC349114, LOC399744, LOC401357, LOC649791, LRG1, LY9, MAMDC4, MANSC1, MAP4K2, MAP4K4, MAPKAPK2, MARCKS, MDM2, MDS025, METTL7A, MGAT3, MGC16207, MGC17624, MGC2463, MGC40499, MGC5370, MGST1, MLX, MOBKIB, MPEG1, MPP1, MR1, MXD1, MYC, MYOM2, N28017, NALP12, NBN, NBPF15, NEBL, NEU1, NFKB1, NFKB2, NPAL2, NRBP1, OPLAH, OSBPL3, P2RX5, PACSIN1, PCNA, PDLIM5, PELO, PGCP, PHLDA3, PHPT1, PIK3CD, PKLR, PLAGL2, PLAUR, PLK2, PLK3, PLXNA1, PLXNA2, PLXNB2, PMAIP1, POLH, POPDC2, POU2AF1, PPM1D, PRG1, PRKAB1, PRMT7, PSD4, PTGIR, PTP4A1, PTPN7, PTPNS1, PTPRCAP, PXN, PYCRL, PYGL, RAFTLIN, RALGPS2, RARRES3, RASA3, RASGEF1A, RASGRP2, RBM14, RBPSUH, RELB, RGS12, RGS14, RGS16, RGS3, RNF24, RP11-298P3.3, RP4-742C19.3, RPS19, RPS27L, RRAD, RRAGD, RUFY3, SAC3D1, SACS, SCN1B, SDCBP, SDF2, SELPLG, SEMA4C, SERPINB1, SERPING1, SERTAD1, SESN1, SESN2, SGK, SH2D1B, SIGIRR, SIGLEC9, SIRPB2, SIT1, SLA, SLBP, SLC11A1, SLC13A2, SLC25A15, SLC27A1, SLC27A3, SLC35F2, SLC4A11, SLC7A6, SLCO4A1, SOCS1, SOD2, SPIB, SPPL2A, SRA1, SRPK2, SSPN, STAT1, SYNGR2, TACC3, TAPBP, TBC1D1, TBXAS1, TCF2, TCF3, TCF4, TCF7, TCL1A, TESK2, TFE3, THC2292160, THC2305303, THC2340838, THC2342491, THC2347909, THC2364440, THC2380864, THC2397697, THC2429167, THC2439183, THC2442819, TKT, TM7SF3, TM9SF4, TMC8, TMEM30A, TMEM68, TNF, TNFAIP2, TNFAIP3, TNFAIP6, TNFRSF10B, TNFRSF12A, TNFRSF18, TNFSF10, TNFSF12, TNFSF4, TNFSF7, TNIP1, TP53AP1, TP53I3, TP53INP1, TRAF4, TRAF5, TREM1, TRIAP1, TRIB2, TRIM22, TRIM32, TRPM6, TSC22D3, TSPAN32, TTC21A, TYMS, UBE2H, UBE2L6, UNQ501, UPB1, UROD, VAT1, VSIG4, WARS, WDFY3, WIG1, XM_499519, XPC, YWHAB, YWHAZ, ZC3H12A, ZC3H7A, ZFAND2B, ZNF195, ZNF25, ZNF337, ZNF541, ZNF625, ZNF79, ZNF92, ZUBR1, and αH2AX.

In some configurations, the array oligonucleotides that hybridize under stringent conditions to gene expression products of radiation responsive genes are selected from: A_23_P255111, A_24_P127462, A24_P127462, A_24_P15083, A_24_P585004, A_32_P140501, A_32_P198223, AA516273, ACSL1, ADM, AK092942, AK092942, AK097080, AK097080, AK123446, AK123722, APOBEC3B, AQP9, ASB2, ASCC3, ASCC3, ASCC3, BAX, BAX, BAX, BAX, BBC3, BBC3, BBC3, BBC3, BC068044, BCNP1, BE646426, BE646426, BI828537, BLK, BLR1, C11orf54, C12orf5, C12orf5, C20orf24, C20orf24, C9orf102, CAMK2D, CARD6, CD19, CD24, CD79B, CDKN1A, CDKN1A, CEBPB, CEBPE, CLEC4E, CR597075, CR627148, CSPP1, CSPP1, CXCL1, CXCL16, DDB2, DDB2, DHRS7B, DKFZp434F142, ECE1, EGLN1, ENST00000323595, ENST00000355807, ENST00000355807, FAM113B, FBXO22, FBXO22, FDXR, FDXR, FFAR2, FKSG44, FLJ11259, FLJ11259, FLJ36031, FLJ39575, FLJ40542, FLJ45445, FOS, FPR1, FPRL1, FTSJ2, G0S2, GABRA3, GADD45A, GADD45A, GPR109A, GPR109B, HIP1R, HIST1H2BE, HIST1H2BF, HIST1H2BO, HLA-DOA, HLA-DOB, IBRDC3, IER5, IER5, IGHA1, IGHM, IL10RB, IL10RB, IL1B, IL1RN, IRAK3, ISG20L1, ISG20L1, ITGA6, ITGAX, ITGAX, KCNJ15, KCNJ2, KIAA0963, KREMEN1, LOC283663, LOC339287, LOC349114, LOC349114, LOC349114, LOC399744, LOC399744, LOC401357, LOC401357, LRG1, MGC40499, MGC5370, MOBK1B, MOBK1B, MXD1, NALP12, NEU1, OPLAH, OPLAH, P2RX5, PCNA, PHLDA3, PHPT1, PLAUR, PLK2, PLK3, POU2AF1, PPM1D, PRG1, PTP4A1, PTPNS1, PXN, RNF24, RPS27L, RRAGD, SDCBP, SDF2, SEMA4C, SERPINB1, SGK, SIGLEC9, SIRPB2, SLA, SPIB, TCF7, TCL1A, THC2340838, THC2397697, THC2429167, THC2439183, TNFAIP6, TNFRSF10B, TNFSF7, TP53I3, TP53INP1, TREM1, TRIAP1, TRIM22, TRPM6, UPB1, WDFY3, XM_499519, XPC, XPC, and ZNF2.

In some configurations, the array oligonucleotides that hybridize under stringent conditions to gene expression products of radiation responsive genes are selected from: ABTB2, ACTA2, ACTN1, ADA, AES, AF289562, AGRN, AK021751, AK024870, AK024898, AK055915, AK056245, AK092083, AK092875, AK123333, AK123722, AK2, ALDH18A1, ALS2CR13, ANKRA2, ANXA11, ANXA2P1, ANXA4, AP1S2, APBA3, APBB1, APBB3, APOBEC3C, APOBEC3F, ARHGEF3, ASCC3, ASTN2, ATP2A3, ATP8B2, ATP9A, B3GNTL1, BANK1, BAX, BAZ1A, BBC3, BC014395, BC018597, BC022205, BC023989, BC039097, BC045174, BC053363, BCL11A, BCL3, BCNP1, BE646426, BF511442, BIRC3, BM926530, BTG3, BU540282, BU595528, C11orf21, C11orf24, C12orf42, C12orf45, C12orf5, C14orf151, C16orf30, C17orf49, C19orf36, C1orf24, C1orf57, C3orf26, C8orf38, C9orf127, CA4, CAMK1D, CASP7, CCDC49, CCNG1, CCPG1, CCR7, CD40, CD511705, CD52, CD79A, CD83, CD93, CDC25B, CDC42EP2, CDCA7L, CDKN1A, CDKN1C, CENTB1, CENTG3, CHES1, CHRNA10, CIC, CLIC3, CLIC4, CN271858, CNOT7, COL27A1, COL9A3, COMTD1, CR595983, CR603437, CR616003, CR621698, CR623273, CRLF3, CTAGE4, CXCR3, CYLD, DAPK2, DCP1B, DDB2, DEF6, DHRS7, DPEP2, DZIP3, EBI3, EBPL, ECE1, EFNB1, EHD1, EI24, EIF2C3, ENST00000253048, ENST00000257897, ENST00000261569, ENST00000288074, ENST00000291567, ENST00000301749, ENST00000360329, EOMES, FAM105A, FAM62A, FAS, FASLG, FBS1, FBXL16, FBXO22, FBXW7, FCGBP, FCHO1, FCHSD2, FCRL2, FDXR, FHL2, FLII, FLJ11259, FLJ20186, FLJ20647, FLJ35348, FLJ40542, FNDC3B, FTSJ2, FXYD2, GADD45A, GAMT, GDF15, GHRL, GLIPR1, GLS2, GNG7, GNG8, GPR160, GPR18, GPR84, GRIPAP1, GRPEL2, GSK3A, GSS, GTF2I, H2-ALPHA, HEBP1, HNRPC, IER5, IER5L, IFIH1, IFITM1, IGHM, IGHV1-69, IL21R, ISG20L1, JAK3, JMJD2A, KCNJ2, KCNN4, KCTD12, KENAE, KIAA0284, KIR2DS4, KLF2, LAMP3, LBR, LEPROTL1, LHPP, LIF, LIG1, LIMK2, LMBRD1, LMNA, LMNB2, LOC158830, LOC201229, LOC256021, LOC284184, LOC649791, LY9, MAMDC4, MANSC1, MAP4K2, MAP4K4, MAPKAPK2, MARCKS, MDM2, MDS025, METTL7A, MGAT3, MGC16207, MGC17624, MGC2463, MGC5370, MGST1, MLX, MPEG1, MPP1, MR1, MYC, MYOM2, N28017, NBN, NBPF15, NFKB1, NFKB2, NPAL2, NRBP1, OSBPL3, P2RX5, PACSIN1, PCNA, PDLIM5, PELO, PGCP, PHLDA3, PHPT1, PIK3CD, PLAGL2, PLK2, PLK3, PLXNA1, PLXNA2, PLXNB2, PMAIP1, POLH, POPDC2, PPM1D, PRKAB1, PRMT7, PSD4, PTGIR, PTP4A1, PTPN7, PTPRCAP, PYCRL, PYGL, RAFTLIN, RALGPS2, RASA3, RASGEF1A, RASGRP2, RBM14, RBPSUH, RELB, RGS12, RGS14, RGS16, RGS3, RP11, 298P3.3, RP4-742C19.3, RPS19, RPS27L, RRAD, RUFY3, SAC3D1, SACS, SELPLG, SERPINB1, SERTAD1, SESN1, SESN2, SH2D1B, SIGIRR, SIT1, SLBP, SLBP, SLC11A1, SLC13A2, SLC25A15, SLC27A1, SLC27A3, SLC35F2, SLC4A11, SLC7A6, SLCO4A1, SOCS1, SOD2, SPPL2A, SRA1, SRPK2, SSPN, SYNGR2, TACC3, TAPBP, TBCID1, TBXAS1, TCF3, TCF4, TCL1A, TESK2, TFE3, THC2292160, THC2305303, THC2340838, THC2342491, THC2347909, THC2364440, THC2380864, THC2397697, THC2429167, THC2439183, THC2442819, TKT, TM7SF3, TM9SF4, TMC8, TMEM30A, TMEM68, TNFAIP2, TNFAIP3, TNFAIP6, TNFRSF10B, TNFRSF12A, TNFRSF18, TNFSF12, TNFSF4, TNFSF7, TNIP1, TP53AP1, TRAF4, TRAF5, TRIAP1, TRIB2, TRIM22, TRIM32, TSC22D3, TSPAN32, TTC21A, TYMS, UBE2H, UNQ501, UROD, VAT1, VSIG4, WIG1, XPC, YWHAB, YWHAZ, ZC3H12A, ZC3H7A, ZFAND2B, ZNF195, ZNF337, ZNF541, ZNF625, ZNF79, ZNF92, and ZUBR1.

In some configurations, the array oligonucleotides that hybridize under stringent conditions to gene expression products of radiation responsive genes are selected from: CDKN1A, CD40, NEBL, GADD45A, CXCL11, HSF4, CXCL3, FLRT2, TNFSF10, IL8, TNF, ENAM IGJ, XPC, KIF2, SERPING1, DDB2, IFIT2, LILRB3, GCH1, FOS, CCNB2, LILRA2, RARRES3, SCN1B, UBE2L6, FCGR1A, FGL2, VSIG4, PKLR, STAT1, WARS, TCF2, DEFA4, and αH2AX.

In various embodiments, the control module includes a means for user input. In various embodiments, the control module includes a display for communicating information to the user. In various embodiments, the control module includes an input and/or output connection for data transfer. In some configurations, the input and/or output connection is a wireless connection, an electrical connection, or both. In various embodiments, the control module is operably coupled to the power module.

Another aspect of the invention is directed to a device for determining radiation exposure of an organism. The device for determining radiation exposure of an organism includes a microfluidic chip adapted to contain a biological sample from the organism; a microlens coupled to the microfluidic chip; an imaging element coupled to the microlens adapted to capture an image of the biological sample; and a processor adapted to analyze the image for possible radiation exposure of the organism.

In various embodiments, the device further includes a light source coupled to the microlens. In some configurations, the device further includes an aperture between the microlens and the imaging element. In some configurations, the aperture is less than 5 mm in diameter; for example, about 1 mm in diameter. In various embodiments, the microfluidic chip is further adapted to apply a reagent to the biological sample. In various embodiments, the microfluidic chip is adapted to contain at least one biological sample from at least one organism. In various embodiments, the imaging element is a charge-coupled device sensor. In various embodiments, the device further includes a memory for storing the image. In various embodiments, the microfluidic chip includes a micropump. In some configurations, the micropump is electrochemically operated. In some configurations, the micropump is pneumatically operated. In some configurations, the micropump is thermopneumatically operated. In various embodiments, the microfluidic chip includes a valve. In various embodiments, the microfluidic chip includes a mixer. In various embodiments, the microfluidic chip includes a heater. In some configurations, the heater includes a diode. In various embodiments, the microfluidic chip includes at least one cDNA microarray sensor. In various embodiments, the microfluidic chip includes at least one oligonucleotide array. In various embodiments, the microfluidic chip is comprised of an optically transparent material. In various embodiments, the microfluidic chip includes a blood sample collection device. In various embodiments, the microfluidic chip includes an RNA extraction device. In some configurations, the microfluidic chip includes means for measuring RNA levels, for example, mRNA levels. In various embodiments, the microfluidic chip includes at least one thermally-activated paraffin based microvalve. In various embodiments, the microfluidic chip includes a power source. In various embodiments, the microfluidic chip includes a means for performing a polymerase chain reaction assay. In various embodiments, the microfluidic chip includes a means for performing a DNA hybridization assay. In various embodiments, the microfluidic chip includes a means for performing a DNA detection assay.

Another aspect of the invention is directed to a method of determining radiation exposure of an organism. The method of determining radiation exposure of an organism includes applying a light source to the microfluidic chip; capturing an image of the microfluidic chip using an imaging element and a microlens wherein the microlens is coupled to the microfluidic chip; and analyzing the image to determine radiation exposure of the organism.

In various embodiments, the method also includes performing a polymerase chain reaction assay using the microfluidic chip. In various embodiments, the method also includes performing a DNA hybridization assay using the microfluidic chip. In various embodiments, the method also includes performing a DNA detection assay using the microfluidic chip. In various embodiments, the method also includes adding a reagent to the biological sample in the microfluidic chip. In various embodiments, the method also includes coupling a lens to the microfluidic chip. In various embodiments, the method also includes coupling an imaging element to the microfluidic chip. In some configurations, the imaging element is a charge-coupled device sensor. In various embodiments, a processor is used to analyze the image. In various embodiments, the method also includes storing the image in a memory. In various embodiments, analyzing the image includes counting the number of cells shown in the image. In various embodiments, analyzing the image includes counting the number of damaged cells shown in the image. In some configurations, the number of cells shown in the image is compared to a predetermined threshold to determine whether the organism has been exposed to a predetermined level of radiation. In some configurations, the predetermined threshold is normalized based on an analysis of a plurality of biological samples. In various embodiments, the method also includes flushing the biological sample from the microfluidic chip. In various embodiments, capturing of the image of the microfluidic chip includes transmitting the image through an aperture between the microlens and the imaging element. In some configurations, the aperture is less than 5 mm in diameter. In various embodiments, the imaging element is a charge coupled device sensor. In various embodiments, the imaging element is a CMOS sensor. In various embodiments, the method also includes separating a control amount from the biological sample, exposing the control amount to a predetermined radiation level, extracting a predetermined element from the control amount; capturing an image of the control amount; analyzing the image of the control amount to determine radiation exposure; and comparing the control amount to the biological sample. In various embodiments, the method also includes normalizing any data derived therefrom through self normalization.

Another aspect of the invention is directed to a system for determining radiation exposure of an organism. The system for determining radiation exposure of an organism includes an illumination means for illuminating the microfluidic chip; an image capturing means for capturing an image of the microfluidic chip; an imaging means coupled to the microfluidic chip; and an analyzing means for analyzing the image to determine radiation exposure of the organism.

In various embodiments, the microfluidic chip includes a pumping means. In some configurations, the pumping means is electrochemically operated. In some configurations, the pumping means is thermopneumatically operated. In various embodiments, the microfluidic chip includes a flow regulating means. In some configurations, the flow regulating means is a valve. In various embodiments, the microfluidic chip includes a mixing means. In various embodiments, the microfluidic chip includes a heating means. In some configurations, the heating means is a diode. In various embodiments, the microfluidic chip includes at least one sensor means. In some configurations, the sensor means is a DNA microarray sensor. In various embodiments, the microfluidic chip includes a blood sample collection means. In various embodiments, the microfluidic chip includes an RNA extraction means. In various embodiments, the flow regulating means is at least one thermally-activated paraffin based microvalve. In various embodiments, the microfluidic chip includes a power providing means. In various embodiments, the microfluidic chip includes a means for performing a polymerase chain reaction assay. In various embodiments, the microfluidic chip includes a means for performing a DNA hybridization assay. In various embodiments, the microfluidic chip includes a means for performing a DNA detection assay. In various embodiments, the imaging means is a lens. In various embodiments, the imaging means is a charge-coupled device sensor. In various embodiments, the system further includes a means for adding to the biological sample in the microfluidic chip. In various embodiments, the system further includes a flushing means for flushing the biological sample from the microfluidic chip. In various embodiments, the analyzing means is a processor. In various embodiments, the system further includes a storage means and a memory means, wherein the storing means stores the image in the memory means. In some configurations, the processor counts the number of cells shown in the image. In some configurations, the processor counts the number of damaged cells shown in the image. In some configurations, the number of damaged cells shown in the image is compared to a predetermined threshold to determine whether the organism has been exposed to a predetermined level of radiation. In some configurations, the processor normalizes the predetermined threshold based on an analysis of a plurality of biological samples.

Other objects and features will be in part apparent and in part pointed out hereinafter.

BRIEF DESCRIPTION OF THE DRAWINGS

Those of skill in the art will understand that the drawings, described below, are for illustrative purposes only. The drawings are not intended to limit the scope of the present teachings in any way.

FIG. 3A shows normalized surface target concentration as a function of time for channel, oscillating sample (top line); bulk reactor, static sample (middle line); and channel, static sample (bottom line). FIG. 3B is a model of a biochannel reactor showing target concentration at different probe sites after completion of a hybridization reaction. The image illustrates the single uniformity across the probe sites. Further information regarding methodology is available in Example 1.

FIG. 5A shows a printed circuit board for computer controlled actuation of micro/nano fluidic plastic cartridges. FIG. 5B shows a microfluidic cartridge for the differential extraction of sperm and epithelial cell samples. Integrated pumps and valves are actuated by the printed circuit board of FIG. 5A. Further information regarding methodology is available in Example 2.

FIG. 6A is a schematic of the polymeric fluidic chip. FIG. 6B is a picture of the device (see Analytical Chemistry, 76, 1824-1831). Further information regarding methodology is available in Example 3.

FIG. 9A shows the instrument with 96-well plate inserted. FIG. 9B shows a diagram of the inflammation array gene organization as spotted for each well on the 96-well plate. The genes at each corner are the housekeeping genes.

FIG. 14A shows the layout and description of the plastic microfluidic cartridge and functional elements. FIG. 14B shows a functional prototype fabricated using rapid prototyping instrumentation. FIG. 14C shows a sample of a computer-controlled microfluidic sample preparation station. Inserted into the instrument is a plastic cartridge mounted to a printed circuit board for actuation.

FIG. 20A shows an 8-bit microcontroller board and FIG. 20B shows a programming device for the microcontroller.

FIG. 21A is a prototype study for a hand-held radiation monitoring device, using a programmed 8-bit microcontroller to simulate the measurement results. FIG. 21B shows the opened cartridge, separated into a disposable part (left) containing the reagents and reaction chambers, and a reusable part containing the drive electronics. FIG. 21C shows a cartridge reader with wireless connectivity.

FIG. 31A shows size comparison of the valve with a ball-point pen. FIG. 31B shows the valve integrated into a fluidic channel. FIG. 31C shows the valve in a horizontal (left) and vertical (right) orientation. FIG. 31D shows the valve in a finished cartridge.

FIG. 35A depicts the microfluidic chip, where the CCD sensor and microlens array not shown. FIGS. 35B-35D are top-view images from the CCD. In FIG. 35B, labeled channel widths are 200 µm and 100 µm, respectively. In FIG. 35C-35D, the images were captured at various times, with pump chamber into analysis channel.

FIGS. 36A and 36B show different diameter microlens, with $|E_x|^2$ intensity shown. FIG. 36C depicts a commercial microlens array from MEMS Optical. FIG. 36D is a side-profile scanning electron micrograph of reflowed polymers from microlens.

DETAILED DESCRIPTION OF THE INVENTION

Figure 1:
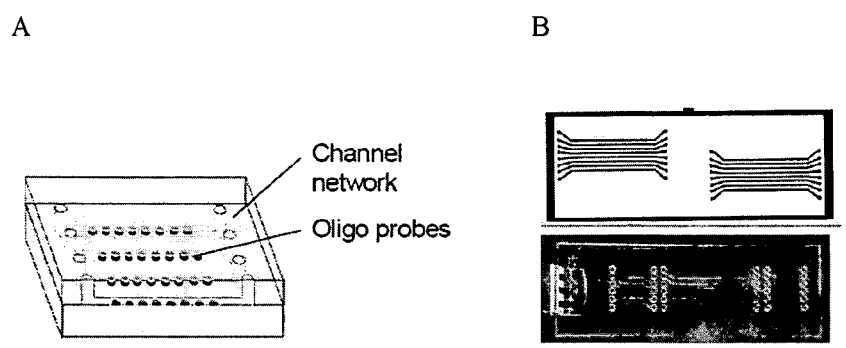
FIG. 1 is series of schematic images depicting a biochannel system layout (FIG. 1A) of a fabricated device and a fabricated prototype with fluidic ports (FIG. 1B). Further information regarding methodology is available in Example 1.

While the technology exists to perform highly sensitive and accurate gene-expression analysis using bench-top instrumentation and skilled technicians, it is highly desirable to develop a portable, inexpensive and rapid instrument that automates these processes. A self-contained, fully integrated cartridge that autonomously performs the complete bio-assay answers this need and is provided herein.

Exposure to ionizing radiation can produce a well-defined dose dependent signature in terms of changes in gene expression. Here, such a signature can be used to generate a self-contained radiation biodosimeter device, based on, for example, a blood finger stick. Exposure to ionizing radiation can produce dose-dependent changes in the expression of many genes, providing a means to assess both radiation exposure and dose. Recent reports describe the development of a completely self-contained biochip that consists of microfluidic mixers, valves, pumps, channels, chambers, heaters, and DNA microarray sensors to perform DNA analysis of complex biological sample solutions, such as blood.

One aspect of the present invention is a self-contained radiation biodosimeter suitable for large scale screening.

Provided herein in various embodiments is a system based on a drop of capillary blood, rather than the larger volumes of peripheral blood conventionally taken by venipuncture. In contrast to venipuncture, which would be a major bottleneck in an emergency situation, blood drop volumes permit the rapid collection that is important for a high throughput strategy. A standard source of capillary blood can be from a disposable lancing device. Other sources of capillary blood include laser skin perforators, such as the FDA-approved Lasette P200 (Cell Robotics Inc), which can have increased patient acceptability.

Also contemplated is a portable instrument device for mass-production for high-throughput screening. This portable version of a completely integrated, self-contained portable cartridge can run on battery power and perform an entire bio-assay. A dosimetric signature and on-board data analysis algorithm can be incorporated. After radiation assay performance, a cartridge can be inserted into a fluorescence scanner for rapid data read-out. In one embodiment, the portable device has a footprint of about 300 cm by about 500 cm for the overall system.

Integrated Biochip

Limited attempts have been made to integrate multiple analytical functions on-a-chip. They resulted in Woolley's work (Woolley, Hadley et al. 1996), successfully combining PCR and on-chip capillary separation. Similarly, Waters (Waters, Jacobson et al. 1998) has shown integrated devices capable of thermal lysing, PCR and separation. Anderson has attempted the development of sample preparation for use in expression hybridization arrays (Anderson, Su et al. 2000), but the valving system was complex and required external air actuation. Kricka and Wilding (Wilding, Kricka et al. 1998) have demonstrated physical filters relying on separation of biological cells by size. More recently, Taylor (Taylor, Belgrader et al. 2001) worked on a system with on-line PCR detection and showed on-chip spore pre-concentration, lysing, and DNA purification. Wilding, Kricka and Fortina have also developed a prototype of an integrated semi-disposable microchip analyzer for cell separation and isolation, PCR amplification, and amplicon detection (Yuen, Kricka et al. 2001).

Among the various embodiments provided herein is a completely self-contained, fully integrated biochip device that consists of microfluidic mixers, valves, pumps, channels, chambers, heaters, and DNA microarray sensors to perform DNA analysis of complex biological sample solutions, such as blood. Sample preparation (including, for example, magnetic bead-based cell capture, cell preconcentration and purification, and/or cell lysis), polymerase chain reaction, DNA hybridization, and/or detection, can be performed in this fully-automated miniature device.

Cavitation microstreaming can be used to enhance target cell or total RNA capture from whole blood samples using immunomagnetic beads and to accelerate the DNA hybridization reaction. Thermally actuated paraffin-based microvalves can regulate liquid flow. Electrochemical and thermopneumatic pumps can be integrated on the chip to provide liquid pumping. These nanochannel devices, fabricated by a polymeric imprinting method from inexpensive polymeric materials, are easy and inexpensive to manufacture. Various embodiments of these devices are a self-contained radiation biodosimetry product that enables use of a drop of capillary blood from, for example, a finger stick or laser skin perforator, to perform large scale screening at point-of-care sites.

Various known materials and methods can be used in the fabrication of lab-on-a-chip devices. Lithographic techniques, adapted from semiconductor technology, have been used to build chips in glass (Harrison, Manz et al. 1992) and silicon (Wilding, Pfahler et al. 1994). With increasing emphasis on disposable devices, the use of polymeric fabrication methods have become popular (Becker, Lowack et al. 1998; Boone T, Hooper H et al. 1998; Alonso-Amigo and Becker 2000; Liu, Chen et al. 2001; Kricka, Fortina et al. 2002). More recently, unconventional lithography techniques such as soft lithography (Xia and Whitesides 1998) and nanoimprinting lithography (Chou, Krauss et al. 1995; Chou, Krauss et al. 1996) have been used to fabricate reproducible nanostructures of biological materials suitable for building molecular diagnostic tools (Piner, Zhu et al. 1999).

Besides the conventional lithography techniques available, numerous polymeric nanofabrication capabilities can be used. Optimized stamper fabrication techniques can be used as needed for polymeric nanoimprinting and polymeric compression molding. Briefly, a negative image of a structure, which needs to be transferred to a polymeric substrate, is micromachined into a metal plate, nanofabricated into a silicon wafer, or Ni plated over the template. The selection of an appropriate stamper fabrication technique is determined in part by the dimensions of the structure (both width and depth) and by its durability related to the number of desired imprints. The smallest feature dimensions we can produce are in the range of about 50 nm, which is close to the persistent length of a single molecule of DNA, and more than sufficient for the channel construction.

Alternatively, an infrared $CO_2$ laser can be used to direct feature writing, and is especially well-suited to rapid production of a new chip design. The $CO_2$ laser beam is directed and focused by mirrors and lenses onto the polymeric substrate. When focused, the laser beam can either create channels in the substrate or cut through it depending on the laser power and writing speed. The fluidic network design can be generated in CAD software. No photo mask is needed and the smallest feature size achievable is about 200 µm.

After imprinting the channel features into the polymeric substrate, input/output holes for sample delivery are drilled and the structure is bonded with another polymeric piece to form a hermetically sealed channel enclosure. Bonding can be accomplished using, for example, thermal processes or double-sided medical tape.

On-polymeric metal deposition techniques can also be used to provide the capability of bringing heaters, temperature sensors, and electrical connectors to the chip surface. While most of the metal deposition techniques used in the semiconductor industry require lithography (some solvents used there are not compatible with polymerics) and are performed at higher temperatures (above polymeric melting temperature), shadow mask techniques eliminate the need for lithography, and optimization of sputtering techniques at lower temperatures are compatible with flexible polymeric substrate.

Magnetic separation is contemplated for selective and specific RNA capture for the on-chip environment. Chips capable of accomplishing this task should carry non-homogenous flows of sample and magnetic bead suspension at flow rates of about 100 µl/min or higher. They also preferably contain magnetic nanofeatures providing the ability to arrest magnetically labeled molecules in the capture zone with high magnetic field gradients. Smaller labels complicate chip design, however, by requiring special matrix structures designed to produce the magnetic gradients necessary for their capture.

Devices can be fabricated that consist of sub-millimeter iron or nickel-iron matrix elements fabricated into polymeric substrates that geometrically concentrate external magnetic flux to form the necessary magnetic gradients. Targets are collected at the walls of the channel where they can be washed or otherwise processed in a flow stream. The channels can concentrate milliliter volumes by a factor greater than 200 fold in just a few minutes and can be integrated with other polymer-based downstream nanofluidic amplification and analysis devices.

In one embodiment, a simple breadboard system is used for a portable sample preparation instrument. In another embodiment, a hand-held electronics device for microprocessor-based control of the automated gene-expression assay is used. The assembled printed circuit board holds a microprocessor system and voltage regulator unit that can be programmed by a personal computer via an integrated data port. After programming, the system can run a pre-programmed sequence to activate an array of different pumps and valves to control the sample preparation. Sequential actuation of pumps and valves using this battery-powered device has been demonstrated successfully (see e.g., Example 3). Various embodiments also incorporate a display showing the functional status and progress of the sample preparation.

A fully integrated, self-contained system can include a microfluidic part, which contains the reagents and functional elements for the bioassay, and an electronics-part that contains a power source (small rechargeable lithium-battery) plus the logic control for the assay steps. The electronics-part of the system can be reusable, requiring only the insertion of a new microfluidics component. The system can be mass-produced by the thousands at a size of about a credit card, to accommodate high-throughput screening of large populations.

Figure 24:
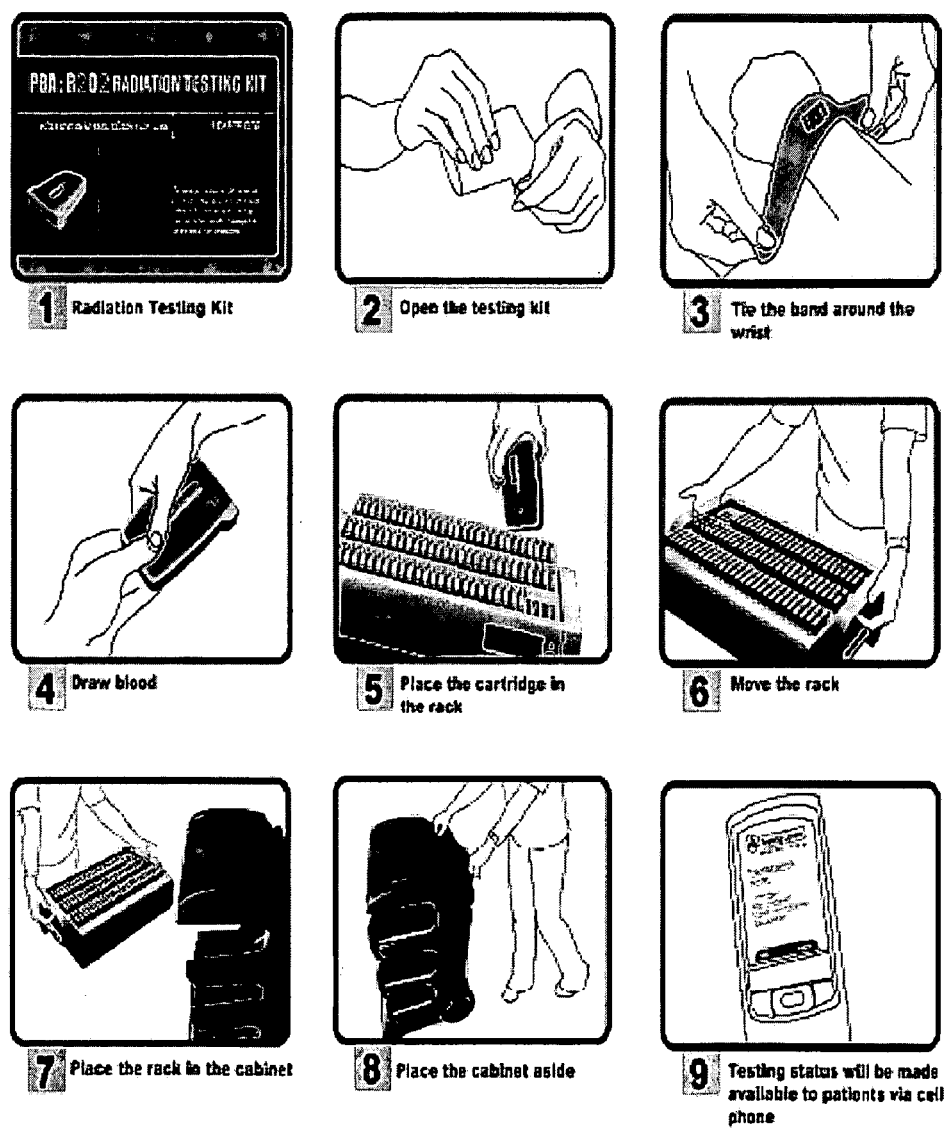
FIG. 24 is a series of diagrams depicting use of a biodosimetry system in an emergency situation with a large number of persons potentially exposed to radiation.
Figure 25:
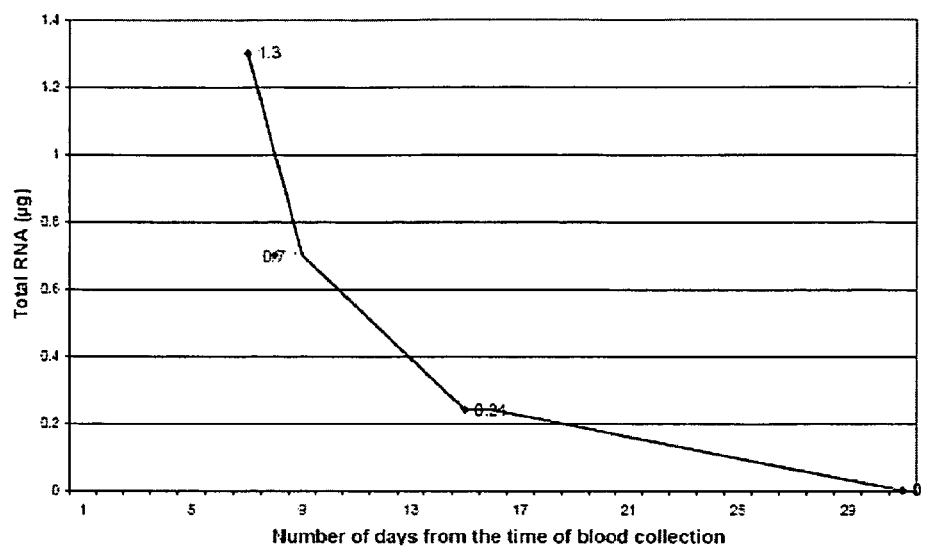
FIG. 25 is a line plot showing stability of RNA in anticoagulated blood. RNA purifications were done using the PAXgene™ Blood RNA Kit. All samples were incubated in PAXgene™ Blood RNA tubes for 24 hours prior to purification. Data represented here is an average of two purifications per time point with an error of +/−20%. Further information regarding methodology is available in Example 11.

The use of one device embodiment is as follows. A user takes a finger-prick, then holds the sterile loading port of the system against the drop of blood and presses a start button. All subsequent processes are performed automatically, with progress indicated by a small organic LED display. An integrated intelligent RF-tag communicates with a cell-phone, PDA, or other similar device and allows the user to save information, such as the patient's name and data on the device, and gives a full record of the bioassay on demand. After the assay is completed (e.g., duration of several hours), the system signals the user that the biochip is ready to be inserted into a commercial fluorescent reader for signal readout and data processing. Algorithms for on-chip data processing and determination of dose are integrated with the final product. The biochip reader can also be configured to contain an auto-loader to perform hundreds of scans per hour. Further concepts of use are provided in FIG. 24.

Figure 14:
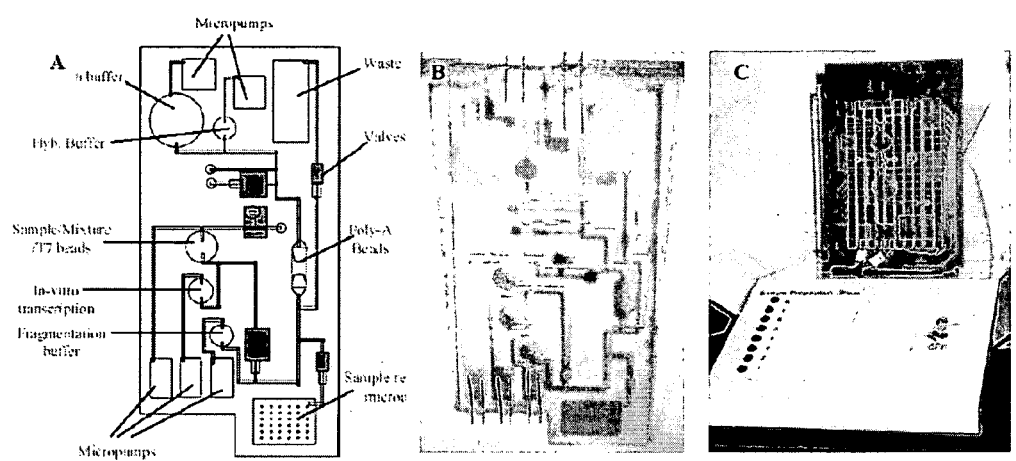
FIG. 14 is series of images depicting an embodiment of the lab-on-a-chip system.

An embodiment of the lab-on-a-chip system is shown in, for example, FIG. 14. This cartridge incorporates the fluidic functions needed for the processing of a total RNA sample for gene expression profiling as described above. Tests of the fluidic functions demonstrated the successful function of the valves, pumps and the fluid transfer. This system can be used, for example, for processing and analyzing RNA derived from whole blood.

Figure 15:
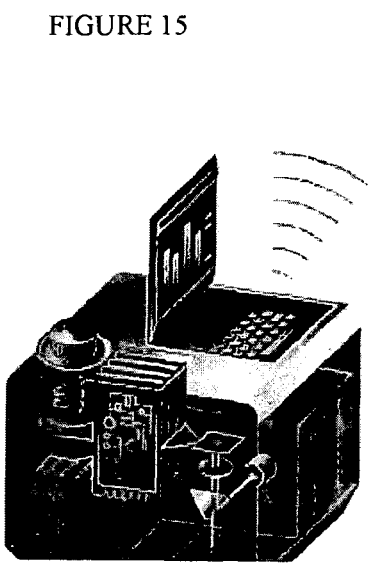
FIG. 15 is an image depicting one embodiment of an integrated design combining sample preparation, detection, computer-control, and wireless communication.
Figure 16:
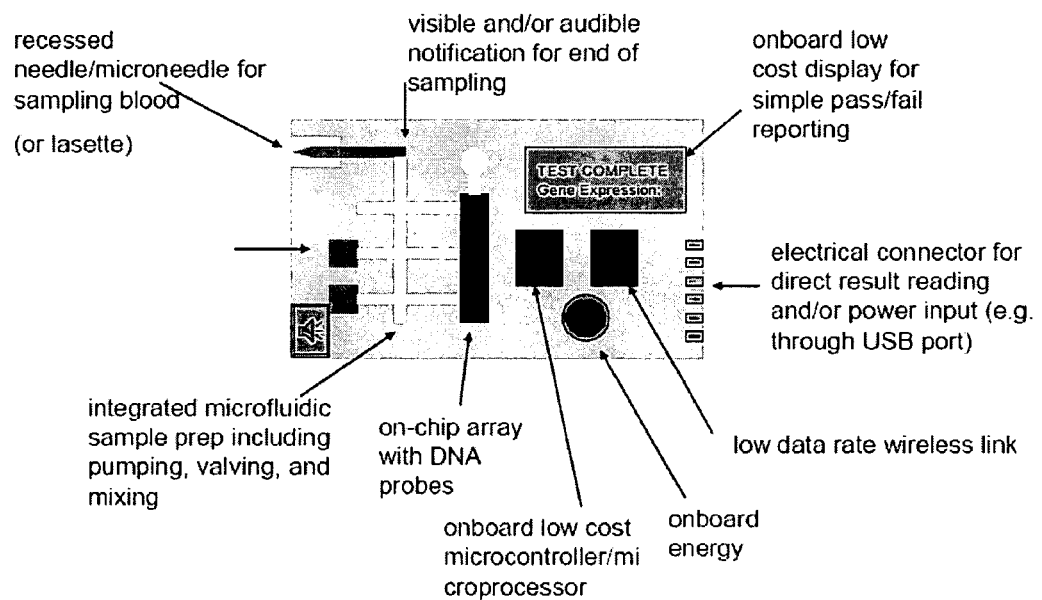
FIG. 16 is a first diagram showing features of an integrated gene-expression monitoring system.

In a further embodiment, the three separate device units (blood collection device, RNA sample preparation device, and DNA hybridization microarray device) are integrated into a single cartridge. Such an integrated system can be a bench-top system as illustrated in FIG. 15.

Figure 17:
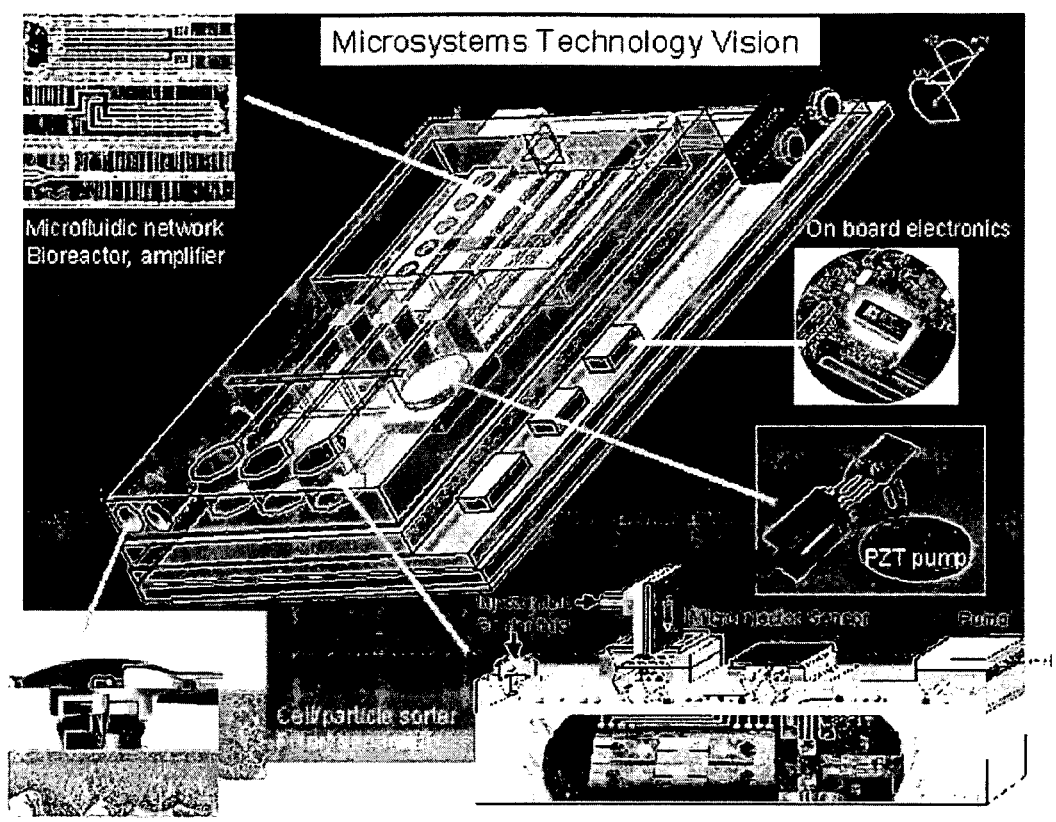
FIG. 17 is a second diagram showing features of an integrated gene-expression monitoring system.
Figure 18:
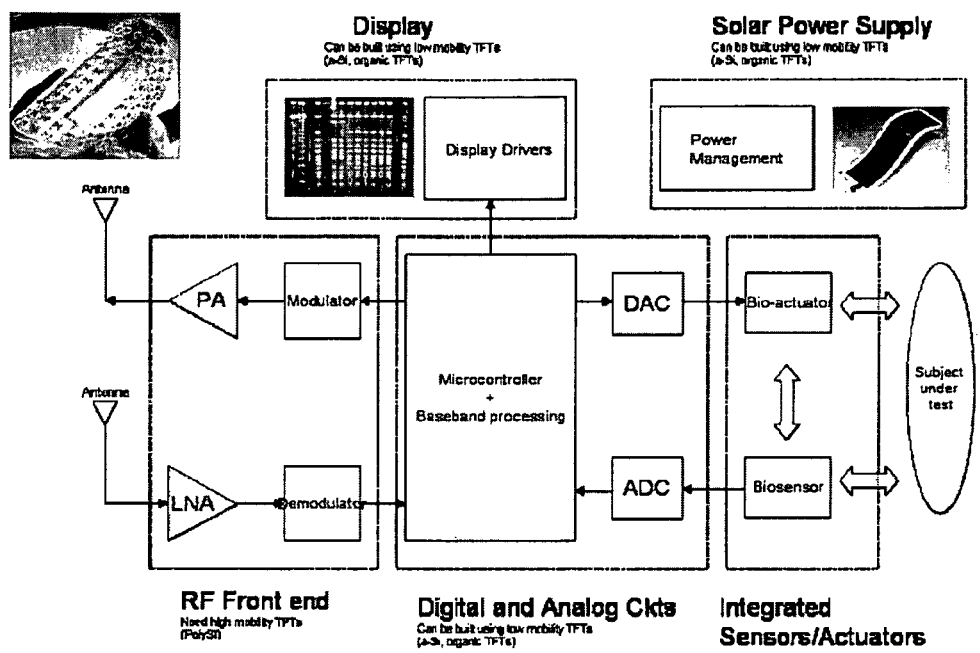
FIG. 18 is a diagram showing examples of integrated electronic functionalities fabricated of a plastic substrate.

Aspects of an exemplary integrated gene-expression monitoring system are shown in FIGS. 17 and 18. The system can further include integration of fail-safe controls (e.g. monitoring the liquid transfer processes) and user feedback methods (visible/audible notification at the end of sampling). Refinements to the radiation dosimetry signature are contemplated and can be integrated into the device as additional signature information is made available. A final set of genes used for radiation dosimetry can be derived from a larger number of candidate genes as genes with high variability of expression in the population, responses to unrelated conditions (confounding variables) or otherwise poor performers can be identified and removed from the final set.

The integrated device can be tested, for example, against the same samples that were used to select and validate the radiation dosimetry gene set. RNA from both ex vivo irradiated peripheral blood and from the total body irradiation patients can be used in this testing. The patients allow confirmation of detection of in vivo radiation responses, while the ex vivo samples allow testing of identification of a wider range of dose and time since-exposure. The test RNA is provided as blinded samples in order to quantify the performance of the integrated system in diagnosing radiation exposure and dose.

Various strategies can be employed for storage of bioreagents. A first strategy is formulating reagents in dry form and dissolving on-chip prior to use (e.g. utilizing technology Amersham is using to prepare Ready-to-go PCR beads). An advantage of this approach is that these reagents can be stored stably for many months without the need for refrigeration. A second strategy is to store reagents on-chip. In this case the entire chip should be refrigerated. A third strategy is to package reagents in a separate pouch that is kept refrigerated prior to insertion into the device.

The whole device can be powered by an integrated thin-film polymer battery (commercially available). Alternatively, regenerative solar-fuel cell systems can be used that operate at room temperature and are compatible with the plastic substrates used in the design of the biochips.

Samples of biofluid (urine, blood, saliva, sweat) from human subjects can be used. Collection methods are simple non-invasive or minimally invasive methods as well-known, including for example finger stick, venipuncture, oral swab, and urine collection.

RNA Extraction

RNA extraction from small volumes of blood is described, as well as a blood collection cartridge design. Also described are control electronics for the automation of the entire gene expression-based biodosimetry assay, and the usage of the cartridge in an emergency scenario. Alternatively, where assay procedures such as the HTG qNPA platform are employed, RNA purification is not required.

An integrated micro/nano fluidic cartridge for extraction of RNA from whole blood is contemplated. The sample preparation module takes the blood and quantitatively release total RNA for subsequent analysis on a DNA microarray. The relative performance of a system based on the use of magnetic beads with the ArrayPlate qNPA assay (High Throughput Genomics) is evaluated to determine which assay is most suitable.

Nanofluidic devices can be used for hybridization assays, and are also contemplated in the use of plastic fluidic chambers and components to optimize the performance of RNA sample preparation steps on a chip. The yields of reverse transcription, in-vitro transcription, and fluorescent labeling procedures are some factors to consider in determining which chambers and components to use. A series of protocols is contemplated that facilitates the ultimate integration of RNA sample preparation into a lab-on-a-chip platform. These protocols make use of magnetic beads, on the surface of which the reactions (e.g., RNA purification, reverse transcription, in-vitro transcription, RNA amplification, etc) take place.

Highly sensitive mRNA capture can be achieved using paramagnetic beads with T7-promoters (see e.g., Chalmers et al. (1998) Biotechnology Progress 14(1), 141-148; Jiang and Harrison (2000) Analyst 125(12), 2176-2179). The efficiency of separation using immunomagnetic methods depends strongly on the mixing of the reagents, and the magnetic capture. Sample preparation methods utilizing magnetic particles have been introduced to the nanofluidic environment at a limited level (see e.g., Joung and Shen (2000) IEEE Trans. on Magnetics 36, 2012). Such method can aid separation of RNA molecules or cells occurring at very low concentrations. Dedicated chips producing strong, localized gradients of magnetic fields can increase the capture efficiency, if required (see e.g., Ward et al. (2002) European Cell and Material Journal 3, 123-125).

RNA sample preparation from whole blood can be accomplished using the nano/micro fluidic cartridge. Comparison with current bench-top protocols can evaluate the amount of RNA extracted as well as the quality of hybridizations performed with samples obtained by using the two methods.

RNA Amplification

A highly sensitive amplification protocol in nanofluidic device format is contemplated herein, providing a path to integration of front-end sample preparation devices where concentrations of target molecules are expected to be very low.

Amplification of genetic material is useful to most downstream applications starting with little sample material in a microchip device. On-chip DNA amplification techniques have been reported. However, for RNA, only Anderson et al. ((2000) Nucleic Acids Research 28(12), e60) have described an integrated device that aims at fully automated preparation of an RNA sample for microarray hybridization.

Although shown to be feasible, the sensitivity of micro-PCR has not previously been explored in depth. Most investigators have used nanogram amounts of input DNA template, which corresponds to an amount of genetic material contained in 10,000-100,000 cells (a single human white blood cell contains ~7 picograms of DNA, for example). Only Mathies (Lagally, Medintz et al. 2001) has reported detailed investigations of micro-PCR sensitivity, and demonstrated on-chip amplification of a single molecule template.

Although PCR amplification is generally not used in the devices and methods desrcibed herein because the expression ratios would be distorted, the details of on-chip PCR amplification can nevertheless be used as an example for implementing chip-based enzymatic assays. Conventional PCR is time consuming, and a reduction in cycling time in parallel with reduction of sample volume makes micro-PCR especially preferred. Micro-PCR devices have been demonstrated in glass (Kopp, Mello et al. 1998; Waters, Jacobson et al. 1998), ceramics (C. F. Chou, M. Morgan et al. 2002), silicon (Belgrader, Benett et al. 1999), and polymeric (Yu, Sethu et al. 2000). Silicon, due to its superior thermal conductivity, allows for very fast temperature ramp times and gives the potential for very short on-chip protocols (Belgrader, Benett et al. 1999). Device designs, and thermal control, are at the center of successful micro-PCR chip development. Heating is usually accomplished using external Peltier elements (Wilding, Pfahler et al. 1994; Lin, Hesketh et al. 1996) or integrated on-chip heaters (Woolley, Hadley et al. 1996; Ibrahim, Lofts et al. 1998).

An additional challenge is posed by the need to amplify small amounts of mRNA in a nano-fluidic format. Single-step RT-PCR using silicon dioxide-coated chips has been reported with an efficiency of 70% compared to that from a tube control. These analyses were conducted using an entangled solution capillary electrophoresis (ESCE) system and laser-induced fluorescence (LIF) detection (Cheng J and M 2001). Similarly, Anderson and coworkers developed chips that performed reverse transcription and other reactions (Anderson, Su et al. 2000), but did not report on the efficiency of the reactions. However, they did mention that chambers coated with parylene-C improved the reproducibility of enzymatic reactions.

Described here are experiments that demonstrate that RNA can be suitably handled in polymeric fluidic devices.

Limited enzymatic amplification can be achieved during the in-vitro transcription step, where multiple RNA copies are generated from each of the double-stranded cDNA molecules. The relatively large amount of cellular RNA as compared to DNA and the sensitivity of device described herein can obviate the need for higher amplification rates. Furthermore, electrodeless dielectrophoresis-assisted sorting of biomolecules (Chou and Zenhausern, 2003) and its implementation into complex organic nanosystems can be used to delineate the needs for enzymatic amplification and provide real-time preconcentration for highly sensitive detection.

While molecular manipulation in confined fluidic environments can lead to improved biological functionalities that allow designing of new lab-on-a-chip devices, highly parallel embodiment of these nanofluidic devices is contemplated for high-throughput processing (Fodor, Read et al. 1991; Shi, Simpson et al. 1999). Furthermore, the level of automation achieved by integration of several assay functions on a single chip can lead to elimination of operator involvement as a variable.

Gene Expression

In one embodiment, whole-genome profiling can used to measure gene expression changes in whole human blood in response to exposure to gamma-rays (e.g., 0, 0.5, 2, 5 and/or 8 Gy). Sets of genes can be defined that respond to radiation exposure at about 6 to about 24 hours after the exposure. The variability between different healthy donors of both the baseline control expression of these genes and the radiation-induced responses is generally low enough that it does not interfere with identification of the exposure dose. Moreover, a single set of genes can allow identification of exposure dose at both times, suggesting that a single signature can be informative throughout this time window. These genes can also predict radiation exposure in patients undergoing total body irradiation. Analysis of the data set, including application of a self-normalizing algorithm, can produce a highly focused gene expression signature for radiation biodosimetry that can be used to test the complete microfluidic microarray cartridges.

A quantitative test that will use a threshold level of expression change to determine exposure and perhaps dose has the intrinsic problem of requiring a way to normalize out differences in lymphocyte number and RNA extraction and detection performance. Classical approaches to this problem either compare many samples simultaneously and then adjust the means and variances to a common scale, or compare each individual's sample to a common reference and produce a median normalized ratio. Either of these approaches requires comparison to external samples and thus adds a large operational overhead to practical application of the technology.

To overcome above normalization problem, a form of analysis that uses an internal normalization can be used. Self-Normalizing (SN) algorithms can allow the use of each sample as its own normalizer. This strategy has been tested on a variety of published data sets, and it produced more stable differentiation between varying samples than the currently utilized cross-sample or external standard normalization methods. Self-normalizing algorithms can be important for practical implementation of a biodosimetry device based on changes in gene expression.

A set of DNA oligonucleotide probes can be designed based on a set of, for example, about 50 to about 400 genes. For example, the gene expression signature can comprise about 50 genes, about 100 genes; about 150 genes; about 200 genes; about 250 genes; about 300 genes; about 350 genes; or about 400 genes. The length of the oligonucleotides is about 50 to about 80 bp, in order to achieve high specificity of hybridization. It is well established that longer oligonucleotides differentiate better between perfectly matching complementary strands and those carrying mismatches. The oligonucleotides can be terminated with an amino-group for covalent immobilization on a polymeric support coated with a three-dimensional gel-matrix with amino-reactive groups. The use of this gel-matrix can obviate the need for a "linker"-molecule between the amino group and the oligonucleotide. Part of the selection criteria for genes to be considered for use in the classifier are that they are sufficiently abundant to always be observed in a hybridization with a technical quality score (Chen, Kamat et al., 2002) of 0.3 or more (a stringent requirement for consistent detectability and high reproducibility in repeated hybridizations) and should produce an average difference between the classes to be discerned of at least 2 fold (substantially higher than the 1.4 fold change required for 95% confidence that two measurements are different). Once this gene set is integrated into the biochip platform, it can be tested using RNA samples from ex vivo irradiated human peripheral blood and total body irradiation patients that were also used to establish the informative gene set.

A set of candidate gene expression biomarkers that distinguish between samples of human peripheral blood exposed to doses between 0 and about 8 Gy can be used. The same set of genes is effective at distinguishing dose at both 6 and 24 hours after exposure, showing that the same set of genes could provide informative biodosimetry throughout this window of time. Self-normalizing algorithms can also be used to eliminate the requirement for external normalization in gene expression assays by using each individual sample as its own normalizer. This greatly reduces the operational overhead in the form of onboard computational power required to implement gene expression in a self-contained biochip. By applying these algorithms to candidate biomarkers, a refined gene expression signature can be identified. A stand-alone microfluidics cassette incorporating a quantitative nuclease protection assay can be used with the gene expression signature.

In various embodiments, the gene expression signature can include a plurality of radiation responsive genes selected from the following: A_23_P255111, A_24_P127462, A_24_P15083, A_24_P585004, A_32_P140501, A_32_P198223, AA516273, ABTB2, ACSL1, ACTA2, ACTN1, ADA, ADM, AES, AF289562, AGRN, AK021751, AK024870, AK024898, AK055915, AK056245, AK092083, AK092875, AK092942, AK097080, AK123333, AK123446, AK123722, AK2, ALDH18A1, ALS2CR13, ANKRA2, ANXA11, ANXA2P1, ANXA4, APIS2, APBA3, APBB1, APBB3, APOBEC3B, APOBEC3C, APOBEC3F, AQP9, ARHGEF3, ASB2, ASCC3, ASTN2, ATP2A3, ATP8B2, ATP9A, B3GNTL1, BANK1, BAX, BAZ1A, BBC3, BC014395, BC018597, BC022205, BC023989, BC039097, BC045174, BC053363, BC068044, BCL11A, BCL3, BCNP1, BE646426, BF511442, BI828537, BIRC3, BLK, BLR1, BM926530, BTG3, BU540282, BU595528, C11orf21, C11orf24, C11orf54, C12orf42, C12orf45, C12orf5, C14orf151, C16orf30, C17orf49, C19orf36, C1orf24, C1orf57, C20orf24, C3orf26, C8orf38, C9orf102, C9orf127, CA4, CAMK1D, CAMK2D, CARD6, CASP7, CCDC49, CCNB2, CCNG1, CCR7, CD19, CD24, CD40, CD40, CD511705, CD52, CD79A, CD79B, CD83, CD93, CDC25B, CDC42EP2, CDCA7L, CDKN1A, CDKN1A, CDKN1C, CEBPB, CEBPE, CENTB1, CENTG3, CHES1, CHRNA10, CIC, CLEC4E, CLIC3, CLIC4, CN271858, CNOT7, COL27A1, COL9A3, COMTD1, CR595983, CR597075, CR603437, CR616003, CR621698, CR623273, CR627148, CRLF3, CSPP1, CSPP1, CTAGE4, CXCL1, CXCL11, CXCL16, CXCL3, CXCR3, CYLD, DAPK2, DCP1B, DDB2, DDB2, DEF6, DEFA4, DHRS7, DHRS7B, DKFZp434F142, DPEP2, DZIP3, EBI3, EBPL, ECE1, ECE1, EFNB1, EGLN1, EHD1, EI24, EIF2C3, ENAM IGJ, ENST00000253048, ENST00000257897, ENST00000261569, ENST00000288074, ENST00000291567, ENST00000301749, ENST00000323595, ENST00000355807, ENST00000360329, EOMES, FAM105A, FAM113B, FAM62A, FAS, FASLG, FBS1, FBXL16, FBXO22, FBXO22, FBXW7, FCGBP, FCGR1A, FCHO1, FCHSD2, FCRL2, FDXR, FFAR2, FGL2, FHL2, FKSG44, FLII, FLJ11259, FLJ20186, FLJ20647, FLJ35348, FLJ36031, FLJ39575, FLJ40542, FLJ45445, FLRT2, FNDC3B, FOS, FOS, FPR1, FPRL1, FTSJ2, FXYD2, G0S2, GABRA3, GADD45A, GADD45A, GAMT, GCH1, GDF15, GHRL, GLIPR1, GLS2, GNG7, GNG8, GPR109A, GPR109B, GPR160, GPR18, GPR84, GRIPAP1, GRPEL2, GSK3A, GSS, GTF2I, H2-ALPHA, HEBP1, HIP1R, HIST1H2BE, HIST1H2BF, HIST1H2BO, HLA-DOA, HLA-DOB, HNRPC, HSF4, IBRDC3, IER5, IER5L, IFIH1, IFIT2, IFITM1, IGHA1, IGHM, IGHV1-69, IL10RB, IL1B, IL1RN, IL21R, IL8, IRAK3, ISG20L1, ITGA6, ITGAX, JAK3, JMJD2A, KCNJ15, KCNJ2, KCNN4, KCTD12, KENAE, KIAA0284, KIAA0963, KIF2, KIR2DS4, KLF2, KREMEN1, LAMP3, LBR, LEPROTL1, LHPP, LIF, LIG1, LILRA2, LILRB3, LIMK2, LMBRD1, LMNA, LMNB2, LOC158830, LOC201229, LOC256021, LOC283663, LOC284184, LOC339287, LOC349114, LOC399744, LOC401357, LOC649791, LRG1, LY9, MAMDC4, MANSC1, MAP4K2, MAP4K4, MAPKAPK2, MARCKS, MDM2, MDS025, METTL7A, MGAT3, MGC16207, MGC17624, MGC2463, MGC40499, MGC5370, MGST1, MLX, MOBK1B, MPEG1, MPP1, MR1, MXD1, MYC, MYOM2, N28017, NALP12, NBN, NBPF15, NEBL, NEU1, NFKB1, NFKB2, NPAL2, NRBP1, OPLAH, OSBPL3, P2RX5, PACSIN1, PCNA, PDLIM5, PELO, PGCP, PHLDA3, PHPT1, PIK3CD, PKLR, PLAGL2, PLAUR, PLK2, PLK3, PLXNA1, PLXNA2, PLXNB2, PMAIP1, POLH, POPDC2, POU2AF1, PPM1D, PRG1, PRKAB1, PRMT7, PSD4, PTGIR, PTP4A1, PTPN7, PTPNS1, PTPRCAP, PXN, PYCRL, PYGL, RAFTLIN, RALGPS2, RARRES3, RASA3, RASGEF1A, RASGRP2, RBM14, RBPSUH, RELB, RGS12, RGS14, RGS16, RGS3, RNF24, RP11-298P3.3, RP4-742C19.3, RPS19, RPS27L, RRAD, RRAGD RUFY3, SAC3D1, SACS, SCN1B, SDCBP, SDF2, SELPLG, SEMA4C, SERPINB1, SERPING1, SERTAD1, SESN1, SESN2, SGK, SH2D1B, SIGIRR, SIGLEC9, SIRPB2, SIT1, SLA, SLBP, SLC11A1, SLC13A2, SLC25A15, SLC27A1, SLC27A3, SLC35F2, SLC4A11, SLC7A6, SLCO4A1, SOCS1, SOD2, SPIB, SPPL2A, SRA1, SRPK2, SSPN, STAT1, SYNGR2, TACC3, TAPBP, TBC1D1, TBXAS1, TCF2, TCF3, TCF4, TCF7, TCL1A, TESK2, TFE3, THC2292160, THC2305303, THC2340838, THC2342491, THC2347909, THC2364440, THC2380864, THC2397697, THC2429167, THC2439183, THC2442819, TKT, TM7SF3, TM9SF4, TMC8, TMEM30A, TMEM68, TNF, TNFAIP2, TNFAIP3, TNFAIP6, TNFRSF10B, TNFRSF12A, TNFRSF18, TNFSF10, TNFSF12, TNFSF4, TNFSF7, TNIP1, TP53AP1, TP53I3, TP53INP1, TRAF4, TRAF5, TREM1, TRIAP1, TRIB2, TRIM22, TRIM32, TRPM6, TSC22D3, TSPAN32, TTC21A, TYMS, UBE2H, UBE2L6, UNQ501, UPB1, UROD, VAT1, VSIG4, WARS, WDFY3, WIG1, XM_499519, XPC, YWHAB, YWHAZ, ZC3H12A, ZC3H7A, ZFAND2B, ZNF195, ZNF25, ZNF337, ZNF541, ZNF625, ZNF79, ZNF92, ZUBR1, and αH2AX.

For example, the gene expression signature can include a plurality of radiation responsive genes selected from the following: A_23_P255111, A_24_P127462, A_24_P127462, A_24_P15083, A_24_P15083, A_24_P585004, A_32_P198223, AA516273, ACSL1, ADM, AK092942, AK092942, AK097080, AK097080, AK123446, AK123722, APOBEC3B, AQP9, ASB2, ASCC3, ASCC3, ASCC3, BAX, BAX, BAX, BAX, BAX, BBC3, BBC3, BBC3, BBC3, BC068044, BCNP1, BE646426, BE646426, BI828537, BLK, BLR1, C11orf54, C12orf5, C12orf5, C20orf24, C20orf24, C9orf102, CAMK2D, CARD6, CD19, CD24, CD79B, CDKN1A, CDKN1A, CEBPB, CEBPE, CLEC4E, CR597075, CR627148, CSPP1, CSPP1, CXCL1, CXCL16, DDB2, DDB2, DHRS7B, DKFZp434F142, ECE1, EGLN1, ENST00000323595, ENST00000355807, ENST00000355807, FAM113B, FBXO22, FBXO22, FDXR, FDXR, FFAR2, FKSG44, FLJ11259, FLJ11259, FLJ36031, FLJ39575, FLJ40542, FLJ45445, FOS, FPR1, FPRL1, FTSJ2, G0S2, GABRA3, GADD45A, GADD45A, GPR109A, GPR109B, HIP1R, HIST1H2BE, HIST1H2BF, HIST1H2BO, HLA-DOA, HLA-DOB, IBRDC3, IER5, IER5, IGHA1, IGHM, IL10RB, IL10RB, IL1B, IL1RN, IRAK3, ISG20L1, ISG20L1, ITGA6, ITGAX, ITGAX, KCNJ15, KCNJ2, KIAA0963, KREMEN1, LOC283663, LOC339287, LOC349114, LOC349114, LOC349114, LOC399744, LOC399744, LOC401357, LOC401357, LRG1, MGC40499, MGC5370, MOBK1B, MOBK1B, MXD1, NALP12, NEU1, OPLAH, OPLAH, P2RX5, PCNA, PHLDA3, PHPT1, PLAUR, PLK2, PLK3, POU2AF1, PPM1D, PRG1, PTP4A1, PTPNS1, PXN, RNF24, RPS27L, RRAGD, SDCBP, SDF2, SEMA4C, SERPINB1, SGK, SIGLEC9, SIRPB2, SLA, SLPI, TCF7, TCL1A, THC2340838, THC2397697, THC2429167, THC2439183, TNFAIP6, TNFRSF10B, TNFSF7, TP53I3, TP53INP1, TREM1, TRIAP1, TRIM22, TRPM6, UPB1, WDFY3, XM_499519, XPC, XPC, and ZNF2.

As another example, the gene expression signature can include a plurality of radiation responsive genes selected from the following: ABTB2, ACTA2, ACTN1, ADA, AES, AF289562, AGRN, AK021751, AK024870, AK024898, AK055915, AK056245, AK092083, AK092875, AK123333, AK123722, AK2, ALDH18A1, ALS2CR13, ANKRA2, ANXA11, ANXA2P1, ANXA4, AP1S2, APBA3, APBB1, APBB3, APOBEC3C, APOBEC3F, ARHGEF3, ASCC3, ASTN2, ATP2A3, ATP8B2, ATP9A, B3GNTL1, BANK1, BAX, BAZ1A, BBC3, BC014395, BC018597, BC022205, BC023989, BC039097, BC045174, BC053363, BCL11A, BCL3, BCNP1, BE646426, BF511442, BIRC3, BM926530, BTG3, BU540282, BU595528, C11orf21, C11orf24, C12orf42, C12orf45, C12orf5, C14orf151, C16orf30, C17orf49, C19orf6, C1orf24, C1orf57, C3orf26, C8orf38, C9orf127, CA4, CAMK1D, CASP7, CCDC49, CCNG1, CCPG1, CCR7, CD40, CD511705, CD52, CD79A, CD83, CD93, CDC25B, CDC42EP2, CDCA7L, CDKN1A, CDKN1C, CENTB1, CENTG3, CHES1, CHRNA10, CIC, CLIC3, CLIC4, CN271858, CNOT7, COL27A1, COL9A3, COMTD1, CR595983, CR603437, CR616003, CR621698, CR623273, CRLF3, CTAGE4, CXCR3, CYLD, DAPK2, DCP1B, DDB2, DEF6, DHRS7, DPEP2, DZIP3, EBI3, EBPL, ECE1, EFNB1, EHD1, EI24, EIF2C3, ENST00000253048, ENST00000257897, ENST00000261569, ENST00000288074, ENST00000291567, ENST00000301749, ENST00000360329, EOMES, FAM105A, FAM62A, FAS, FASLG, FBS1, FBXL16, FBXO22, FBXW7, FCGBP, FCHO1, FCHSD2, FCRL2, FDXR, FHL2, FLII, FLJ11259, FLJ20186, FLJ20647, FLJ35348, FLJ40542, FNDC3B, FTSJ2, FXYD2, GADD45A, GAMT, GDF15, GHRL, GLIPR1, GLS2, GNG7, GNG8, GPR160, GPR18, GPR84, GRIPAP1, GRPEL2, GSK3A, GSS, GTF2I, H2-ALPHA, HEBP1, HNRPC, IER5, IER5L, IFIH1, IFITM1, IGHM, IGHV1-69, IL2IR, ISG20L1, JAK3, JMJD2A, KCNJ2, KCNN4, KCTD12, KENAE, KIAA0284, KIR2DS4, KLF2, LAMP3, LBR, LEPROTL1, LHPP, LIF, LIG1, LIMK2, LMBRD1, LMNA, LMNB2, LOC158830, LOC201229, LOC256021, LOC284184, LOC649791, LY9, MAMDC4, MANSC1, MAP4K2, MAP4K4, MAPKAPK2, MARCKS, MDM2, MDS025, METTL7A, MGAT3, MGC16207, MGC17624, MGC2463, MGC5370, MGST1, MLX, MPEG1, MPP1, MR1, MYC, MYOM2, N28017, NBN, NBPF15, NFKB1, NFKB2, NPAL2, NRBP1, OSBPL3, P2RX5, PACSIN1, PCNA, PDLIM5, PELO, PGCP, PHLDA3, PHPT1, PIK3CD, PLAGL2, PLK2, PLK3, PLXNA1, PLXNA2, PLXNB2, PMAIP1, POLH, POPDC2, PPM1D, PRKAB1, PRMT7, PSD4, PTGIR, PTP4A1, PTPN7, PTPRCAP, PYCRL, PYGL, RAFTLIN, RALGPS2, RASA3, RASGEF1A, RASGRP2, RBM14, RBPSUH, RELB, RGS12, RGS14, RGS16, RGS3, RP11, 298P3.3, RP4-742C19.3, RPS19, RPS27L, RRAD, RUFY3, SAC3D1, SACS, SELPLG, SERPINB1, SERTAD1, SESN1, SESN2, SH2D1B, SIGIRR, SIT1, SLBP, SLBP, SLC11A1, SLC13A2, SLC25A15, SLC27A1, SLC27A3, SLC35F2, SLC4A11, SLC7A6, SLCO4A1, SOCS1, SOD2, SPPL2A, SRA1, SRPK2, SSPN, SYNGR2, TACC3, TAPBP, TBC1D1, TBXAS1, TCF3, TCF4, TCL1A, TESK2, TFE3, THC2292160, THC2305303, THC2340838, THC2342491, THC2347909, THC2364440, THC2380864, THC2397697, THC2429167, THC2439183, THC2442819, TKT, TM7SF3, TM9SF4, TMC8, TMEM30A, TMEM68, TNFAIP2, TNFAIP3, TNFAIP6, TNFRSF10B, TNFRSF12A, TNFRSF18, TNFSF12, TNFSF4, TNFSF7, TNIP1, TP53AP1, TRAF4, TRAF5, TRIAP1, TRIB2, TRIM22, TRIM32, TSC22D3, TSPAN32, TTC21A, TYMS, UBE2H, UNQ501, UROD, VAT1, VSIG4, WIG1, XPC, YWHAB, YWHAZ, ZC3H12A, ZC3H7A, ZFAND2B, ZNF195, ZNF337, ZNF541, ZNF625, ZNF79, ZNF92, and ZUBR1.

For example, the gene expression signature can include a plurality of radiation responsive genes selected from the following: CDKN1A, CD40, NEBL, GADD45A, CXCL11, HSF4, CXCL3, FLRT2, TNFSF10, IL8, TNF, ENAM IGJ, XPC, KIF2, SERPING1, DDB2, IFIT2, LILRB3, GCH1, FOS, CCNB2, LILRA2, RARRES3, SCN1B, UBE2L6, FCGR1A, FGL2, VSIG4, PKLR; STAT1, WARS, TCF2, DEFA4, and αH2AX.

Array

Customized microfluidic micro-arrays can be fabricated to monitor radiation-related gene expression.

The ability to monitor in a single experiment the relative abundance of mRNA expression from essentially the entire genome has revolutionized the ability to visualize the cellular environment as a whole. There are currently several technologies available for this type of analysis. Nonlimiting examples include Affymetrix oligonucleotide arrays, printed low-density oligonucleotide arrays (e.g. Amersham/Codelink), and cDNA arrays.

Two prevailing microarray systems have matured into commercial devices, one using non-porous solid supports (e.g. glass; Agilent) and fluorescence-based detection, the other one using photolithographic masking techniques to produce high-density spatial synthesis of oligonucleotides in 20 μm2 pads (silicon-based; Affymetrix product). Recently, new classes of polymers as well as new polymeric nanofabrication methods have been developed, that enable the production of DNA-microarrays on a low cost biocompatible polymeric substrate. Polymers such as cyclo-olefinic copolymer (COC) are already used in other areas where low background fluorescence is a prerequisite (e.g. in the fabrication of 96-well plates for fluorescent immunoassays) and can have lower fluorescence than glass, where traces of transition metals contribute to the background.

Microarray platforms are contemplated which consist of plastic microfluidic cartridges backed by small, integrated circuit boards, some only slightly larger than a postage stamp, containing DNA probes that assess the abundance of the genes constituting the genetic signature diagnostic of radiation exposure. After application and processing of the patient sample, the platform can be read by a detector and a diagnosis can be made. Performing these analyses on a nano-scale can increase the efficiency of the system, as higher multiplexing, higher throughput, and higher sensitivity can all be achieved. A nanodiagnostic chip for radiation biodosimetry comprising the nano-chips and the necessary "chip reader" can be mobilized in the event of a radiological incident, enabling rapid triage.

Biochannel Chip

A biochannel-configured chip can provide a drastic decrease in hybridization time as well a significant increase in sensitivity, where the common bulk-type hybridization is replaced by channel hybridization combined with optional active oscillation of the target solution. Such an approach can speed up a hybridization by at least five fold when using a biochannel with integrated pump (see e.g., Example 1).

Cyclo-olefinic co-polymer biochannel chips with integrated oligonucleotide array and pump can be used for improved assay sensitivity. To provide enhanced hybridization kinetics and improved signal uniformity, a multi-layer approach can be used to fabricate 3-D devices that contain a nanofluidic channel, in which the oligonucleotide array is deposited using a micro-array printer. Channels measuring, for example, several hundreds of microns in cross-section can be fabricated by imprinting lithography. Alternatively, nanoscale dimensions can be used for array processing. The immobilization can be achieved using a three-dimensional amino-reactive gel-coating on the polymeric part as a substrate for the attachment of amino-terminated. oligonucleotides.

The channel can be integrated with a micro-fabricated thermo-pneumatic pump that allows shuttling the hybridization solution back and forth over the array, thereby leading to rapid, uniform hybridization. The volume of the channel can be varied to accommodate the volume of the hybridization solution, and can range from, for example, nano-liters to microliters. In various embodiments, detection can employ a control instrument containing an optical detection system.

A nanofluidic channel-array sensitivity can be validated by detecting the gene expression levels of control samples (e.g., five control samples derived from cultured cells) and comparing the resulting levels with those of a specific array (e.g., an Agilent array). Sample preparation can be performed as for Agilent arrays to generate identical target concentrations for the hybridization assays. A nanofluidic device should show superior sensitivity and specificity due to the constant replenishment of targets at the hybridization sites by shuttling the sample solution.

A biochannel/pump technique can be applied to various types of microarrays. Other advantages are reduced sample/reagent volume, the ability to construct devices that can analyze many samples in parallel by fabricating an array of channels on a single substrate, and easy integration with front-end sample preparation to create lab-on-a-chip devices. The increased signal production and high uniformity of the signal at each detector are significant advantages over previous technologies.

Hybridization Assay

Hybridization assays on a nanofluidic scale are contemplated for accelerated hybridization. The miniaturization of hybridization assays to the chip level carries several advantages. It reduces the sample/reagent consumption and can accelerate the hybridization and improve signal uniformity. In most conventional microarrays, hybridization relies solely on diffusion, and thus is a lengthy rate limiting process. The bulk of the target solution is at a considerable distance, on the molecular length scale, from the reaction site on the chip surface. For example, the diffusion coefficient of a 250 by DNA fragment in water at room temperature is approximately $2\times10^{-7}$ cm$^2$ s$^{-1}$, and thus the time constant for diffusion along a length of 500 µm is about 100 min. Since the reaction volume of most biochips is quite large (e.g., 40-200 µL), diffusion of target nucleic acid to the chip surface can be very inefficient. Hence, the hybridization step for most conventional DNA chips with a planar surface may require 6 to 20 hrs to complete, depending on the size and concentration of target nucleic acid as well as the hybridization conditions. This can greatly limit the throughput of sample analyses.

Several alternative methods can be used to enhance hybridization kinetics by improving the mass transfer. One embodiment uses an active convectional flow/mixing approach that is implemented in the so-called biochannel-configuration (Lenigk, Liu et al. 2002), where DNA-probes are printed into a shallow channel that is in contact with a simple microfabricated pump that shuttles the hybridization mixture back and forth to increase the interaction between probes and targets. The method compares favorably to other hybridization methods that have been reported in the literature. It offers the additional benefit of being compatible with on chip integration, with reproducible manufacturing processes in low cost plastic materials, and with extension to a nanoscale multiplexing configuration.

The sensitivity, specificity and chip-to chip variation of the biochannel device can be evaluated using a set of known radiation responsive genes and irradiation of, for example, the ML-1 human myeloid cell line. This is a well-characterized experimental system (Amundson, Bittner et al., 1999; Amundson, Do et al., 1999) ideal for such testing purposes. The performance of the microchip can be compared to existing data collected from experiments using Agilent slides. For example, a test of six repeats of a heterotypic hybridization (control and irradiated ML-1) on the Agilent slides are compared to 12 repeats of the heterotypic pair on the new device.

A qNPA assay can be used because of its ability to work with whole blood (obviating the need for separate RNA extraction), low CV, speed (sample-to-answer in less than 8 hours) and ease with which the protocol can be translated into a microfluidic format. Additionally, because the assay is chemiluminescence-based, it is practical to integrate the detector into a handheld sample preparation unit. The qNPA assay can be read and analyzed by HTG's beta-version array reader called "FireFly" (see e.g. FIG. 9). A "FireFly" can be used to develop a novel microfluidic based platform with automated cartridge compatible with the benchtop system. One embodiment of an assay utilizes a 16-plex array printed into each well of a 96-well microplate.

A cell titration can be used to better understand the sensitivity of the qNPA using the FireFly and establish an appropriate cell concentration. As seen in the previous FireFly installation test, the gene expression levels were too low to detect even at what are considered high cell concentrations. A cell titration ranging from 240,000 cells per well to zero was used in one study. Also, in this study two different THP-1 cell preparations were compared. ANBC THP-1 cells were exposed to chemicals to induce inflammatory gene expression at both passage 5, and at passage 11. Cells were lysed in HTG lysis buffer containing probes for the genes of interest, then immediately stored at −80° C. By using two different cell preparations we were able to identify if passage number and/or viability after chemical exposure affects the outcome of the qNPA. Each prepared cell type and cell concentration was run in triplicate using columns 7-12 in the array plate.

Modules

An integrated lab-on-a-chip device can be based on functional modules such as a blood sample collection device, an RNA extraction device, and a hybridization microchannel device. The actuation of the device can be performed by an external controller-box. The sensitivity and specificity of the integrated device can be tested for ability to detect the gene expression levels of all genes of interest from the sample, and to determine whether the device provides the same degree of discrimination in retrospective studies as the platform used to develop the radiation-assay (e.g., Agilent microarrays).

Described are a module for the collection of blood from a finger prick, fabrication and validation of cyclo-olefinic copolymer biochannel chips with integrated oligonucleotide arrays, an integrated micro/nano fluidic cartridge for extraction and processing of RNA from whole blood, and incorporation of the radiation-related gene-expression signature into customized microfluidic micro-arrays. Also described are integration of the blood sample collection device, the RNA extraction device and the hybridization microchannel device into a single self-contained biochip, and integration of control electronics into a portable instrument suitable for mass-production and application to high-throughput screening. Various embodiments are self-contained biochips capable of rapidly measuring expression levels of a hundred or more genes that define radiation exposure, dose and injury. This approach can require only a drop of blood from a finger prick, and can be readily deployable for large scale population screening in the event of a radiological incident.

The device involves a sample collection module of blood from a finger prick or highthroughput laser skin perforator. Various embodiments of a blood collection module are contemplated, which depend in part on the volume of blood desired for gene expression analysis. Specifically, two alternative modules are contemplated, one for small and one for larger volumes. The collection module for small volumes (typical finger prick) uses a capillary-force based collection system, which is inserted into the microfluidic testing system for blood transfer. Where larger volumes (ml) are preferable, the blood collection module includes a vacuum-containing plastic chamber to which a catheter and needle are attached.

The sample preparation module can be configured to quantitatively release total RNA from whole blood, and prepare it for subsequent analysis on a nucleotide microarray. One embodiment uses a magnetic-bead based assay for the RNA capture, reverse transcription and labeling. Another embodiment uses the ArrayPlate qNPA assay (High Throughput Genomics), which simplifies and multiplexes the measurement of expressed genes by a protocol that only requires reagent addition and washes, and does not involve any RNA extraction, amplification, purification or biosynthetic steps.

Cartridge

A cartridge can contain its own power source, control electronics, functional microfluidic components and/or reagents. After assay completion, the cartridge can be inserted into a reader where, for example, the signal can be read out within seconds. The reader can be, for example, a commercial fluorescence reader. The cartridge can use fabrication processes that ensure scaling up of production. After a radiological incident, thousands of such cartridges can be used in parallel for high-throughput screening of affected populations.

A cartridge can contains its own power source, control electronics, functional microfluidic components and/or reagents. One embodiment of the device is an integrated, autonomous and portable cartridge that runs on battery power and performs the entire bioassay. This cartridge needs only to be inserted into a fluorescence scanner for rapid data read-out.

Exemplary embodiments include two cartridge prototypes for use with an amplification kit (e.g., modified Agilent linear amplification kit) and nuclease protection assay (e.g., HighThroughput Genomic) (see e.g., Example 3). The devices can contain on chip pumps, valves and/or mixers, and can use a printed circuit board backing (PCB) for control of on-chip actuators. A first cartridge embodiment can be relatively simpler in design the PCB heater design for valve and pump control. A second cartridge embodiment can contain more advanced microfluidics, and an integrated needle for on-chip blood collection.

Reagent storage can be accomplished directly within a cartridge, including special reagent formulations such as the use of lyophilized enzymes. A cartridge can also be divided into two (or more) parts, for example, one that contains the functional elements, and one that contains the reagents (see e.g., FIG. 21). The reagents-containing parts can be stored separately in a refrigerator, and then plugged into a functional part prior to use.

A gene expression detection assay can require repeated cycles of reagent or wash buffer addition from a single reservoir. Most of the required reaction steps can be performed in a main chamber of a cartridge using repeated valving for the main chamber of the cartridge. A miniature check valve (see e.g., Figure can be used with an actuation pressure of 1 psi, which can be easily integrated into cartridge designs to provide repeated valving capacity without adding significant cost to the system.

Imaging

Various embodiments of the invention provide for integrated microfluidic visualization biochip for radiation biodosimetry. In micro-biofluidic assays, one limitation to high throughput visualization and scalability is that of the detection technology. For example, macroscale high-cost bulk imaging microscopes can be used to operate each microchip assay, but such approach are limited for portable and/or high-throughput radiation dosimetry. Provided in various embodiments of the invention is an optical detector (e.g., a charge-coupled device sensor (CCD), typically with >$10^6$ phototransistor pixels) integrated on the biochip, for example, over the array microfluidic channels. Direct integration of a size-comparable CCD sensor chip with the microfluidic biochip can eliminate an intermediate and expensive bulk microscope. Such an approach allows the optical integration and extraction of information from a microfluidic biochip, with other preparations, such as sample mixing or assay preparation, performed as described herein.

Figure 34:
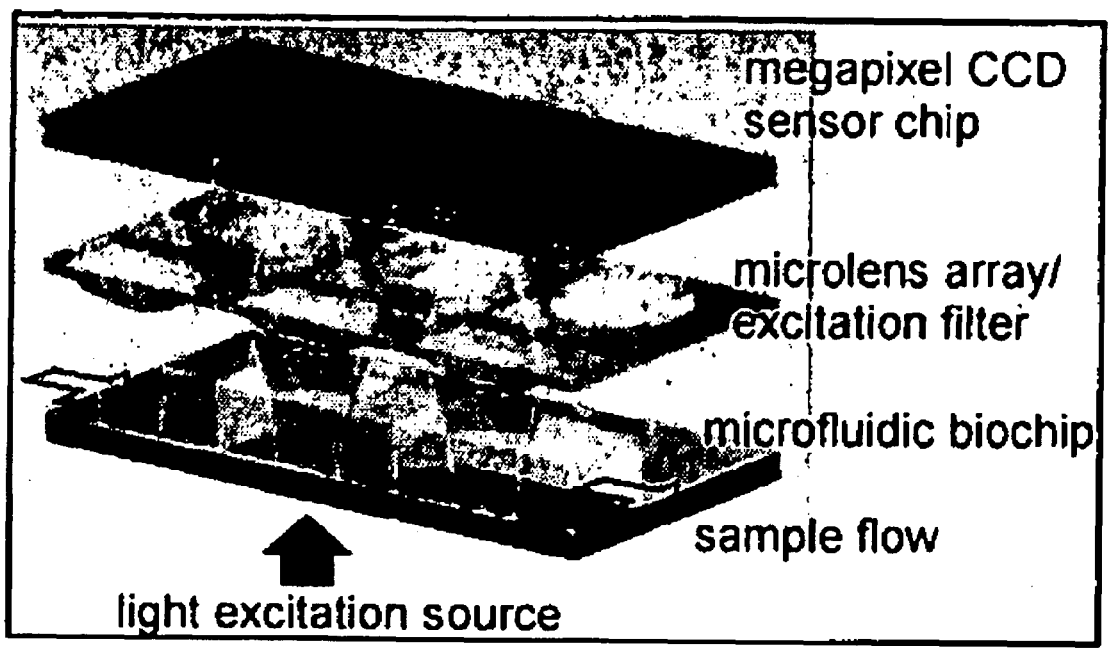
FIG. 34 is a diagram of a microfluidic visualization biochip. The microfluidic visualization biochip integrates CCD sensing technology through a microlenset array in close proximity to the biochip for dosage-dependent fluorescent-intensity monitoring.

Such approach allows visualization of the shape and internal transport phenomena (e.g., fluid dynamic, mass transport) of a microfluidic biochip. Provision of a visualization means on the microfluidic biochip can simplify the imaging of a microfluidic biochip and remove or reduce the need for a microscope. The microfluidic biochip can be built with a transparent material. The microfluidic can be interfaced with (e.g., placed directly on top of) a detector, preferably an optical detector, more preferably a CCD (charge-coupled device) chip. For example, a microfluidic biochip can underlie a microlens array/excitation filter, which in turn can underlie a megapixel CCD sensor chip, each of the layers interfacing to form a microfluidic visualization biochip (see e.g., FIG. 34). The microfluidic visualization biochip integrates CCD sensing technology through a microlenset array in close proximity to the biochip for dosage-dependent fluorescent-intensity monitoring. Illumination can be performed, for example, through the microfluidic chip towards the optical detector with a light source, such as a light-emitting diode. In one embodiment, integrated fluorescence intensity monitoring occurs on the microfluidic visualization biochip. A pinhole (e.g., about 1 mm diameter) can be placed between the diode and the microfluidic chip to improve the focus of the image. In various configurations described above, the shape and transport phenomena in the microfluidic chip can be visualized in a simple manner, with the temporal and spatial resolution of the digital camera, typically 30 millisecond and 5 micrometer (see e.g., FIG. 35).

Control

In brief, microfluidic control instrumentation is contemplated in which small, lightweight components with low power consumption are used.

In a first embodiment, the devices are computer-controlled by a PC running National Instrument's LabView program. In a second embodiment, a small controller board, or programmable microcontroller, replaces the PC and can be produced as part of the integrated gene-expression monitoring device.

The controller board can contain a means for allows users to communicate with the device. For example, an intelligent BlueTooth or RFID-tag can allow a user to communicate with the device using their PDA or cell-phone. Circuitry can be straightforwardly optimized to lower the cost of the sensor array and communication systems. Active matrix backplanes can also be employed for radio-frequency communication devices that can be integrated onto plastic substrates. Such active electronic tags offer connectivity and communication platforms for patient tracking and digital city networking, facilitating the activities of first responders. FIG. 18 represents the basic electronic functionalities that can be integrated and fabricated on plastic substrates.

Having described the invention in detail, it will be apparent that modifications, variations, and equivalent embodiments are possible without departing the scope of the invention defined in the appended claims. Furthermore, it should be appreciated that all examples in the present disclosure are provided as non-limiting examples.

References Cited

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present invention.

EXAMPLES

The following non-limiting examples are provided to further illustrate the present invention. It should be appreciated by those of skill in the art that the techniques disclosed in the examples that follow represent approaches the inventors have found function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention. It shall be understood that any method described in an example may or may not have been actually performed, or any composition described in an example may or may not have been actually been formed, regardless of verb tense used.

Example 1

Nanofluidic Hybridization Devices

Figure 2:
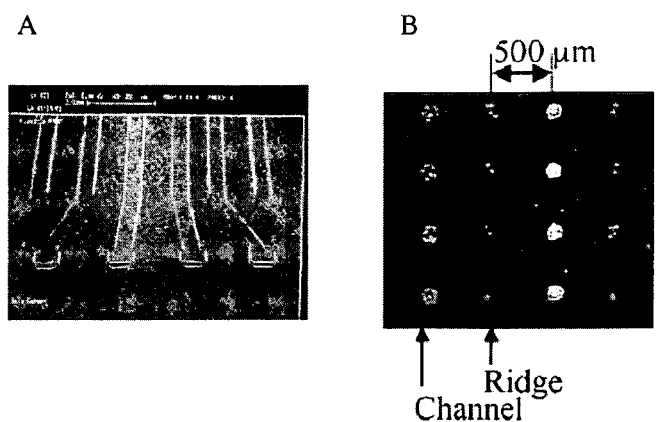
FIG. 2 is a series of SEM images of microchannels (FIG. 2A) and deposition of fluorescent oligonucleotides into the channels (FIG. 2B). Further information regarding methodology is available in Example 1.

A nanofluidic "biochannel" system is provided (see e.g., FIG. 2), which was constructed of 2 pieces of polymeric materials, one of them imprinted with a channel pattern, that were bonded together using double-sided biocompatible tape after the DNA-array was printed inside the channels. The attachment of DNA-oligonucleotides was achieved by coating the surface with a thin three-dimensional polymer network containing amino-reactive groups. Amino-terminated oligonucleotides were then deposited onto the surface using an in-house spotting tool (Telechem "Spotbot") equipped with 130 μm diameter "Stealth" pins. The spotting tool was modified to allow precise deposition of oligonucleotides into the channels (see e.g., FIG. 2).

Figure 3:
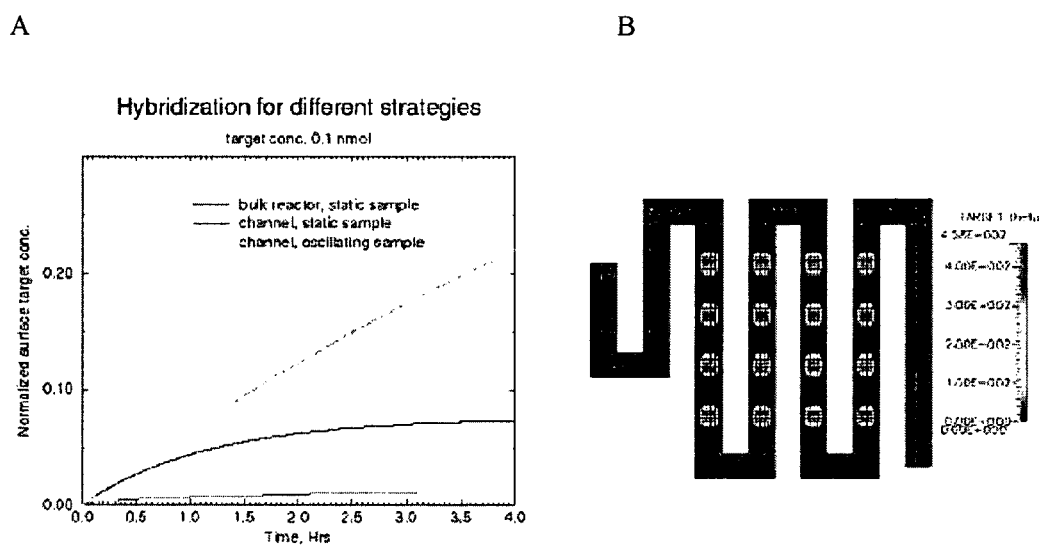
FIG. 3 is a line plot and model diagram demonstrating hybridization time.

The theory, as illustrated by modeling results shown in, for example, FIG. 3, predicts a drastic decrease in hybridization time as well a significant increase in sensitivity, when the common bulk-type hybridization is replaced by channel hybridization combined with active oscillation of the target solution.

Figure 4:
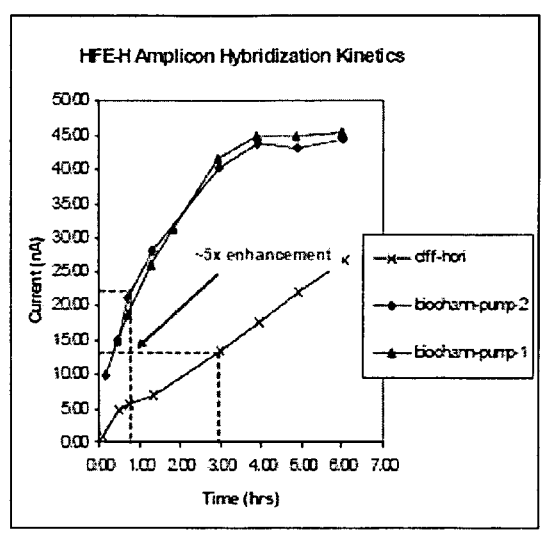
FIG. 4 is line and scatter plot showing HFE-H amplicon hybridization kinetics as current (nA) over time (hrs) for diff-hori; biochann-pump-2; and biochann-pump-1. The plot provides an analysis of biochannel hybridization kinetics using a bioelectric DNA sensor chip with integrated biochannel and air-pump for the oscillation of hybridization solution. Further information regarding methodology is available in Example 1.

Modeling results were tested using a Motorola bioelectronic DNA sensor. This sensor is capable of delivering real-time hybridization signal, thereby allowing accumulation of information on the kinetics of the reaction (see e.g., FIG. 4). The experimental results show that hybridization speed can be increased by at least five fold when using a biochannel with integrated pump.

Example 2

Figure 5:
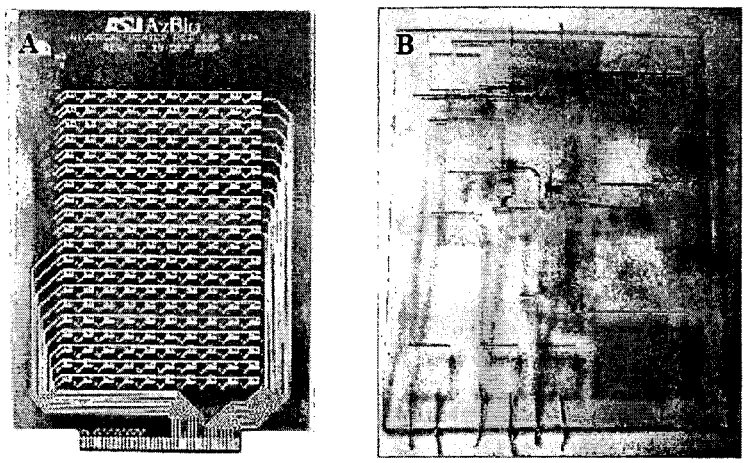
FIG. 5 is series of images depicting a microfluidic cartridge.

Microfluidic Plastic Cartridge for Differential Lysis of Sperm/Epithelial Cells Mixtures An example of a microfluidic system developed for differential lysis of sperm and epithelial cell mixtures is shown in FIG. 5. The system brings automated microfluidics to the DNA forensics field and establishes that the technology described herein is useful for complex, labor-intensive sample preparation protocols. The printed circuit board carries 200 individually controllable heaters, each of which carries a diode for precise temperature control.

Example 3

Figure 6:
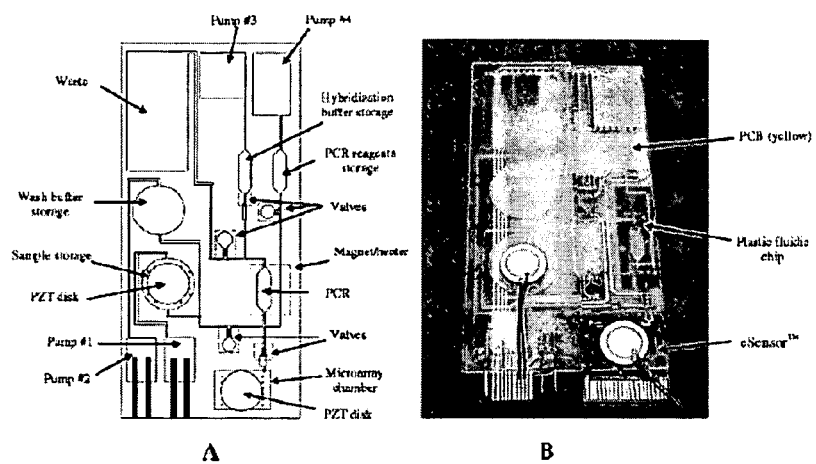
FIG. 6 is schematic diagram and image of a fully integrated biochip for sample preparation, DNA amplification, and hybridization arrays.

Fully Integrated Biochip for Sample Preparation, DNA Amplification, and Hybridization Arrays A self-contained and fully integrated biochip system for sample-to-answer DNA analysis with capabilities to purify, enzymatically process and hybridize nucleic acids is provided in FIG. 6.

The on-chip analysis starts with the preparation process of a whole blood sample. This includes magnetic bead-based target cell capture, cell pre-concentration and purification, and cell lysis. The preparation is followed by PCR amplification and electrochemical microarray-based detection. Crude biological sample and reagent solutions are loaded into the device, while electrochemical signals corresponding to genetic information are the primary output. The chip design is capable of handling a large volume (mL) of initial sample to accommodate analysis of rare targets in the sample. The mL volumes are reduced 100-fold when the assay reaches the DNA amplification stage. All mixers, valves, and pumps are integrated on the chip, but use very simple and inexpensive approaches in order to reduce chip complexity. Back-end detection is accomplished using an electrochemical hybridization assay.

The device (see e.g., FIG. 6) consists of a polymeric chip, a printed circuit board (PCB), and a Motorola eSensor bioelectronic microarray chip (Umek eta 1. (2001) Journal of Molecular Diagnostics 3(2): 74-84). The polymeric chip includes a mixing unit for rare cell capture using immunomagnetic separation, a cell pre-concentration/purification/lysis/PCR unit, and a DNA microarray chamber. The complexity of the chip design is minimized by using some of the chambers for more than one function. For example, the chamber to capture and pre-concentrate target cells is also used for subsequent cell lysis and PCR. The PCB consists of embedded resistive heaters and control circuitry. The Motorola eSensor™ is a separate PCB substrate with 4×4 gold electrodes on which thiol-terminated DNA oligonucleotides are immobilized via self assembly to detect electrochemical signals of hybridized target DNA.

An important performance aspect of this device is its ability to rapidly mix liquid solutions by means of an acoustic micro streaming technique (Liu et al. (2003) Int J Comput Eng Sci 4, 145-50). Using this technique, the time taken to achieve a complete mixing in a 50 µL chamber was significantly reduced from hours (a pure diffusion based mixing) to only 6 seconds. Acoustic micro-streaming was also implemented in the DNA microarray chamber to enhance the rate of DNA hybridization. A study of hybridization kinetics showed that acoustic micro-streaming results in up to 5-fold kinetics acceleration with significantly improved signal uniformity.

In order to facilitate a sequential and multi-stage analysis, a novel micro-valving technique was implemented into the chip. A valving mechanism was developed in which paraffin is used as an actuator material that undergoes solid-liquid phase transition in response to changes in temperature. These paraffin-based micro-valves have zero leakage and a maximum hold-up pressure of 40 psi in a "closed" position. The paraffin-based valves are robust and exhibited excellent mechanical stability. The response time required to open and close the paraffin-based valves is on the order of 10 seconds. The paraffin is compatible with PCR. The integrated device is completely self-contained: no external pressure sources, fluid storage, mechanical pumps, or valves are necessary for fluid manipulation, thus eliminating possible sample contamination and simplifying device operation. This device, with the capabilities of on-chip sample preparation and DNA detection, provides a cost-effective solution to direct sample-to-answer genetic analysis, and thus is well suited for use in point-of-care genetic analysis, rapid disease diagnosis, environmental testing, and radiation biodosimetry.

The fabrication of biochannel chips involves the processing of cyclo-olefinic co-polymer (COC) including the use of molds that allow compression molding of the material into thin sheets that can be used in device fabrication. First, a number of such sheets are made and then cut into microscope-slide size (1"×3"). A channel pattern is laser-cut from double-sided tape containing a Teflon core to minimize fluid loss. When this channel-mask is transferred to the COC support, the channel is filled with a gel-solution that contains photo-reactive groups and amino-binding sites. After irradiation with UV-light, a thin layer of the gel is immobilized on the surface, and the chips are rinsed. The oligonucleotide micro array is printed into the channel using a programmable micro-array printer. The size of the single spots will be approximately 100-130 µm, with spacing of around 250 µm, depending on the channel geometry. All probes are printed in triplicate to allow the assessment of spot-to-spot variation. After an incubation and washing step to achieve the binding of the amino-terminated oligonucleotides to the gel matrix, the protective backing of the double-sided tape is removed, and a second COC part containing the fluidic ports (micro machined by $CO_2$ laser tool) is attached. Alternatively, a Jenoptik's hot embossing tool can be used to imprint a channel pattern into the COC substrate. The later method is preferred for the production of a larger number of chips.

Figure 7:
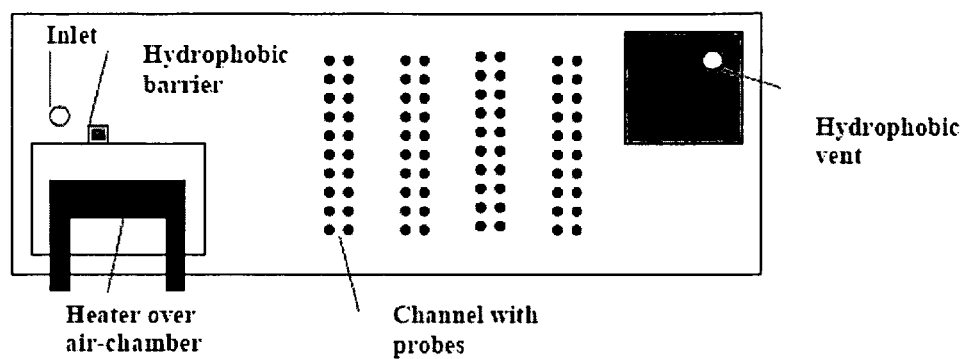
FIG. 7 is a schematic diagram of a biochannel-chip with integrated pump. Further information regarding methodology is available in Example 3.
Figure 8:
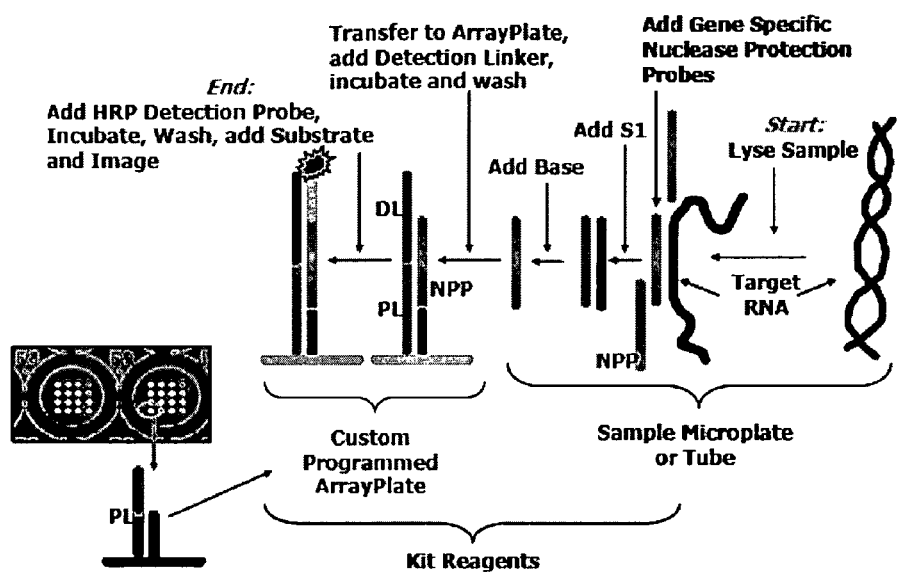
FIG. 8 is diagram of a nuclease protection assay. NPP=nuclease protection probe. S1=S1 nuclease. PL=programming linker. DL=detection linker.

To integrate a micro-pump with the biochannel, the biochannel is integrated with an air pocket connected to it via a small opening (see e.g., FIG. 7). Prior to assembly of the device, the opening leading into the chamber is coated with a hydrophobic polymer (e.g. Nafion).

On top of the air-filled chamber a microfabricated heater is either laminated or sputtered, using a shadow-mask process for the deposition of metal on polymeric. Alternatively, a screen-printed heater on a circuit-board can be used for heating of the air-filled chamber.

When the biochannel is filled with hybridization solution, it will not enter the sealed air chamber because of the hydrophobic barrier. Once the entry port for the solution injection is closed, the heater is periodically switched on and off by a timer-controlled power-supply. The expanding/contracting air then leads to the shuttling of the hybridization solution, which moves back and forth over the immobilized oligonucleotide probes. The exit of the biochannel is blocked with a hydrophobic membrane that prevents evaporation, but through which pressurized air can escape.

To evaluate the improved sensitivity and hybridization kinetics of the device, hybridization experiments are performed that compare the biochannel device with bulk hybridization on Agilent microarrays. The shuttling (mixing) frequency as well as the channel volume and dimension can be optimized for maximum performance.

Example 4

Cell Titration for Testing Sensitivity of qNPA Assay

A cell titration can be used to better understand the sensitivity of the qNPA using the FireFly and establish an appropriate cell concentration. As seen in a previous FireFly installation test, the gene expression levels were too low to detect even at what are considered high cell concentrations. A cell titration ranging from 240,000 cells per well to zero was used in one study. Also, in this study two different THP-1 cell preparations were compared.

ANBC THP-1 cells were exposed to chemicals to induce inflammatory gene expression at both passage 5, and at passage 11. Cells were lysed in HTG lysis buffer containing probes for the genes of interest, then immediately stored at −80° C. By using two different cell preparations it could be determined whether passage number and/or viability after chemical exposure affects the outcome of the qNPA. Each prepared cell type and cell concentration was run in triplicate using columns 7-12 in the array plate.

Figure 10:
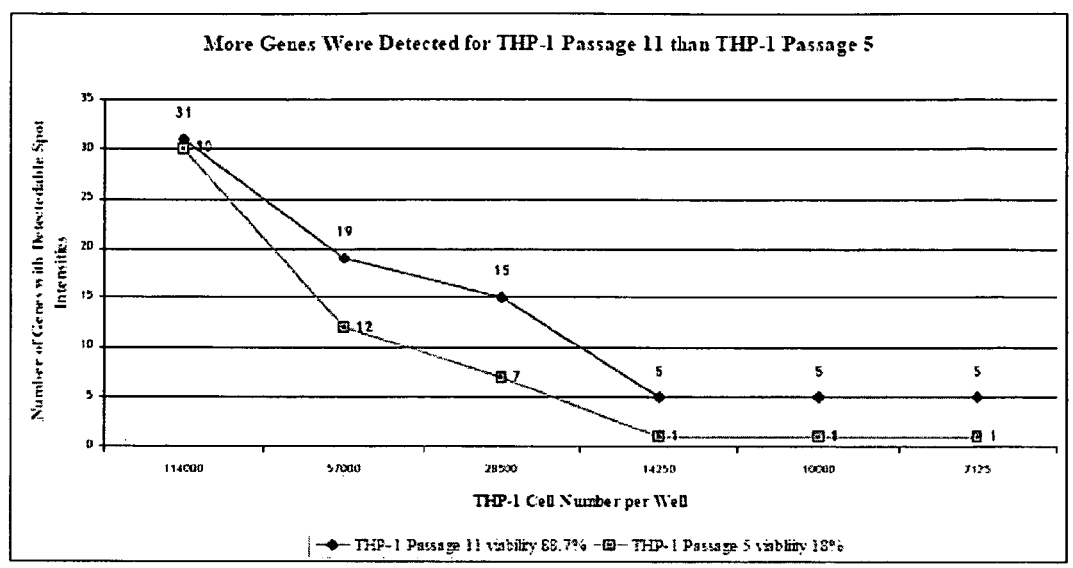
FIG. 10 is a line and scatter plot for genes detected in THP-1 passage 11 and THP-1 Passage 5 showing number of genes with detectable spot intensities as a function of THP-1 cell number per well. Further information regarding methodology is available in Example 4.
Figure 11:
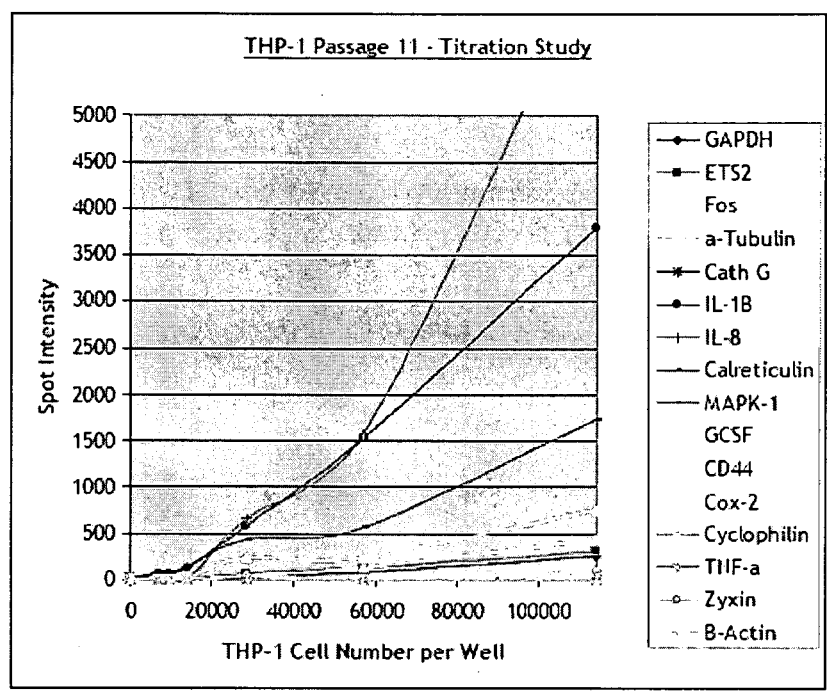
FIG. 11 is a line and scatter plot showing spot intensity meansured against cell number per wells for cells treated at p11. Each point represents the average of up to three replicates for each gene. Further information regarding methodology is available in Example 4.

All three replicates were detected for six of the sixteen genes at cell concentrations ranging from 240,000-57,000 cells per well. Total number of detectable genes are shown in FIG. 10. Spot intensity measured against cell number per wells for cells treated at p11 is shown in FIG. 11. The confidence intervals for the spot intensities of those six genes are plotted in FIG. 12.

Figure 9:
FIG. 9 is a photograph and a diagram illustrating the FireFly detection instrument.

Results showed that the Passage 5 THP-1 cell preparation spot intensities were significantly lower than those of the Passage 11 THP-1 cell preparation (see e.g., FIG. 9). This may be due to the low viability in passage 5 just after chemical exposure. For this reason the ANBC passage 11 THP-1 cell preparation was used for all further studies.

Figure 12:
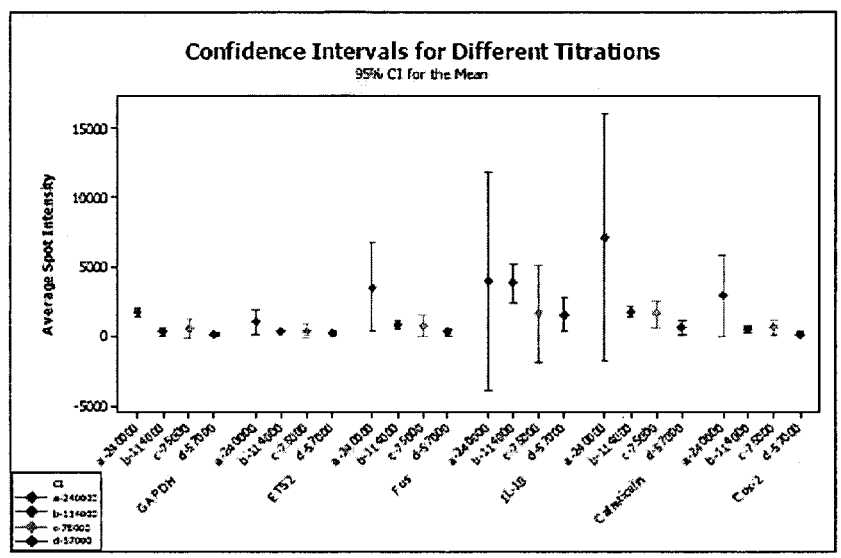
FIG. 12 is confidence interval plot for six genes of four different cell concentration. Further information regarding methodology is available in Example 4.
Figure 13:
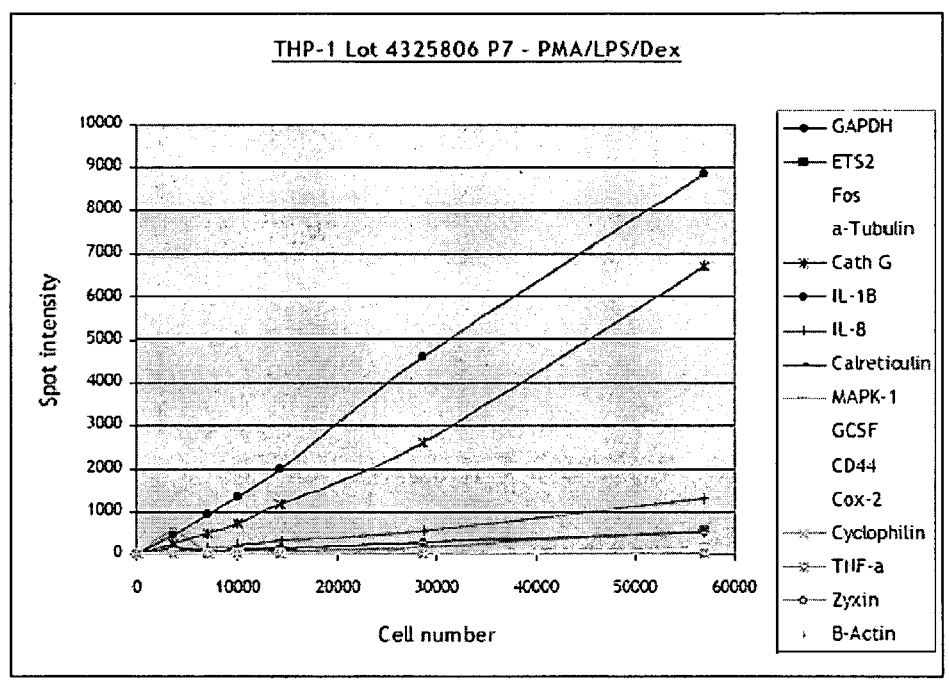
FIG. 13 is a line and scatter plot showing spot intensities from the PMA/LPS/Dex group of a new lot of THP-1 cells measured against cell number per well. Each point represents an average of up to three replicates for each gene. Further information regarding methodology is available in Example 5.

As seen in FIG. 12, the cell concentration that had the overall smallest confidence interval is 114,000 cells per well. The 240,000 cells per well had the largest confidence interval indicating that there was a large margin of error within replicates. A lower concentration would be more ideal, but there was a significant decrease in spot intensity detection even at 57,000 cells per well. Based on this study, a cell count lower than 78,000 per well would likely result in an unacceptably high number of undetected genes.

Example 5

Cell Lot Comparison Study Using HTG Arrays

HTG qNPAs can be performed by a single cell stock. This can allow for direct comparison of studies performed on different days. This example was conducted to confirm that the proposed new stock lot of THP-1 cells would perform at least as well as the lot used in the past. The new lot of cells were grown in large quantities and stored for future use. This experiment also allowed comparison of two different chemical exposure groups to possibly detect differential expression patterns. In addition, a cell titration was used to better understand the sensitivity of the qNPA with the new cell lot and establish an appropriate cell concentration. FIG. 6 demonstrates that the gene spot intensities have a linear progression when measured against cell number. There is a direct correlation between spot intensity and cell number (the greater the cell concentration the greater the spot intensity). The same is true for the THP-1 cells exposed to PMA/LPS/Dex reagents.

The performance of current bench-top protocols for the preparation of RNA-samples can be readily tested for microfabricated plastic reactors. Simple test reactors are fabricated for this purpose using known rapid prototyping methods. The dependence of the reaction yield on the surface roughness of different polymer types is determined. As the volume of a device decreases, the surface properties become more important due to increased surface to volume ratio. Material choices include COC, polycarbonate, PMMA, polypropylene and relative performance using the different materials can be readily compared. A suitable reference for the whole blood RNA-extraction module is the PAXgene™ Blood RNA Tubes and Blood RNA Kit system (Qiagen, Alameda, Calif.), previously shown to yield RNA of sufficient quantity and quality to generate microarray gene expression profiles with Affymetrix U133A arrays (Wang, J. F. et al. 2004). The method generally yields between 2.5 and 4.3 µg total RNA per milliliter of blood, depending on the incubation time.

Example 6

Blood Collection Cartridge

A cartridge component for collection of blood from a finger stick has been made. The cartridge consists of a needle with a channel and chamber for blood transport, and a pumping mechanism. A simple design with a manual pump calibrated to collect about 200 µl of blood was machined from polycarbonate using micro-milling technology. Not only does this represent a necessary component for integration into the final microfluidic gene expression measurement device, but this simple design may also benefit other projects that are developing potential biodosimetric tests based on the sampling of very small quantities of blood.

Figure 19:
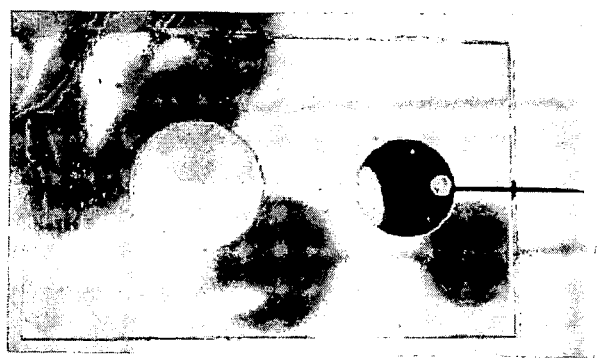
FIG. 19 is a picture of a blood collection cartridge having a simple manual pumping mechanism calibrated to collect about 200 µl of blood.

While various configurations are possible, a cartridge (or cartridge component) consists of a needle (or channel), chamber for blood transport, and a pump. A simple design consisting of a manual pumping mechanism calibrated to collect about 200 µl of blood is shown in the FIG. 19.

Example 7

Electronic Control of Microfluidic Devices

A hand-held radiation exposure monitoring device has been made, with an electronic display driver using a programmed 8-bit microcontroller to simulate measurement results. The same processor is now used to drive the actual controller board for the microfluidic cartridges, enabling further module development and testing of the integrated microfluidic devices. The device was recently field-tested in a simulated radiation release training exercise, the "Coyote Campaign". This exercise simulated the release of radiation and the decontamination and triage of patients as a collaborative effort between National Guard, Scottsdale Healthcare, and corporate and academic participants.

This microfluidic control instrumentation was built using components that are small, light-weight and have low power consumption. Instead of initially using personal computers and National Instruments LabView, programmable microcontrollers are used. The system is divided in to several functional blocks. The main blocks consist of the microcontroller system, power supplies, temperature control, and power switching elements.

Use of 8-bit or 16-bit microcontrollers allows microprocessor control and monitoring of temperature, voltages, and currents in a single low cost device. Circuits with various control schemes are possible using PIC18F and PIC24F microcontrollers. These are flash-based devices, which are programmed using assembly language or a C compiler. These devices also contain built-in 10-bit analog to digital converters and comparator modules. With up to 60 digital and analog connections, a single microcontroller can control, monitor, and log data from all the other functional blocks.

Thermal control is achieved through the use of the Analog Devices ADN8830 I.C. This is a powerful integrated circuit that can accurately drive Peltier devices or resistive heaters with a minimum of external circuitry. This module also has the ability to interface directly with the microprocessor. This system requires several different analog and digital voltages with attendant power requirements. Custom PWM-based switch-mode power supplies can be used. By designing these supplies with switching frequencies >1 MHz, the size of the magnetic elements can shrink considerably while maintaining >90% efficiency.

Figure 20:
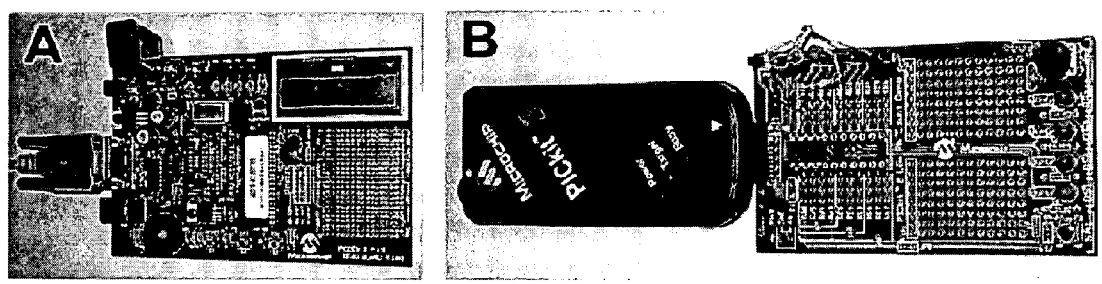
FIG. 20 is a series of pictures, where
Figure 21:
FIG. 21 is a series of pictures of a prototype study for a hand-held radiation monitoring device and reader.
Figure 21:
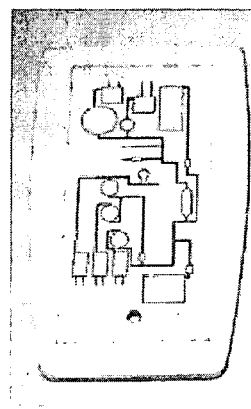
Figure 21:
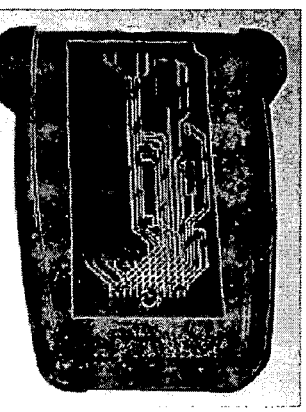
Figure 21:
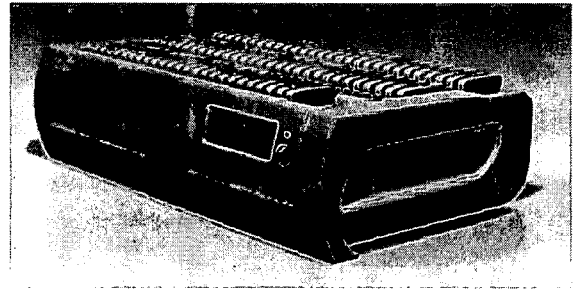

The boards shown in FIG. 20 were used to create the electronic display driver for a prototype study depicted in FIG. 21, which was used in the "Coyote Campaign" (www.coyotecampaign.org). The campaign simulated a response program following the release of radiation from a detonated device that was performed in collaboration with the Air National Guard, Scottsdale Healthcare, City of Scottsdale, and other corporate and academic participants.

Example 8

Sample Preparation Cartridge Development

Figure 22:
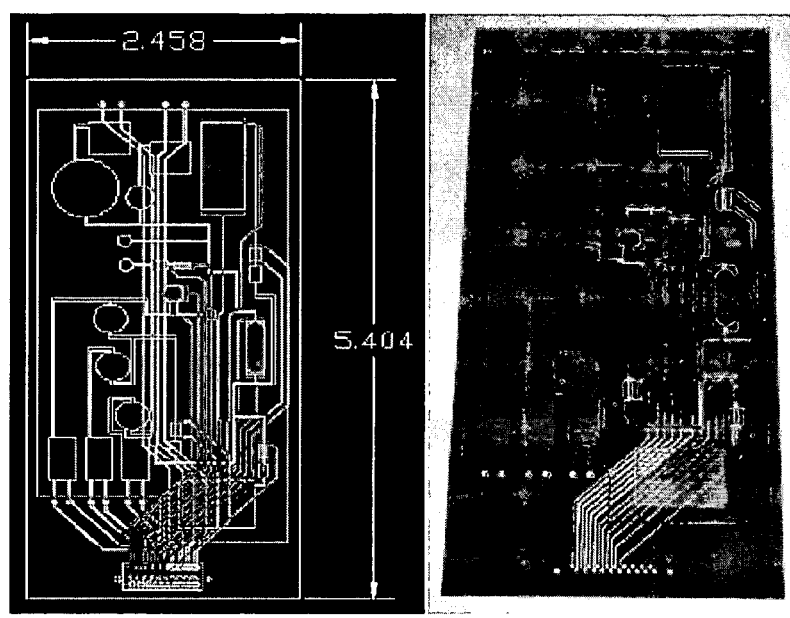
FIG. 22 is an image of a sample preparation cartridge for use with a modified Agilent linear amplification kit.
Figure 23:
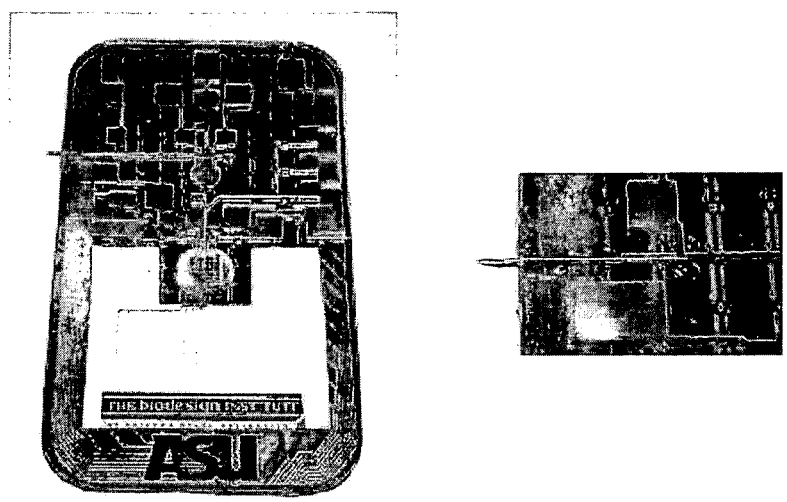
FIG. 23 is an image of a sample preparation cartridge for use with a High-Throughput Genomics' (HTG) Nuclease Protection Assay.

Two cartridges for use with a modified Agilent linear amplification kit (FIG. 22) and High-Throughput Genomics' (HTG) Nuclease Protection Assay (FIG. 23) have been fabricated. Both devices contain on-chip pumps, valves and mixers, and have a printed circuit board backing (PCB) for control of on-chip actuators. The first cartridge is simpler in design. The "HTG" cartridge contains more advanced microfluidics and an integrated needle for on-chip blood collection.

Example 9

Selection of Microarray Technology

Different microarray technologies can be used. Plastic-based DNA microarray chips were made from cyclo-olefinic co-polymer slides using a "Spot-Bot" arrayprinter. They were evaluated by hybridization with fluorescent oligonucleotide probes, and scanned using Axon and Perkin Elmer microarray slide scanners. Other suitable technologies include the HTG NPA assay system using chemiluminescent readout, and the Agilent microarray system. All microarray versions can be incorporated into a microfluidic cartridge, and can be used with ANBC's technologies for the acceleration of hybridization reactions.

Example 10

Set of Radiation Responsive Genes for Incorporation into Microfluidic Prototype

From analysis of gene expression data from in vivo patient and ex vivo peripheral blood studies, an initial set of genes that respond to ionizing radiation in human blood was identified. This gene set is useful for the biodosimetry device. These genes represent a broad, nearly 20-fold, range of baseline expression levels that are used for configuration of the device. These genes represent likely potential candidates for the final signature, and provide landmarks in use and performance evaluation of the device.

In addition, applicable methods for detecting radiation exposure of organisms have previously been described in U.S. Pat. No. 7,008,768, "Method for detecting radiation exposure." The patent discloses a method for detecting exposure of organisms to biologically significant or hazardous amounts of ionizing radiation using microarray or other methods of measurement of gene expression. Also described are methods for determining a dose response relationship between radiation exposure and differential expression of one or more genes, for example, to determine a probable radiation dose in cells that have actually or potentially been exposed to ionizing radiation. The invention includes potential probe sets and microarrays used in this method.

Example 11

Development of RNA Extraction Procedure for Small Blood Samples

Experiments were conducted to compare the two prevalent methods for RNA extraction from blood, the PAXgene™ blood RNA kit and the Ambion RiboPure blood kit, for the yield and quality of RNA as well as the effect of their RNA stabilization components. RNA stabilizers are used if a separate cartridge is used for blood collection, then subsequently connected to the automated microfluidic sample-preparation/hybridization cartridge. The initial experiments described below used animal (sheep) blood, due to rapid access to fresh sheep blood samples, which allowed work to start before new researchers completed human blood borne pathogen training.

All of the following data was obtained using sheep blood from Colorado Serum Co. Sheep blood was used because it is readily available and large volumes can be collected to conduct several experiments.

It is noted that human blood has a typical range of $4-11\times10^6$ white blood cells/ml of whole blood and sheep blood as counted has approximately $1.4\times10^6$ white blood cells/ml. This has a significant effect on the outcome of the purification assays completed here. It is safely assumed that the lower total RNA yields from these experiments are a direct effect of the lower sheep blood cell count and greater total RNA yields would be produced if human blood were used. The blood was stored either in Citrate or Alsever's solution at 4° C. Purifications were performed according to the PAXgene™ Blood RNA Kit protocol or Ambion RiboPure Blood Kit protocol. RNA blood stabilizer (PAXgene™ (Becton Dickinson) or RNAlater (Ambion)) was used in some experiments. For those samples in which the starting volumes of blood were altered, the volume of purifications were analyzed on the Agilent Bioanalyzer 2100 using either RNA 6000 Nano chips or RNA 6000 Pico chips.

Blood RNA must be stable for several days to weeks for the purpose of conducting experiments. The RNA stability of anti-coagulated blood decreases with time and directly affects the total RNA yield. It is therefore necessary for the radiological detection device to process the blood within minutes to avoid sample degradation if no RNA stabilizer is used. Table 1 compares the yields and quality of RNA for immediate analysis with and without stabilizer. Even though the stability of the blood RNA may not be of great concern for the outcome of the detection device, it can be important for the storage of any sample taken at the time of radiological exposure to be used for later analysis. It can also be important when conducting experiments in the lab for the development of the device. It is difficult to consistently receive fresh blood samples to conduct experiments; therefore samples must be stored in a manner to insure RNA stability. RNA stabilizing solutions other than those listed in Table 1 may become available and may be suitable.

TABLE 1

Yields and purity of extracted RNA. All purifications were completed using the RiboPure Blood kit and 500 µl of whole blood. When stabilizing solution was used, 1.3 ml was combined with 500 µl of blood and mixed well. The mixture was immediately centrifuged to separate out the stabilizing solution. The stabilizing solution was discarded and the cell pellet was used for the purification. The PAXgene blood tube solution contains a lysis solution and RNAlater does not.

| Stabilizing Solution used | Average of two Total RNA yields (ng) | Average of two 28S/18S rRNA ratios |
|---|---|---|
| No stabilizing solution | 56 +/− 20% | 1.3 |
| PAXgene blood stabilizing/lysis solution | N/A | 0.0 |
| PAXgene blood stabilizing/lysis solution with an additional lysis step | 63 +/− 3% | 1.1 |
| RNAlater | 66 +/− 7% | 1.8 |

The stabilizing solution is not necessary if RNA purification processing is started within a short period of time after the blood collection. It is noted that the PAXgene™ blood tube stabilizing/lysis solution has an additional lysis step or a longer incubation time (2 hours is suggested) in order to purify total RNA. Using a similar protocol in an automated microfluidic device would significantly increase the processing time. The PAXgene™ Blood RNA Kit requires a 2.5 ml whole blood starting volume. The device obtains blood from a finger-stick prick. A typical finger-stick prick will give up to about 200-500 µl of blood to work with. An experiment was performed using various amounts of whole-blood to purify RNA (FIG. 2) to establish that sufficient RNA yields are produced from small starting volumes of blood.

Figure 26:
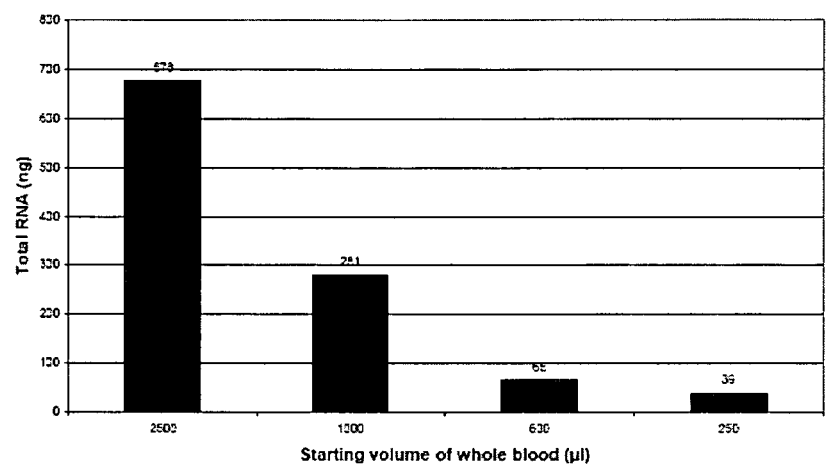
FIG. 26 is a bar graph showing RNA purification using the PAXgene™ blood RNA kit. All samples were incubated in PAXgene™ blood RNA tubes for 24 hours prior to incubation. Data represented is an average of two purifications per starting volume, which differed between 7% and 23%. Further information regarding methodology is available in Example 11.
Figure 27:
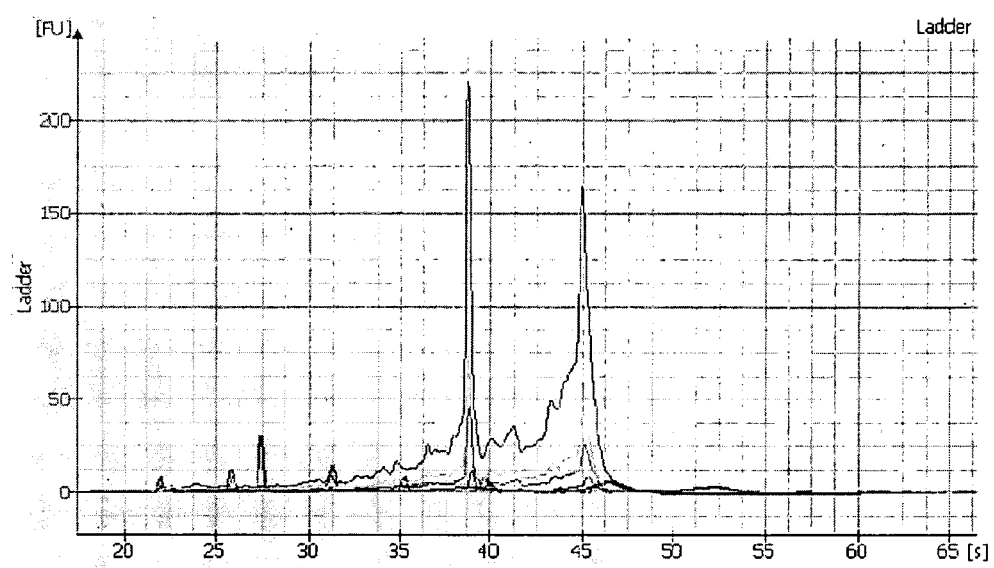
FIG. 27 is an electropherogram showing Bioanalyzer analysis of the PAXgene™ purified RNA samples in FIG. 26. The peaks represent the 18 s (38 sec) and 28 s (45 sec) rRNA. At 45 seconds, the treatments are, from top line to bottom line: sheep RNA from a starting volume of 2500 µL of whole blood; sheep RNA from a starting volume of 1000 µL of whole blood; sheep RNA from a starting volume of 600 µL of whole blood; sheep RNA from a starting volume of 250 µL of whole blood; and RNA 6000 ladder diluted 1/150. Further information regarding methodology is available in Example 11.

The total RNA yields are directly proportional to the purification whole-blood starting volumes. For a starting volume of 200-500 µl of sheep whole blood it is possible to yield 30-60 ng of total RNA (see e.g., FIG. 26). This is equivalent to about 85-470 ng of RNA if human blood were used. This amount of RNA is more than sufficient to perform microarray analysis and produce significant results.

It can be important not only to get a significant amount of total RNA but also a non-degraded sample. An 28S/18S rRNA ratio of 1.5 or above is considered a non-degraded sample. The average rRNA ratios for the PAXgene™ purified RNA samples are shown in Table 2.

TABLE 2

RNA purity for RNA extracted from different volumes of blood using the PAXgene kit.

| Starting volume of whole blood for RNA purification (µl) | Average of two 28S/18S rRNA ratios |
|---|---|
| 2500 | 1.3 |
| 1000 | 1.2 |
| 600 | 1.5 |
| 250 | 1.4 |

Most 28S/18S rRNA ratios from these experiment were lower than 1.5. This may be caused by the delay between blood collection and analysis. The commercially available sheep blood used here was several days old and had a low white blood cell count. Better rRNA ratios are expected when using good quality fresh human blood.

TABLE 3

RNA purifications were done using the PAXgene Blood RNA Kit or the Ambion RiboPure Blood Kit. The blood purified with the PAXgene kit was incubated in PAXgene Blood RNA tubes for 24 hours prior. The blood purified with the RiboPure kit was incubated in RNAlater 2 hours prior.

| Purification method/ manufacturer | Starting volume of whole blood for RNA purification (µl) | Average of two Total RNA yields (ng) |
|---|---|---|
| PAXgene/PreAnalytiX | 1000 | 281 +/− 7% |
| PAXgene/PreAnalytiX | 600 | 65 +/− 23% |
| PAXgene/PreAnalytiX | 250 | 39 +/− 20% |
| RiboPure/Ambion | 500 | 57 +/− 19% |
| RiboPure/Ambion | 400 | 41 +/− 19% |
| RiboPure/Ambion | 300 | 23 +/− 13% |

All data represented here is an average of two purifications.

There are many kits available for the purification of RNA from whole blood. PAXgene™ Blood RNA Kit was compared with the Ambion RiboPure Blood Kit (cat#1928) to determine if one yields higher volumes of RNA and/or produces better quality RNA.

The PAXgene™ kit and the RiboPure kit total RNA yields are similar (see Table 3). Both kits showed similar purity with the exception of RiboPure at 300 µl starting volume. Both kits are acceptable for future use. Other RNA purification methods, with a focus on magnetic bead technologies, may be well suited for compatibility with microfluidic cartridge designs.

Figure 28:
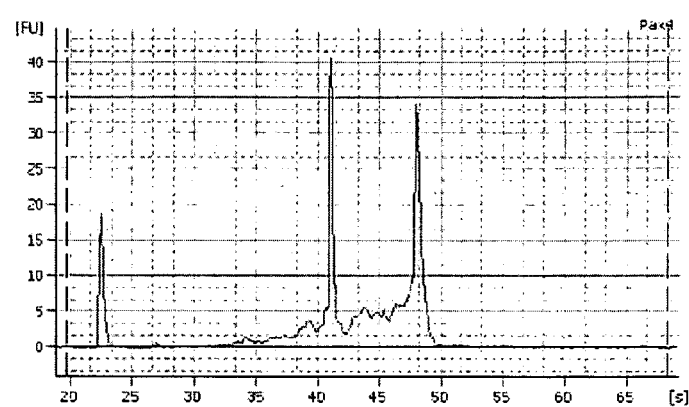
FIG. 28 is a typical electropherogram of PAXgene™ processed RNA showing intact ribosomal RNA peaks and minimal degradation. Further information regarding methodology is available in Example 11.
Figure 29:
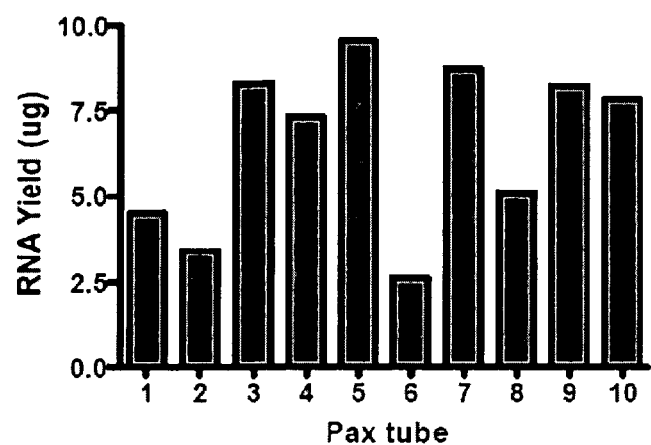
FIG. 29 is a bar graph showing variability of RNA yields from 10 PAXgene™ tubes drawn at the same time from the same donor and processed together. Further information regarding methodology is available in Example 11.

The currently preferred approach for RNA extraction directly from blood is based on the PAXgene™™ system (PreAnalytiX). This approach involves drawing blood directly into a lysis and stabilization solution, which was found important in obtaining high quality non-degraded clinical samples from radio-therapy patients located off-site. While good quality RNA is obtained from the integrated RNA extraction system provided by PreAnalytiX (FIG. 28), yields can be variable (FIG. 29).

A side-by-side comparison of yields and RNA quality using the PreAnalytiX extraction and the newer Versagene™ (Gentra) extraction protocols can readily made to determine the best option. Another major challenge is the high levels of globin mRNA in RNA extracted from whole blood, such as from our PAXgene™ samples. Some studies have shown that such high amounts of globin message may obscure the signal from some genes expressed at lower levels, essentially causing the loss of part of the potentially responsive profile. To remove the globin message, a magnetic bead-based method is readily adaptable to the nanofluidic platform and can be implemented, for example, using the GLOBINclear™ System (Ambion).

For ex vivo studies of radiation response, prior studies have used cultured lymphocytes that had been separated from the other blood components prior to irradiation. In order to determine if irradiation of whole blood ex vivo may present a closer approximation of the in vivo response, comparison is made of the results of ex vivo irradiation experiments with separated lymphocytes and with irradiated whole blood. Such studies show that heparinized whole blood can be successfully incubated in culture for up to 48 hours when diluted in RPMI1640 medium. Microarray results with several donors at 24 hours after a 2 Gy dose can also be evaluated to further determine an ex vivo irradiation protocol.

Example 12

Hybridization and Analysis Approach

Figure 30:
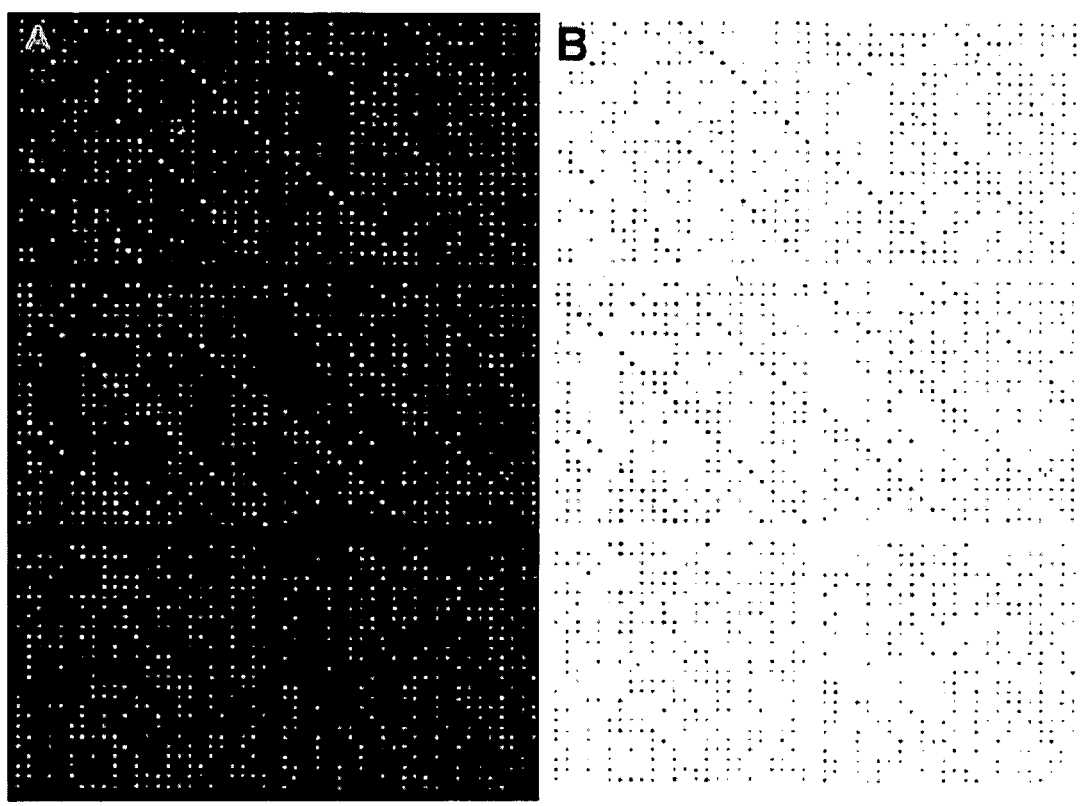
FIG. 30 is an image showing a small section of a microarray illustrating hybridization using two-color (FIG. 30A) or single-color (FIG. 30B) labeling. The two-color approach requires a reference RNA to determine relative ratios of expression, while the single-color approach analyzes the absolute level of hybridization.
Figure 31:
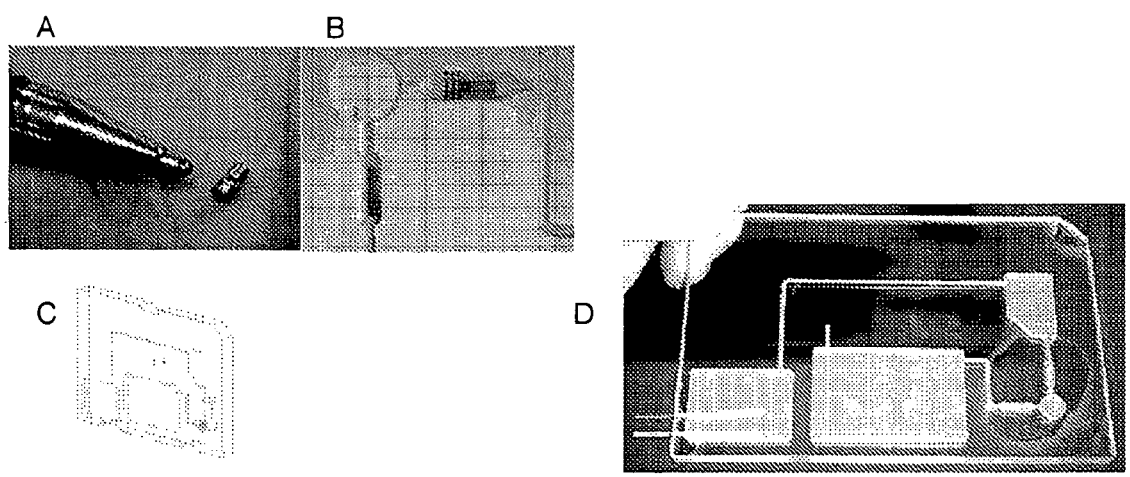
FIG. 31 is a series of photographs and a diagram depicting a check size valve.

A single-color hybridization and analysis approach has been developed that will allow direct comparison of samples without the need for a standard reference RNA (FIG. 30). This approach has now been incorporated into a commercially available kit from Agilent technologies, and its use would allow an increase in the number of samples that can be analyzed on the microarrays as the technique provides a modest savings in both time and supplies for each sample analyzed.

From analysis of gene expression data from in vivo patient and ex vivo peripheral blood studies, an initial set of genes responsive in human blood (see e.g., Table 4) has been identified that will be useful in the development of the biodosimetry device.

TABLE 4

Set of genes for incorporation into the prototype device.

| Gene | Mean Basal[a] | in vivo 1.5Gy[b] | in vivo 3 Gy[b] | 8 patient mean[c] |
|---|---|---|---|---|
| CDKN1A | 674 | 5.4 | 7.5 | 6.3 |
| CD40 | 796 | 1.7 | 2.9 | |
| NEBL | 1139 | 0.44 | 0.37 | |
| GADD45A | 1146 | 0.95 | 1.8 | 3 |
| CXCL11 | 1196 | 2.7 | 5.7 | 4.6 |
| HSF4 | 1207 | 2.1 | 2.5 | |
| CXCL3 | 1273 | 0.33 | 0.45 | |
| FLRT2 | 1435 | 0.43 | 0.42 | |
| TNFSF10 | 1584 | 2.3 | 2.4 | |

TABLE 4-continued

Set of genes for incorporation into the prototype device.

| Gene | Mean Basal[a] | in vivo 1.5Gy[b] | in vivo 3 Gy[b] | 8 patient mean[c] |
|---|---|---|---|---|
| IL8 | 1608 | 0.49 | 0.66 | |
| TNF | 1743 | 0.32 | 0.8 | |
| ENAM\|IGJ | 1901 | 0.76 | 0.45 | |
| XPC | 1942 | 1.8 | 1.9 | |
| KIF2 | 2016 | 2.1 | 2.3 | |
| SERPING1 | 2124 | 2.5 | 3.4 | |
| DDB2 | 2219 | 2 | 2.2 | 2.4 |
| IFIT2 | 2407 | 2.6 | 2.7 | |
| LILRB3 | 2488 | 1.6 | 2.8 | |

TABLE 4-continued

Set of genes for incorporation into the prototype device.

| Gene | Mean Basal[a] | in vivo 1.5Gy[b] | in vivo 3 Gy[b] | 8 patient mean[c] |
|---|---|---|---|---|
| GCH1 | 2564 | 2.3 | 3.1 | |
| FOS | 2655 | 0.43 | 0.8 | |
| CCNB2 | 3008 | 2 | 2.3 | |
| LILRA2 | 3316 | 1.9 | 2.3 | |
| RARRES3 | 3476 | 2.3 | 2.6 | |
| SCN1B | 4027 | 2.5 | 3.2 | |
| UBE2L6 | 4378 | 2.4 | 2 | |
| FCGR1A | 4694 | 2.9 | 4.4 | 4.5 |
| FGL2 | 5047 | 2.2 | 2.5 | |
| VSIG4 | 6066 | 0.71 | 0.19 | |
| PKLR | 7134 | 0.69 | 0.44 | |
| STAT1 | 7260 | 1.9 | 2.3 | |
| WARS | 9651 | 4.4 | 2.7 | |
| TCF2 | 10793 | 1 | 0.23 | |
| DEFA4 | 11410 | 1 | 0.2 | |

[a]Average hybridization of pre-irradiation control (4 arrays).
[b]Ratio of expression in irradiated vs. control (2 arrays).
[c]Mean ratio (irradiated vs. control) in 8 patients by real-time PCR.

This gene set represents a small number of genes covering a broad range of base-line expression levels (nearly 20-fold). Although these genes have not yet been extensively validated in terms of variability and specificity, they do represent likely potential candidates for the final signature.

Example 13

Expression in Mouse Models

Since a genetic approach is not feasible and tissue access is limited, expression profiling in patient blood samples can benefit from results obtained with mouse models. The spectrum of radiation-responsive genes as well as induction of prostaglandins have many similarities between human and mouse. Insight into responses correlating with hematopoietic toxicity with the genetic approach in mice can be applied to similar responses in patients.

Gene expression profiles from blood of wt and mutant mouse lines will be compared to gene expression profiles in human blood. Based on similarities between human and mouse blood, predictions can be made for the relative contribution of specific tissue-type injury responses as well as particular signaling pathways.

Strategic functional genomic studies can be performed. Initial studies focused on responses to intermediate doses of radiation of 3 to 4 Gy in spleen. Microarray hybridizations were performed in both wild-type and selected mutant mouse lines.

TABLE 5

Radiation-inducible genes with roles in intercellular communication of tissue responses[1].
Radiation-inducible genes with roles in intercellular communication or tissue responses[1]

| category | number | examples |
|---|---|---|
| Cytokines | 44 | TGFβ, interleukins, Fas, TNF family members |
| Receptors & cytokine associated | 71 | IL-6 receptor and IL1 receptor related proteins |
| Cell junction and cell membrane | 27 | gap junction proteins, annexin A2 |
| Secretory and plasma proteins | 13 | tissue plasminogen activator (TPA) inhibitors |
| Acute phase response related | 18 | TPA, cytochrome P450-related proteins |
| Tissue protease related | 10 | matrix metalloproteinases |
| Eicosanoid biosynthesis | 4 | prostaglandin-related enzymes such as COX2 |

A full dose response can be determined from 0.5 to 13 Gy in wt mice at 4 and 24 h in spleen using full-genome 44 k Agilent microarrays. The mutant lines studied were p53-null, p38+/DN, and Wip1−/−. The latter line is of particular interest in that Wip1 inactivates p38 and its deletion results in heightened p38 signaling in vivo and increased sensitivity to DNA damaging agents. Emphasis has been placed on genes in the categories shown in the accompanying table as those involved in injury responses that are most likely to impact on systemic metabolomic markers.

Responsiveness was substantially reduced for the majority of genes in all 7 categories in p53-null or p38+/DN mice (e.g., 73% of cytokine genes that were responsive in wild-type mice showed clear attenuation in p53-null mice, and all showed attenuation in p38+/DN). Results for cytokines and growth factors are shown graphically in the figure, illustrating the clear effect of deletion of p53. Genes showing heightened responsiveness in Wip-null mice are illustrated in the left panel, and are included for comparison in the other two panels. The Wip1-null studies provide further support for the central role of p38 in radiation-induced cytokine signaling.

Example 14

Expression Profiles

Figure 32:
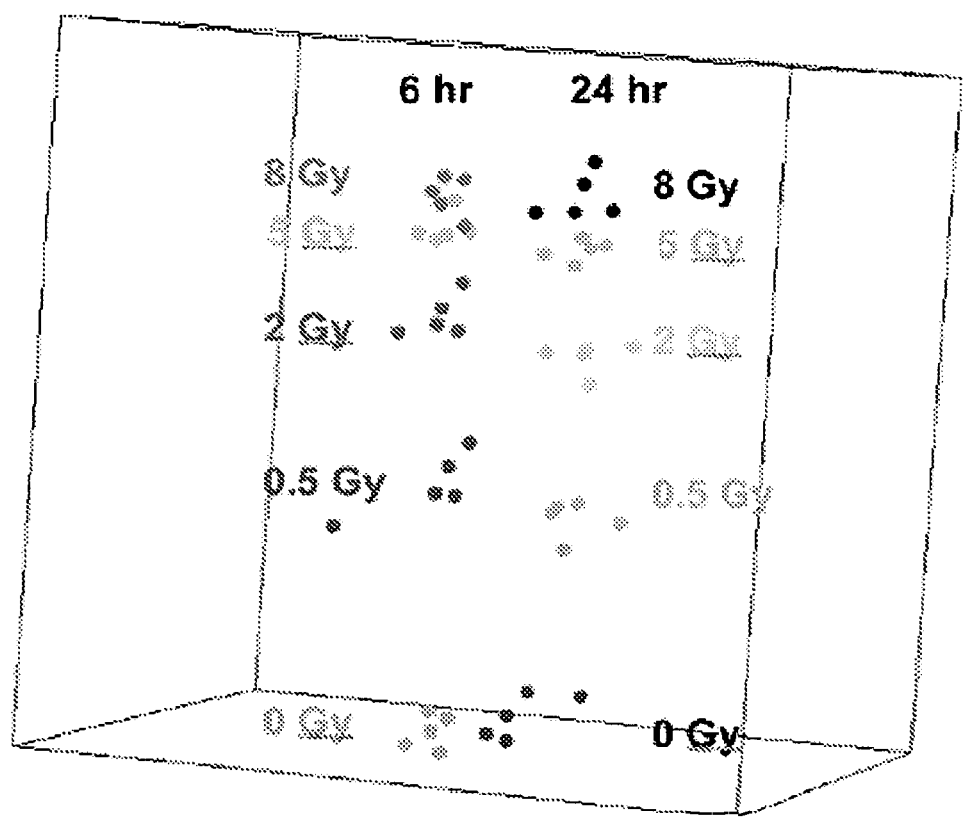
FIG. 32 is an MDS plot illustrating gene expression separation of samples by dose. Each point represents an individual sample, with the distance between points reflecting the overall similarity or difference in expression of 201 genes in the dose discriminating signature. Further information regarding methodology is available in Example 14.

Using the class comparison function of BRB tools, a set of 101 genes was identified that separated all doses used (p<0.001; FDR<5%) by their expression 24 hours after treatment. Similarly, 338 genes (p<0.001; FDR<5%) separated all doses 6 hours after treatment. There was considerable overlap between the gene sets identified at the two times (87 genes), suggesting that a single set of genes could be informative for dosimetry throughout this time range. Indeed, class comparison of all samples ignoring the time variable identified 201 genes (p<0.001; FDR<5%) that separated the samples by dose irrespective of time post-irradiation. Visualization of expression of this gene set across all samples by multi-dimensional scaling illustrates the separation by dose (see e.g., FIG. 32). The clustering of points representing different donors at each of the dose/time conditions indicates a strong similarity of gene expression between different individuals, which can be critical for biodosimetry. This indicates that not just the ratio of response, but the actual levels of gene expression are quite consistent between donors, and that individual variability should not pose an obstacle to interpretation or dose prediction. While differences in expression as a function of time after irradiation is also evident from this plot, this analysis strongly suggests that a single set of genes can provide valid biodosimetric assessment across at least the 6-to 24-hour post-exposure window.

Figure 33:
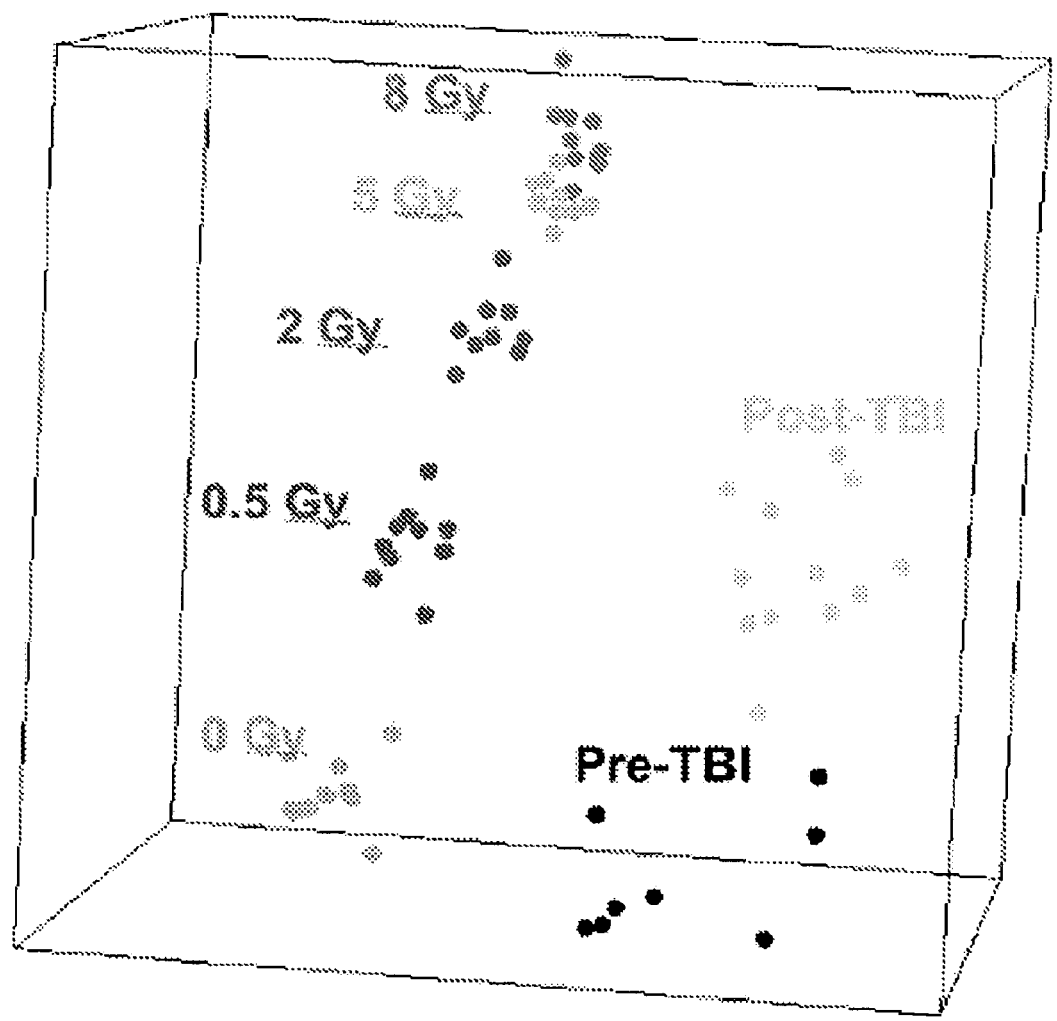
FIG. 33 is an MDS plot comparing ex vivo dose with samples from patients taken before or after the start of TBI. Samples from 6 and 24 hours after treatment are not distinguished. Further information regarding methodology is available in Example 14.

Whole-genome expression profiles were obtained for 8 patients undergoing TBI (pre-TBI, 6 and 24 hours after start of TBI; or pre-TBI, 6 hours after start). Despite a variety of diagnoses, pre-treatments, and other patient characteristics, these samples look broadly similar, and the dose-responsive gene set identified in the ex vivo studies could easily separate the pre- and post-irradiation patient samples (see e.g., FIG. 33). However, these samples did not cluster identically with the ex vivo treated samples. This could be due to the different handling of the samples (direct lysis vs. time in culture, and different RNA isolation protocols), to the healthy vs. disease states of the donors, or to a difference between the response to radiation of blood in culture vs. in the whole body, where blood cells may respond to signals from distant tissue and organ systems.

Despite the discernable differences in response between the current in vivo and ex vivo data, it can be predicted with high accuracy if a patient sample was taken pre- or post-exposure. A number of classifiers were built and tested using BRB Array Tools, and it was found the Support Vector Machines (SVM) algorithm gave the best performance. While it correctly classified all samples in the training set (ex vivo data) as exposed or not exposed, it also was able to correctly classify the pre- and post-exposure test samples with 100% efficiency. The 3-Nearest Neighbors, Nearest Centroid and Compound Covariate Predictors also performed well, correctly identifying 95% of the test samples (TBI patients). These experiments demonstrate that the ability to predict in vivo doses from ex vivo data.

Example 15

Integrated Microfluidic Visualization Biochip

Figure 35:
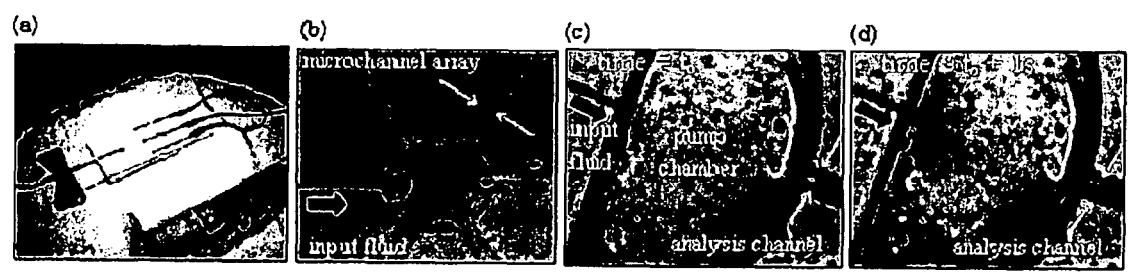
FIG. 35 is a series of images showing an integrated microfluidic visualization biochip of a biodosimeter device.
Figure 36:
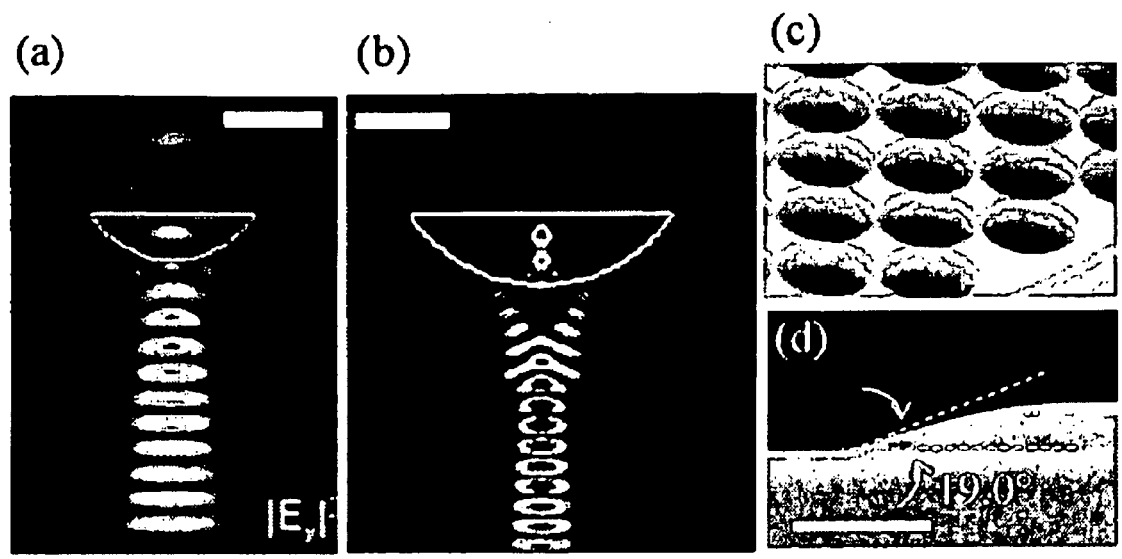
FIG. 36 depicts field simulations of microlenslet designs, from first-principles Maxwell's equation solvers.

An integrated microfluidic visualization biochip was designed and constructed (see e.g., FIGS. 35-36). The microfluidic visualization biochip has an array of 75 channels, each about 100 μm wide. The microchannels are visualized directly with a CCD sensor array through a microlenslet array for ultrahigh throughput imaging. The sensing biochip is illuminated with a uniform white light source from the side of the microfluidic biochip. The microfluidic channels are made from polydimethylsilxoane (PDMS). The PDMS microfabrication method enables low-cost production of large-array biochips with ease of fabrication. In this device, the microchannels are pumped externally, but micropumps can be integrated onto the biochip.

With CCD sensor pitch sizes typically about 5 μm, the integration of a microlenslet array provides better spatial resolution of about 5 μm to match the individual CCD pixels. This allows for increased excitation intensity and improved fluorescence collection. These advantages allow higher signal-to-noise ratio, as well as light localization for $10^3 \times 10^3$ wavelength-scale focal volumes focused directly into the CCD from the microfluidic channel arrays, rather than diffused over the CCD sensor or microfluidic chip. Careful design of the microlenslet array (see e.g., FIG. 36) is required for a desired numerical aperture based on the optical signature characteristic, trading off the optical focal volume with the fluorescence saturation intensity. With each microfluidic channel sampled from upstream to downstream with up to $10^3$ focal volumes, multiple redundant imaging and statistical quantification can be performed for the biodosimetry. Faster flow rates could also be used. The sample flow through (from chip input to output) is below 1 minute. A target is a 3-minute short turnaround time for each blood sample cartridge.

What is claimed is:

1. A portable biodosimetry device for detecting radiation exposure, comprising:
    a microfluidic biochip comprising:
        a biological sample collection channel module;
        an oligonucleotide extraction biochannel module;
        a hybridization channel module;
        a plurality of fluidic actuators;
        a pump, wherein the pump controls a fluid flow in at least one of the biological sample collection module, the oligonucleotide extraction biochannel module, or the hybridization channel module;
        a power source; and
        a microprocessor coupled to the power source, wherein the microprocessor controls activation of at least one module of the microfluidic biochip;
    wherein,
        the hybridization channel module comprises an oligonucleotide array;
        the oligonucleotide array of the hybridization channel module comprises a plurality of oligonucleotides, where an oligonucleotide of the array will hybridize under stringent conditions to a gene expression product of a radiation responsive gene; and
        the biological sample collection channel module, the oligonucleotide extraction biochannel module, and the hybridization channel module are fluidically coupled and wherein the plurality of fluidic actuators are each individually controlled by the microprocessor.

2. The device of claim 1 wherein the biological sample collection channel module, the oligonucleotide extraction biochannel module, and the hybridization channel module are operably and detachably coupled to the portable biodosimetry device.

3. The device of claim 2 wherein the biological sample collection channel module, the oligonucleotide extraction channel module, and the hybridization channel module are comprised in a cartridge and the cartridge is operably and detachably coupled to the portable biodosimetry device.

4. The device of claim 1 further comprising a reagent storage compartment module operably coupled to the portable biodosimetry device.

5. The device of claim 4 wherein the reagent storage compartment module comprises at least one of (i) aqueous reagents, (ii) a dry reagent and a means for solubilizing the dry reagent and (iii) a reagent pouch operably and detachably coupled to the reagent storage compartment module.

6. The device of claim 1 further comprising a hybridization detector operably coupled to the portable biodosimetry device.

7. The device of claim 1 wherein the microfluidic biochip is a cyclo-olefinic co-polymer biochannel chip.

8. The device of claim 1 wherein the microfluidic biochip comprises a thermally actuated paraffin-based microvalve located in at least one of the biological sample collection channel module, the oligonucleotide extraction biochannel module, and the hybridization channel module.

9. The device of claim 1 wherein the biological sample collection channel module collects a blood sample from a mammalian subject.

10. The device of claim 1 wherein the biological sample collection channel module comprises at least one of a needle, a microneedle, a lasette, a capillary-force collection system, and a channel, a sample chamber, and a pump.

11. The device of claim 1 wherein the oligonucleotide extraction biochannel module extracts RNA from a biological sample.

12. The device of claim 1 wherein the oligonucleotide extraction biochannel module comprises at least one of (i) a means for cell capture, cell concentration, cell purification, and/or cell lysis, (ii) a means for isolating oligonucleotides of the biological sample, (iii) a means for amplifying the isolated oligonucleotides of the biological sample, (iv) an immunogenic separation system, and (v) a magnetic separation system.

13. The device of claim 1 wherein the oligonucleotides of the array are immobilized with a 3-dimensional amino-reactive gel-coating of the hybridization channel module.

14. The device of claim 1 wherein the hybridization channel module comprises an electrochemical or thermopneumatic liquid pump for fluidically transporting a hybridization solution across the oligonucleotide array.

15. The device of claim 14 wherein detecting hybridization occurs in real-time.

16. The device of claim 1 wherein the oligonucleotide array is at least one of a printed low-density oligonucleotide microarray and a cDNA microarray.

17. The device of claim 1 wherein the oligonucleotide array comprises at least one of a glass non-porous solid support, a non-glass non- porous solid support, a silicon-based solid support produced by photolithographic masking, and a cyclo-olefinic copolymer solid support.

18. The device of claim 1 wherein the plurality of oligonucleotides of the oligonucleotide array comprise oligonucleotides that will hybridize under stringent conditions to gene expression products of radiation responsive genes selected from the group consisting of: A_23_P255111, A_24_P127462, A_24_P15083, A_24_P585004, A_32_P140501, A_32_P198223, AA516273, ABTB2, ACSL1, ACTA2, ACTN1, ADA, ADM, AES, AF289562, AGRN, AK021751, AK024870, AK024898, AK055915, AK056245, AK092083, AK092875, AK092942, AK097080, AK123333, AK123446, AK123722, AK2, ALDH18A1, ALS2CR13, ANKRA2, ANXA11, ANXA2P1, ANXA4, AP1S2, APBA3, APBB1, APBB3, APOBEC3B, APOBEC3C, APOBEC3F, AQP9, ARHGEF3, ASB2, ASCC3, ASTN2, ATP2A3, ATP8B2, ATP9A, B3GNTL1, BANK1, BAX, BAZ1A, BBC3, BC014395, BC018597, BCO22205, BCO23989, BCO39097, BC045174, BCO53363, BC068044, BCL11A, BCL3, BCNP1, BE646426, BF511442, B1828537, BIRC3, BLK, BLR1, BM926530, BTG3, BU540282, BU595528, C11orf21, C11orf24, C11orf54, C12orf42, C12orf45, C12orf5, C14orf151, C16orf30, C17orf49, C19orf36, C1orf24, C1orf57, C20orf24, C3orf26, C8orf38, C9orf102, C9orf127, CA4, CAMK1D, CAMK2D, CARD6, CASP7, CCDC49, CCNB2, CCNG1, CCR7, CD19, CD24, CD40, CD40, CD511705, CD52, CD79A, CD79B, CD83, CD93, CDC25B, CDC42EP2, CDCA7L, CDKN1A, CDKN1A, CDKN1C, CEBPB, CEBPE, CENTB1, CENTG3, CHES1, CHRNA10, CIC, CLC, CLEC4E, CLIC3, CLIC4, CN271858, CNOT7, COL27A1, COL9A3, COMTD1, CR595983, CR597075, CR603437, CR616003, CR621698, CR623273, CR627148, CRLF3, CSPP1, CSPP1, CTAGE4, CXCL1, CXCL11, CXCL16, CXCL3, CXCR3, CYLD, DAPK2, DCP1B, DDB2, DDB2, DEF6, DEFA4, DHRS7, DHRS7B, DKFZp434F142, DPEP2, DZIP3, EBI3, EBPL, ECE1, ECE1, EFNB1, EGLN1, EHD1, E124, EIF2C3, ENAM IGJ, ENST00000253048, ENST00000257897, ENST00000261569, ENST00000288074, ENST00000291567, ENST00000301749, ENST00000323595, ENST00000355807, ENST00000360329, EOMES, FAM105A, FAM113B, FAM62A, FAS, FASLG, FBS1, FBXL16, FBXO22, FBXO22, FBXW7, FCGBP, FCGR1A, FCHO1, FCHSD2, FCRL2, FDXR, FFAR2, FGL2, FHL2, FKSG44, FLII, FLJ11259, FLJ20186, FLJ20647, F1135348, FLJ36031, F1139575, FLJ40542, F1145445, FLRT2, FNDC3B, FOS, FOS, FPR1, FPRL1, FTSJ2, FXYD2, GOS2, GABRA3, GADD45A, GADD45A, GAMT, GCH1, GDF15, GHRL, GLIPR1, GLS2, GNG7, GNG8, GPR109A, GPR109B, GPR160, GPR18, GPR84, GRIPAP1, GRPEL2, GSK3A, GSS, GTF2I, H2-ALPHA, HEBP1, HIP1R, HIST1H2BE, HIST1H2BF, HIST1H2B0, HLA-DOA, HLA-DOB, HNRPC, HSF4, IBRDC3, IER5, IER5L, IFIH1, IFIT2, IFITM1, IGHA1, IGHM, IGHV1-69, IL1ORB, IL1B, IL1RN, IL21R, IL8, IRAK3, ISG20L1, ITGA6, ITGAX, JAK3, JMJD2A, KCNJ15, KCNJ2, KCNN4, KCTD12, KENAE, KIAA0284, KIAA0963, KIF2, KIR2DS4, KLF2, KREMEN1, LAMP3, LBR, LEPROTL1, LHPP, LIF, LIG1, LILRA2, LILRB3, LIMK2, LMBRD1, LMNA, LMNB2, LOCI 58830, LOC201229, LOC256021, LOC283663, LOC284184, LOC339287, LOC349114, LOC399744, LOC401357, LOC649791, LRG1, LY9, MAMDC4, MANSC1, MAP4K2, MAP4K4, MAPKAPK2, MARCKS, MDM2, MDS025, METTL7A, MGAT3, MGC16207, MGC17624, MGC2463, MGC40499, MGC5370, MGST1, MLX, MOBK1B, MPEG1, MPP1, MR1, MXD1, MYC, MYOM2, N28017, NALP12, NBN, NBPF15, NEBL, NEU1, NFKB1, NFKB2, NPAL2, NRBP1, OPLAH, OSBPL3, P2RX5, PACSIN1, PCNA, PDLIM5, PELO, PGCP, PHLDA3, PHPT1, PIK3CD, PKLR, PLAGL2, PLAUR, PLK2, PLK3, PLXNA1, PLXNA2, PLXNB2, PMAIP1, POLH, POPDC2, POU2AF1, PPM1D, PRG1, PRKAB1, PRMT7, PSD4, PTGIR, PTP4A1, PTPN7, PTPNS1, PTPRCAP, PXN, PYCRL, PYGL, RAFTLIN, RALGPS2, RARRES3, RASA3, RASGEF1A, RASGRP2, RBM14, RBPSUH, RELB, RGS12, RGS14, RGS16, RGS3, RNF24, RP11-298P3.3, RP4-742C19.3, RPS19, RPS27L, RRAD, RRAGD, RUFY3, SAC3D1, SACS, SCN1B, SDCBP, SDF2, SELPLG, SEMA4C, SERPINB1, SERPING1, SERTAD1, SESN1, SESN2, SGK, SH2D1B, SIGIRR, SIGLEC9, SIRPB2, SIT1, SLA, SLBP, SLC11A1, SLC13A2, SLC25A15, SLC27A1, SLC27A3, SLC35F2, SLC4A11, SLC7A6, SLCO4A1, SOCS1, SOD2, SPIB, SPPL2A, SRA1, SRPK2, SSPN, STAT1, SYNGR2, TACC3, TAPBP, TBC1D1, TBXAS1, TCF2, TCF3, TCF4, TCF7, TCL1A, TESK2, TFE3, THC2292160, THC2305303, THC2340838, THC2342491, THC2347909, THC2364440, THC2380864, THC2397697, THC2429167, THC2439183, THC2442819, TKT, TM7SF3, TM9SF4, TMC8, TMEM30A, TMEM68, TNF, TNFAIP2, TNFAIP3, TNFAIP6, TNFRSF10B, TNFRSF12A, TNFRSF18, TNFSF10, TNFSF12, TNFSF4, TNFSF7, TNIP1, TP53AP1, TP53I3, TP53INP1, TRAF4, TRAF5, TREM1, TRIAP1, TRIB2, TRIM22, TRIM32, TRPM6, TSC22D3, TSPAN32, TTC21A, TYMS, UBE2H, UBE2L6, UNQ501, UPB1, UROD, VAT1, VSIG4, WARS, WDFY3, WIG1, XM_499519, XPC, YWHAB, YWHAZ, ZC3H12A, ZC3H7A, ZFAND2B, ZNF195, ZNF25, ZNF337, ZNF541, ZNF625, ZNF79, ZNF92, ZUBR1, and αH2AX.

19. The device of claim 18 wherein the plurality of oligonucleotides of the oligonucleotide array comprise oligonucleotides that will hybridize under stringent conditions to gene expression products of radiation responsive genes selected from the group consisting of: A_23_P255111, A_24_P127462, A_24_P15083, A_24_P585004, A_32_P140501, A_32_P198223, AA516273, ACSL1, ADM, AK092942, AK097080, AK123446, AK123722, APOBEC3B, AQP9, ASB2, ASCC3, BAX, BBC3, BC068044, BCNP1, BE646426, B1828537, BLK, BLR1, C11orf54, C12orf5, C20orf24, C9orf102, CAMK2D, CARD6, CD19, CD24, CD79B, CDKN1A, CEBPB, CEBPE, CLEC4E, CR597075, CR627148, CSPP1, CXCL1, CXCL16, DDB2, DHRS7B, DKFZp434F142, ECE1, EGLN1, ENST00000323595, ENST00000355807, FAM113B, FBXO22, FDXR, FFAR2, FKSG44, FLJ11259, FLJ36031, F1139575, FLJ40542, F1145445, FOS, FPR1, FPRL1, FTSJ2, GOS2, GABRA3, GADD45A, GPR109A, GPR109B, HIP1R, HIST1H2BE, HIST1H2BF, HIST1H2B0, HLA-DOA, HLA-DOB, IBRDC3, IER5, IER5, IGHA1, IGHM, IL1ORB, IL1B, URN, IRAK3, ISG20L1, ITGA6, ITGAX, KCNJ15, KCNJ2, KIAA0963, KREMEN1, LOC283663, LOC339287, LOC349114, LOC399744, LOC401357, LRG1, MGC40499, MGC5370, MOBK1B, MXD1, NALP12, NEU1, OPLAH, P2RX5, PCNA, PHLDA3, PHPT1, PLAUR, PLK2, PLK3, POU2AF1, PPM1D, PRG1, PTP4A1, PTPNS1, PXN, RNF24, RPS27L, RRAGD, SDCBP, SDF2, SEMA4C, SERPINB1, SGK, SIGLEC9, SIRPB2, SLA, SPIB, TCF7, TCL1A, THC2340838, THC2397697, THC2429167, THC2439183, TNFAIP6, TNFRSF10B, TNFSF7, TP5313, TP53INP1, TREM1, TRIAP1, TRIM22, TRPM6, UPB1, WDFY3, XM_499519, XPC, and ZNF2.

20. The device of claim 18 wherein the plurality of oligonucleotides of the oligonucleotide array comprise oligonucleotides that will hybridize under stringent conditions to gene expression products of radiation responsive genes selected from the group consisting of: ABTB2, ACTA2, ACTN1, ADA, AES, AF289562, AGRN, AK021751, AK024870, AK024898, AK055915, AK056245, AK092083, AK092875, AK123333, AK123722, AK2, ALDH18A1, ALS2CR13, ANKRA2, ANXA11, ANXA2P1, ANXA4, AP1S2, APBA3, APBB1, APBB3, APOBEC3C, APOBEC3F, ARHGEF3, ASCC3, ASTN2, ATP2A3, ATP8B2, ATP9A, B3GNTL1, BANK1, BAX, BAZ1A, BBC3, BC014395, BC018597, BCO22205, BCO23989, BCO39097, BC045174, BCO53363, BCL11A, BCL3, BCNP1, BE646426, BF511442, BIRC3, BM926530, BTG3, BU540282, BU595528, C11orf21, C11orf24, C12orf42, C12orf45, C12orf5, C14orf151, C16orf30, C17orf49, C19orf36, C1orf24, C1orf57, C3orf26, C8orf38, C9orf127, CA4, CAMK1D, CASP7, CCDC49, CCNG1, CCPG1, CCR7, CD40, CD511705, CD52, CD79A, CD83, CD93, CDC25B, CDC42EP2, CDCA7L, CDKN1A, CDKN1C, CENTB1, CENTG3, CHES1, CHRNA10, CIC, CLIC3, CLIC4, CN271858, CNOT7, COL27A1, COL9A3, COMTD1, CR595983, CR603437, CR616003, CR621698, CR623273, CRLF3, CTAGE4, CXCR3, CYLD, DAPK2, DCP1B, DDB2, DEF6, DHRS7, DPEP2, DZIP3, EBI3, EBPL, ECE1, EFNB1, EHD1, E124, EIF2C3, ENST00000253048, ENST00000257897, ENST00000261569, ENST00000288074, ENST00000291567, ENST00000301749, ENST00000360329, EOMES, FAM105A, FAM62A, FAS, FASLG, FBS1, FBXL16, FBXO22, FBXW7, FCGBP, FCHO1, FCHSD2, FCRL2, FDXR, FHL2, FLIT, FLJ11259, FLJ20186, FLJ20647, F1135348, FLJ40542, FNDC3B, FTSJ2, FXYD2, GADD45A, GAMT, GDF15, GHRL, GLIPR1, GLS2, GNG7, GNG8, GPR160, GPR18, GPR84, GRIPAP1, GRPEL2, GSK3A, GSS, GTF2I, H2-ALPHA, HEBP1, HNRPC, IER5, IER5L, IFIH1, IFITM1, IGHM, IGHV1-69, IL21R, ISG20L1, JAK3, JMJD2A, KCNJ2, KCNN4, KCTD12, KENAE, KIAA0284, KIR2DS4, KLF2, LAMP3, LBR, LEPROTL1, LHPP, LIF, LIG1, LIMK2, LMBRD1, LMNA, LMNB2, LOCI58830, LOC201229, LOC256021, LOC284184, LOC649791, LY9, MAMDC4, MANSC1, MAP4K2, MAP4K4, MAPKAPK2, MARCKS, MDM2, MDS025, METTL7A, MGAT3, MGC16207, MGC17624, MGC2463, MGC5370, MGST1, MLX, MPEG1, MPP1, MR1, MYC, MYOM2, N28017, NBN, NBPF15, NFKB1, NFKB2, NPAL2, NRBP1, OSBPL3, P2RX5, PACSIN1, PCNA, PDLIM5, PELO, PGCP, PHLDA3, PHPT1, PIK3CD, PLAGL2, PLK2, PLK3, PLXNA1, PLXNA2, PLXNB2, PMAIP1, POLH, POPDC2, PPM1D, PRKAB1, PRMT7, PSD4, PTGIR, PTP4A1, PTPN7, PTPRCAP, PYCRL, PYGL, RAFTLIN, RALGPS2, RASA3, RASGEF1A, RASGRP2, RBM14, RBPSUH, RELB, RGS12, RGS14, RGS16, RGS3, RP11, 298P3.3, RP4-742C19.3, RPS19, RPS27L, RRAD, RUFY3, SAC3D1, SACS, SELPLG, SERPINB1, SERTAD1, SESN1, SESN2, SH2D1B, SIGIRR, SIT1, SLBP, SLBP, SLC11A1, SLC13A2, SLC25A15, SLC27A1, SLC27A3, SLC35F2, SLC4A11, SLC7A6, SLCO4A1, SOCS1, SOD2, SPPL2A, SRA1, SRPK2, SSPN, SYNGR2, TACC3, TAPBP, TBC1D1, TBXAS1, TCF3, TCF4, TCL1A, TESK2, TFE3, THC2292160, THC2305303, THC2340838, THC2342491, THC2347909, THC2364440, THC2380864, THC2397697, THC2429167, THC2439183, THC2442819, TKT, TM7SF3, TM9SF4, TMC8, TMEM30A, TMEM68, TNFAIP2, TNFAIP3, TNFAIP6, TNFRSF10B, TNFRSF12A, TNFRSF18, TNFSF12, TNFSF4, TNFSF7, TNIP1, TP53AP1, TRAF4, TRAF5, TRIAP1, TRIB2, TRIM22, TRIM32, TSC22D3, TSPAN32, TTC21A, TYMS, UBE2H, UNQ501, UROD, VAT1, VSIG4, WIG1, XPC, YWHAB, YWHAZ, ZC3H12A, ZC3H7A, ZFAND2B, ZNF195, ZNF337, ZNF541, ZNF625, ZNF79, ZNF92, and ZUBR1.

21. The device of claim 18 wherein the plurality of oligonucleotides of the oligonucleotide array comprise oligonucleotides that will hybridize under stringent conditions to gene expression products of radiation responsive genes selected from the group consisting of: CDKN1A, CD40, NEBL, GADD45A, CXCL11, HSF4, CXCL3, FLRT2, TNFSF10, IL8, TNF, ENAM IGJ, XPC, KIF2, SERPING1, DDB2, IFIT2, LILRB3, GCH1, FOS, CCNB2, LILRA2, RARRES3, SCN1B, UBE2L6, FCGR1A, FGL2, VSIG4, PKLR, STAT1, WARS, TCF2, DEFA4, and αH2AX.

22. The device of claim 1 further comprising at least one of a display for communicating information to the user, and an input and/or output connection for data transfer.

23. The device of claim 1 wherein the biological sample collection channel module comprises a means for collecting a biological sample from a mammalian subject.

24. The device of claim 1 wherein the hybridization channel module comprises a means for detecting hybridization of oligonucleotides of a biological sample with oligonucleotides of the oligonucleotide array.

25. The device of claim 1 wherein the control module further comprises a means for user input.

26. The device of claim 1 wherein each of the plurality of fluidic actuators has a heating element and a thermostat for controlling heating power.

27. The device of claim 26 wherein heat is transferred from at least one of the plurality of fluidic actuators to the materials through the placement and contact of the materials.

28. The device of claim 1 wherein each of the plurality of fluidic actuators may be individually energized.

29. The device of claim 1 wherein the plurality of fluidic actuators are self-controlled by an enable signal which does not power the fluidic actuator or influence temperature control.

30. The device of claim 1 wherein the plurality of fluidic actuators comprise a diode.

31. A portable biodosimetry device for detecting radiation exposure, comprising:
   a microfluidic biochip comprising:
      a biological sample collection channel module;
      an oligonucleotide extraction biochannel module;
      a hybridization channel module;
      a fluidic actuator;
      a pump, wherein the pump controls a fluid flow in at least one of the biological sample collection module, the oligonucleotide extraction biochannel module, or the hybridization channel module;
   a power source; and
   a processor, wherein the processor controls activation of at least one module of the microfluidic biochip;
   wherein,
      the hybridization channel module comprises an oligonucleotide array;
      the oligonucleotide array of the hybridization channel module comprises a plurality of oligonucleotides, where an oligonucleotide of the array will hybridize under stringent conditions to a gene expression product of a radiation responsive gene; and
      the biological sample collection channel module, the oligonucleotide extraction biochannel module, and the hybridization channel module are fluidically coupled, and wherein the fluidic actuator is controlled by the processor.

* * * * *